US012640484B2

(12) United States Patent
Gillette et al.

(10) Patent No.: US 12,640,484 B2
(45) Date of Patent: May 26, 2026

(54) OMNIDIRECTIONAL ANTENNA ASSEMBLIES INCLUDING BROADBAND MONOPOLE ANTENNAS

(71) Applicant: TE Connectivity Solutions GmbH, Schaffhausen (CH)

(72) Inventors: Jay Franklin Gillette, Lake Zurich, IL (US); Youngha Choi, Derry, NH (US); Shawn Wayne Johnson, Allenstown, NH (US); Adam Martin Alevy, Carlisle, MA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 157 days.

(21) Appl. No.: 17/880,732

(22) Filed: Aug. 4, 2022

(65) Prior Publication Data

US 2023/0054135 A1 Feb. 23, 2023

Related U.S. Application Data

(60) Provisional application No. 63/236,117, filed on Aug. 23, 2021.

(51) Int. Cl.

*H01Q 9/30* (2006.01)
*H01Q 1/38* (2006.01)
*H01Q 9/26* (2006.01)

(52) U.S. Cl.

CPC ................. *H01Q 9/30* (2013.01); *H01Q 1/38* (2013.01); *H01Q 9/26* (2013.01)

(58) Field of Classification Search

CPC .............. H01Q 9/30; H01Q 9/26; H01Q 9/44; H01Q 9/28; H01Q 9/40; H01Q 9/42;

(Continued)

(56) References Cited

U.S. PATENT DOCUMENTS

| | | | | |
|---|---|---|---|---|
| 3,147,480 A * | 9/1964 | Lamberty | H01Q 9/40 | 343/831 |
| 5,872,546 A * | 2/1999 | Ihara | H01Q 9/40 | 343/893 |

(Continued)

FOREIGN PATENT DOCUMENTS

| | | | | |
|---|---|---|---|---|
| CN | 105098338 A | 11/2015 | | |
| CN | 110556633 A * | 12/2019 | | H01Q 1/50 |

(Continued)

OTHER PUBLICATIONS

Extended European Search Report, European Application No. 22191047.4-1205, European Filing Date, Jan. 16, 2023.

(Continued)

*Primary Examiner* — Seokjin Kim

(57) ABSTRACT

Disclosed herein are exemplary embodiments of omnidirectional antenna assemblies including broadband monopole antennas. In exemplary embodiments, the antenna assembly includes a broadband monopole antenna comprising stamped and folded elements. The antenna assembly is configured to be operable with high omnidirectional pattern conformity, e.g., at frequencies from about 617 megahertz (MHz) to about 7125 MHz or frequencies from about 698 megahertz (MHz) to about 7125 MHz, etc.

21 Claims, 67 Drawing Sheets

(58) Field of Classification Search
CPC ............ H01Q 9/285; H01Q 1/38; H01Q 5/00; H01Q 21/205; H01Q 21/26
See application file for complete search history.

(56) References Cited

U.S. PATENT DOCUMENTS

| | | | | |
|---|---|---|---|---|
| 8,866,685 | B2 * | 10/2014 | Lee | H01Q 9/28 343/770 |
| 9,979,086 | B2 * | 5/2018 | Ng | H01Q 5/00 |
| 10,677,911 | B2 * | 6/2020 | Wötzel | G01S 13/75 |
| 2010/0019979 | A1 * | 1/2010 | Buxton | H01Q 9/28 343/722 |
| 2012/0081259 | A1 * | 4/2012 | Regala | H01Q 21/26 343/797 |
| 2012/0169556 | A1 * | 7/2012 | Truthan | H01Q 9/36 343/752 |
| 2012/0169560 | A1 * | 7/2012 | Lee | H01Q 9/30 343/770 |
| 2014/0022131 | A1 * | 1/2014 | Azulay | H01Q 1/007 343/727 |
| 2015/0188226 | A1 * | 7/2015 | Ng | H01Q 9/42 343/862 |
| 2015/0349418 | A1 * | 12/2015 | Patron | H01Q 3/44 343/836 |
| 2016/0164190 | A1 * | 6/2016 | Daurer | H01Q 9/40 343/770 |
| 2017/0025750 | A1 * | 1/2017 | Su | H01Q 1/50 |
| 2017/0346194 | A1 * | 11/2017 | Chamberland | H01Q 9/18 |
| 2018/0045822 | A1 * | 2/2018 | Wötzel | H01Q 9/28 |
| 2018/0062731 | A1 * | 3/2018 | Ng | H01Q 9/285 |
| 2020/0220264 | A1 * | 7/2020 | Montgomery | H01Q 5/48 |
| 2020/0328532 | A1 * | 10/2020 | Yang | H01Q 21/205 |
| 2021/0119339 | A1 * | 4/2021 | Smith, Jr. | H01Q 1/2291 |
| 2021/0280988 | A1 * | 9/2021 | Sundararajan | H01Q 21/08 |
| 2022/0006177 | A1 * | 1/2022 | Wang | H01Q 9/42 |
| 2022/0344823 | A1 * | 10/2022 | Panther | H01Q 21/26 |
| 2022/0344835 | A1 * | 10/2022 | Suh | H01Q 25/00 |
| 2024/0063546 | A1 * | 2/2024 | Leung | H01Q 25/002 |
| 2024/0113450 | A1 * | 4/2024 | Neenan | H01Q 21/24 |

FOREIGN PATENT DOCUMENTS

| | | | | |
|---|---|---|---|---|
| EP | 766343 | A2 * | 4/1997 | H01Q 9/28 |
| KR | 102347047 | B1 * | 1/2022 | H01Q 1/48 |
| WO | 2022905831 | A1 | 1/2022 | |

OTHER PUBLICATIONS

Wong, K. et al., “A Compact Wideband Omnidirectional Cross-Plate Monopole Antenna,” Microwave and Optical Technology Letters, Mar. 20, 2005, vol. 44 No. 6, pp. 492-94, Wiley Periodicals, Inc., USA.

* cited by examiner

RF Specifications Table

| Requirement | Value | Compliance (*from FOT B1 Data) |
|---|---|---|
| Frequency Band (MHz) | 617-698 | Comply |
| Frequency Band (MHz) | 698-960 | Comply |
| Frequency Band (MHz) | 1427-1695 | Comply |
| Frequency Band (MHz) | 1695-2700 | Comply |
| Frequency Band (MHz) | 3300-4200 | Comply |
| Frequency Band (MHz) | 4400-6000 | Comply |
| Frequency Band (MHz) | 6000-7125 | Comply |
| VSWR - Max,; 617-698 | <2.5 | Comply |
| VSWR - Max,; 698-960 | <2.0 | Comply |
| VSWR - Max,; 1427-1695 | <4.0 | Comply |
| VSWR - Max,; 1695-2700 | <2.0 | Comply |
| VSWR - Max,; 3300-4200 | <2.0 | Comply |
| VSWR - Max,; 4400-6000 | <2.5 | Comply |
| VSWR - Max,; 6000-7125 | <3.0 | Comply |

FIG. 21

RF Specifications Table

| Requirement | Value | Compliance (*from FOT B1 Data) |
|---|---|---|
| Efficiency, Ave. 617-698 (%) | 60 | Comply |
| Efficiency, Ave. 698-960 (%) | 90 | Comply |
| Efficiency, Ave. 1427-1695 (%) | 50 | Comply |
| Efficiency, Ave. 1695-2700 (%) | 90 | Comply |
| Efficiency, Ave. 3300-4200 (%) | 90 | Comply |
| Efficiency, Ave. 4400-6000 (%) | 60 | Comply |
| Efficiency, Ave. 6000-7125 (%) | 60 | Comply |
| Efficiency, Min.; 617-698 (%) | 50 | Comply |
| Efficiency, Min.; 698-960 (%) | 75 | Comply |
| Efficiency, Min.; 1427-1695 (%) | 50 | Comply |
| Efficiency, Min.; 1695-2700 (%) | 75 | Comply |
| Efficiency, Min.; 3300-4200 (%) | 75 | Comply |
| Efficiency, Min.; 4400-6000 (%) | 50 | Comply |
| Efficiency, Min.; 6000-7125 (%) | 50 | Comply |
| Azimuth (Horizontal) Beamwidth, deg. | 360 | Comply (ripple at theta $80^{o}$ <3 dB, average gain at theta $80^{o}$ will be optimized, goal >0dBi) |
| Polarization | Vertical | Comply |
| Nominal Impedance (Ohms) | 50 | Comply |

FIG. 22

Antenna Characteristics

| PARAMETERS | PERFORMANCE | | | | | | | | | | | | |
|---|---|---|---|---|---|---|---|---|---|---|---|---|---|
| Part No | FTRA6171M5P(B/W)x | | | | | | | | | | | | |
| Frequency Bands, MHz | 617-698 | 698-824 | 824-894 | 880-960 | 1427-1695 | 1690-1880 | 1850-1990 | 1910-2200 | 2300-2700 | 3300-4000 | 4000-4200 | 4400-6000 | 6000-7125 |
| Peak Gain, dBi (Avg.)* *** | 4.1 | 4.0 | 4.0 | 3.9 | 4.5 | 5.5 | 5.7 | 5.7 | 5.0 | 5.8 | 5.3 | 5.4 | • |
| Peak Gain, dBi * *** | 4.5 | 4.4 | 4.3 | 4.0 | 5.6 | 5.8 | 6.0 | 6.0 | 5.3 | 6.0 | 5.5 | 6.2 | • |
| VSWR, Measured* *** | < 2.3 | < 1.8 | < 1.8 | < 1.9 | < 3.8 | < 1.6 | < 1.5 | < 1.6 | < 1.6 | < 1.3 | < 1.1 | < 1.6 | < 1.5 |
| VSWR, Max (Spec.)* *** | < 2.5 | < 2.0 | < 2.0 | < 2.0 | < 4.0 | < 2.0 | < 2.0 | < 2.0 | < 2.0 | < 2.0 | < 2.0 | < 2.5 | < 3.0 |
| Nominal Impedance, Ω | 50 | | | | | | | | | | | | |
| Polarization | Linear - Horizontal | | | | | | | | | | | | |
| Azimuth Bean Width, deg | 360, Omnidirectional | | | | | | | | | | | | |
| Max Power (Ambient 25°C/77°F), watts | 617-960 MHz: 50(min)/100(target)<br>1427-6000 MHz: 20(target) | | | | | | | | | | | | |
| Mounting | P-Mount | | | | | | | | | | | | |
| Antenna Dimension (Ht x Dia), mm (inches) | 91.75 x 45 (3.61 X 1.77) | | | | | | | | | | | | |
| Weight, g | TBA | | | | | | | | | | | | |
| Antenna Color | Black/White | | | | | | | | | | | | |
| Radome | EXL9330, UL94-VO | | | | | | | | | | | | |
| Operating Temperature, °C | -30 to +70 | | | | | | | | | | | | |
| Storage Temperature, °C | -40 to +85 | | | | | | | | | | | | |
| Ingression Protection | IP67 | | | | | | | | | | | | |
| RoHS Compliance | Yes | | | | | | | | | | | | |

FIG. 23A

Performance Specifications

| SPECIFICATION | | | | | | | |
|---|---|---|---|---|---|---|---|
| Frequency Band (MHz) | 698-960 | 1427-1695 | 1695-2700 | 3300-4200 | 4400-6000 | 6000-6875 | 6875-7125 |
| VSWR, Max | <2.3 | <3.0 | <2.0 | <2.0 | <2.5 | <3.0 | |
| Peak Gain, dBi | 5 | 5.5 | 7 | 7 | 7 | 7 | 8 |
| Polanzation | Vertical | | | | | | |
| Nominal Impedence (Ohms) | 50 | | | | | | |
| Max Power-@ Ambient 25°C (W) | 50 W min. /100 W | 20 W min. | | | | | |
| Weight - kg (lbs) | 1.36 (3.0) | | | | | | |
| Connector Type | N-femate | | | | | | |
| Mounting Type | Direct Mount | | | | | | |
| Ingress Protection | IP67 | | | | | | |
| UV Rated | ASTM G155 | | | | | | |
| Operating Temperature °C (°F) | -40 to +85 (-40 to 185) | | | | | | |
| Storage Temperature °C (°F) | -40 to +85 (-40 to 185) | | | | | | |
| Humidity, % (non-Condensing) | 95% | | | | | | |
| Flammability Rating | UL94 | | | | | | |
| Material Substance Compliance | RoHS | | | | | | |
| Wind Velocity (MPH) - Operational | 100 | | | | | | |
| Wind Velocity (MPH) - Survival | 136 | | | | | | |

FIG. 23B

Radiation Pattern at 617 MHz
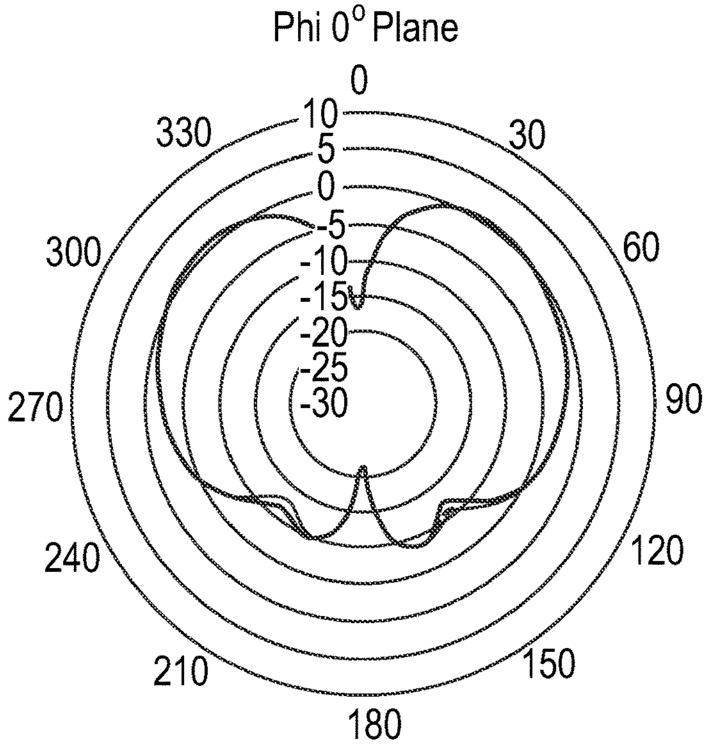
Radiation Pattern at 698 MHz
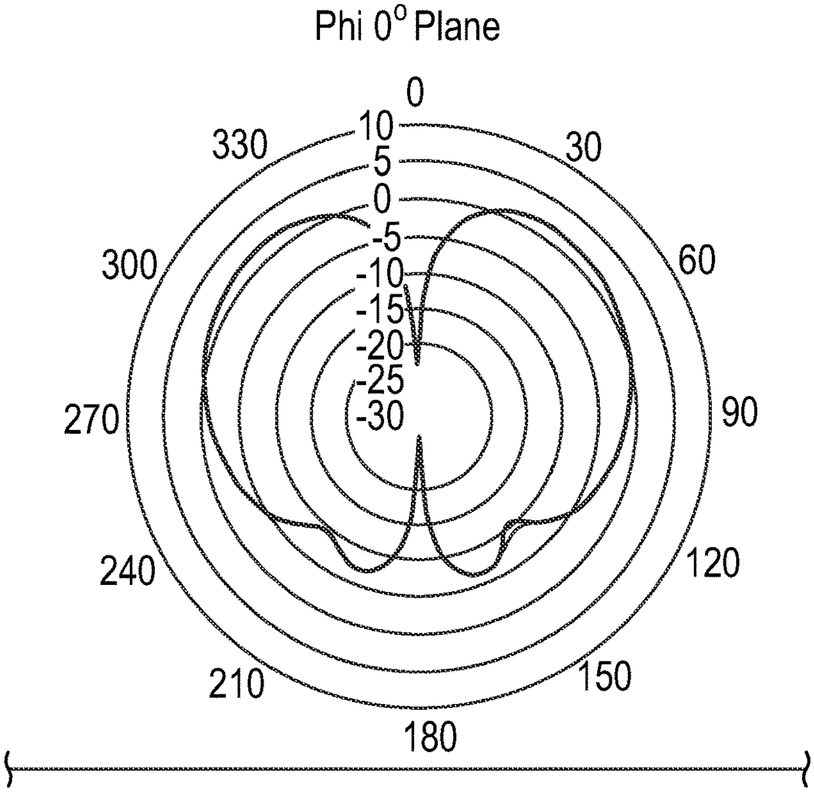
FIG. 29 CONTINUED

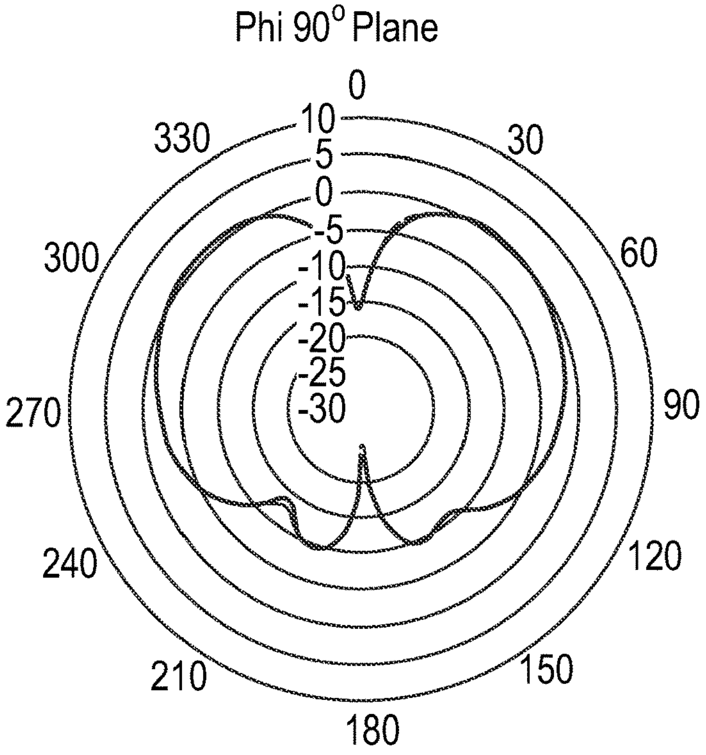
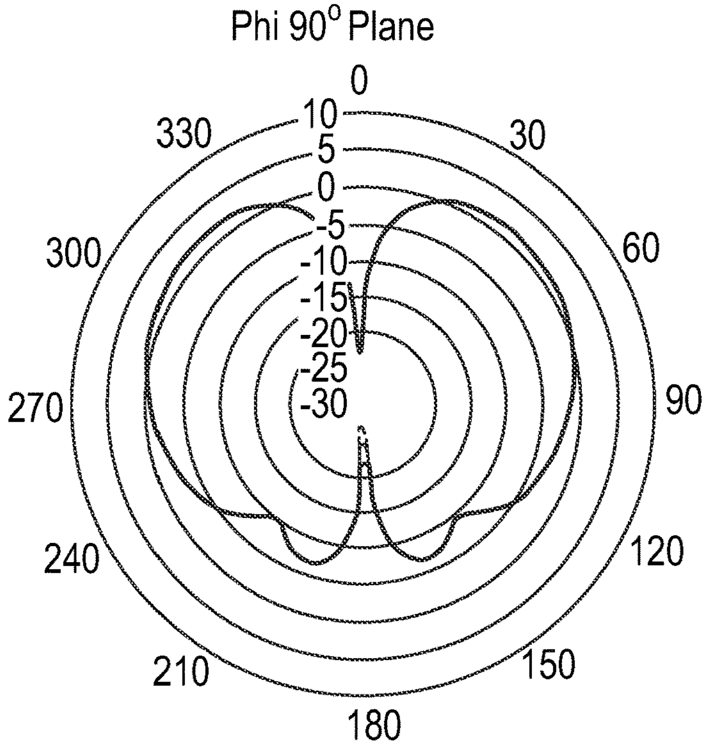
FIG. 29 CONTINUED

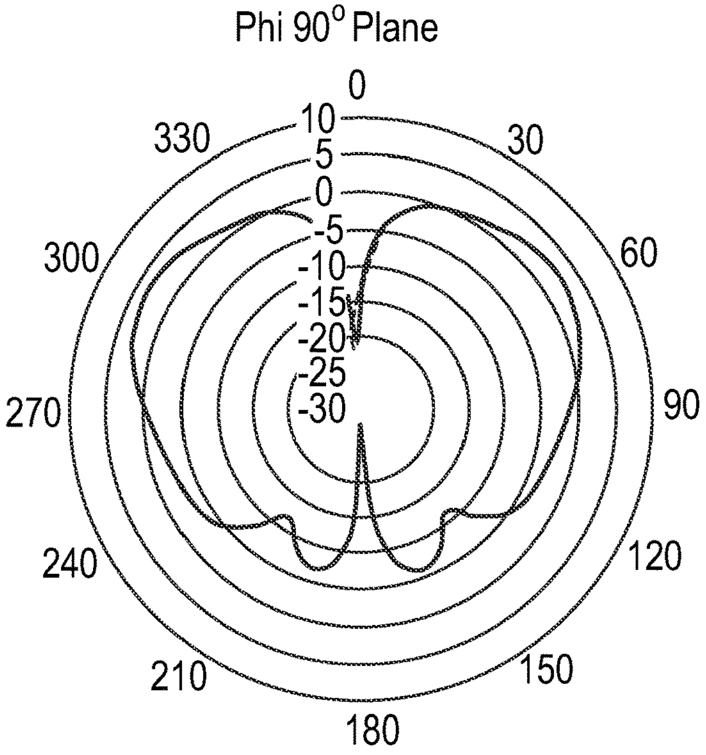
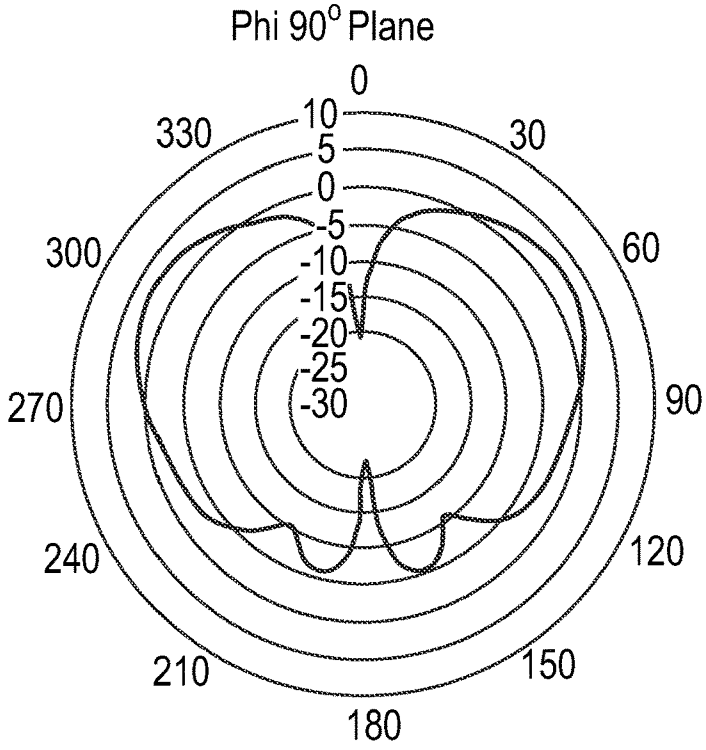
FIG. 30 CONTINUED

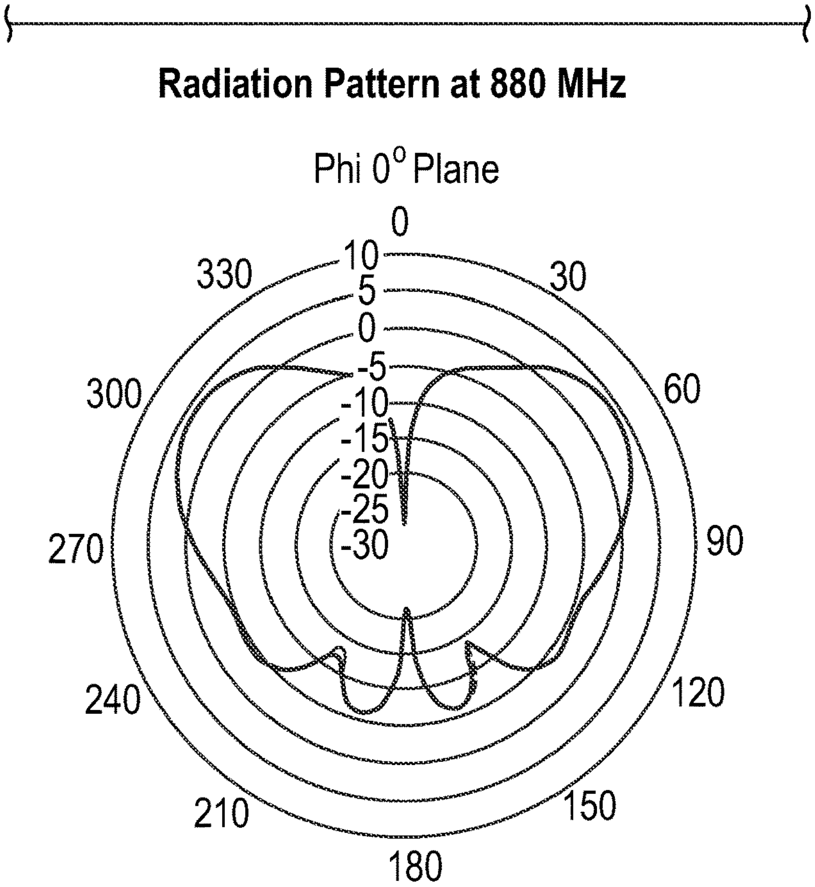
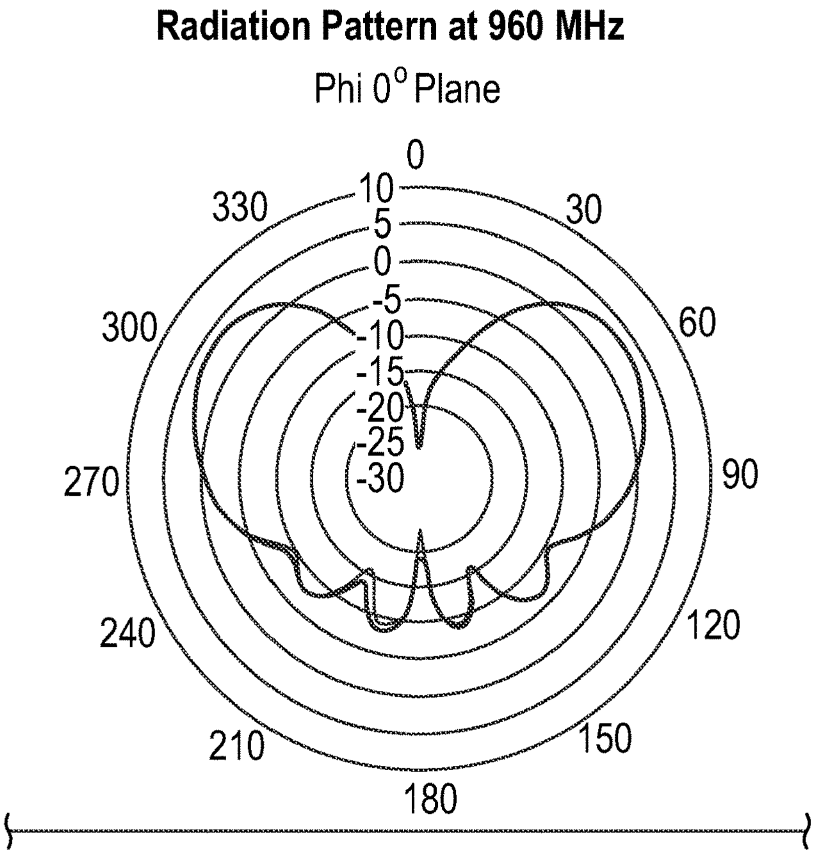
FIG. 31 CONTINUED

Radiation Pattern at 1427 MHz
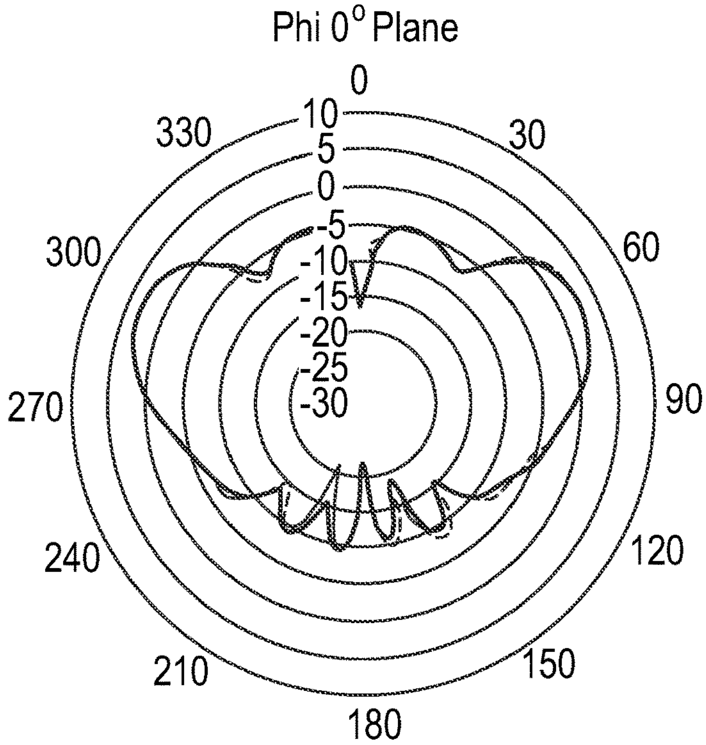
Radiation Pattern at 1690 MHz
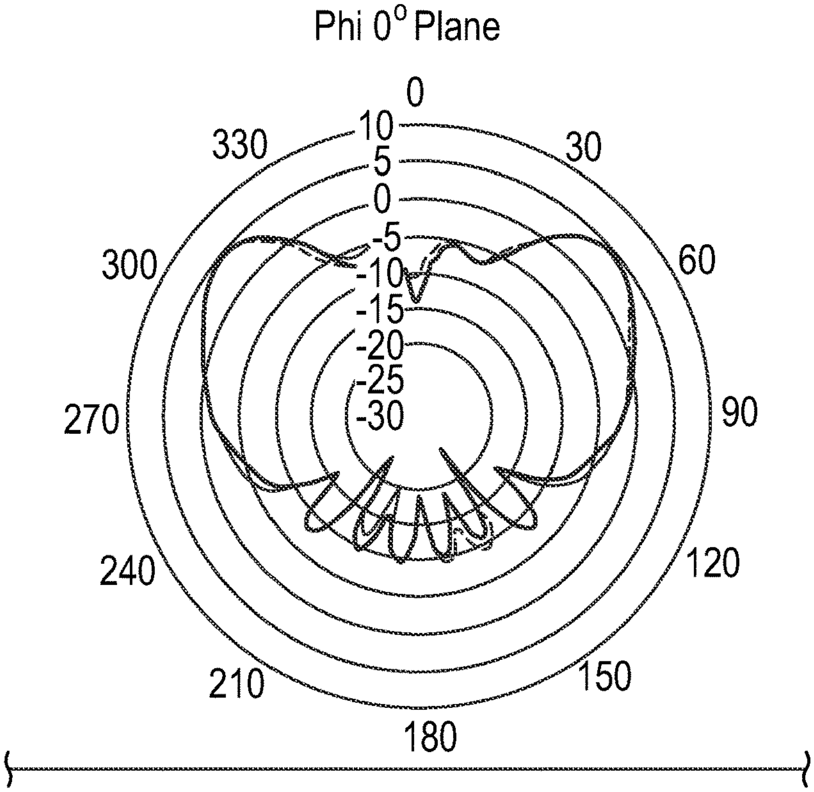
FIG. 32 CONTINUED

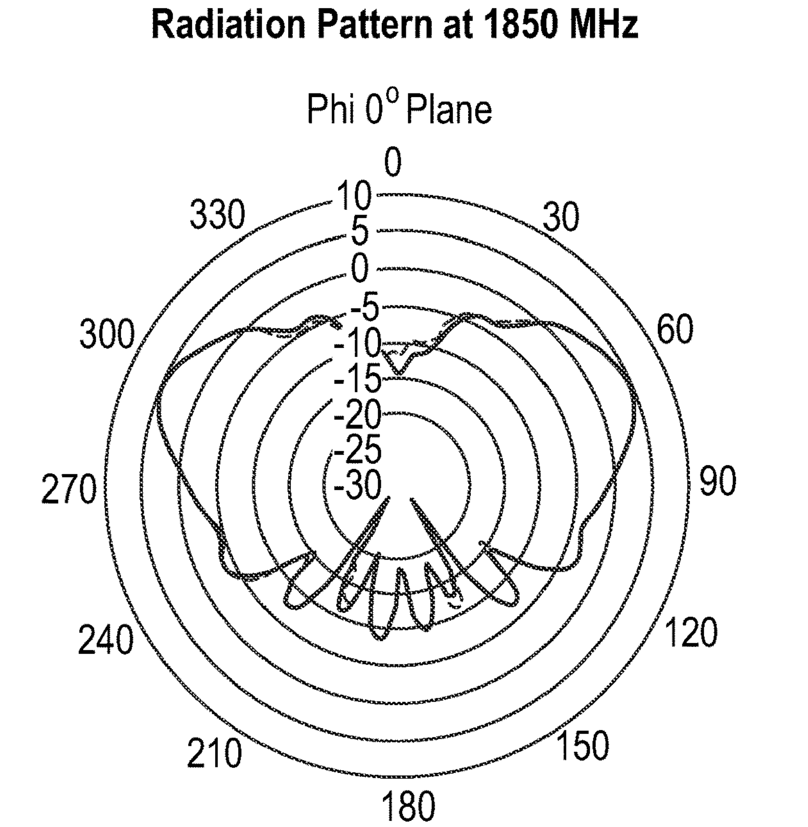
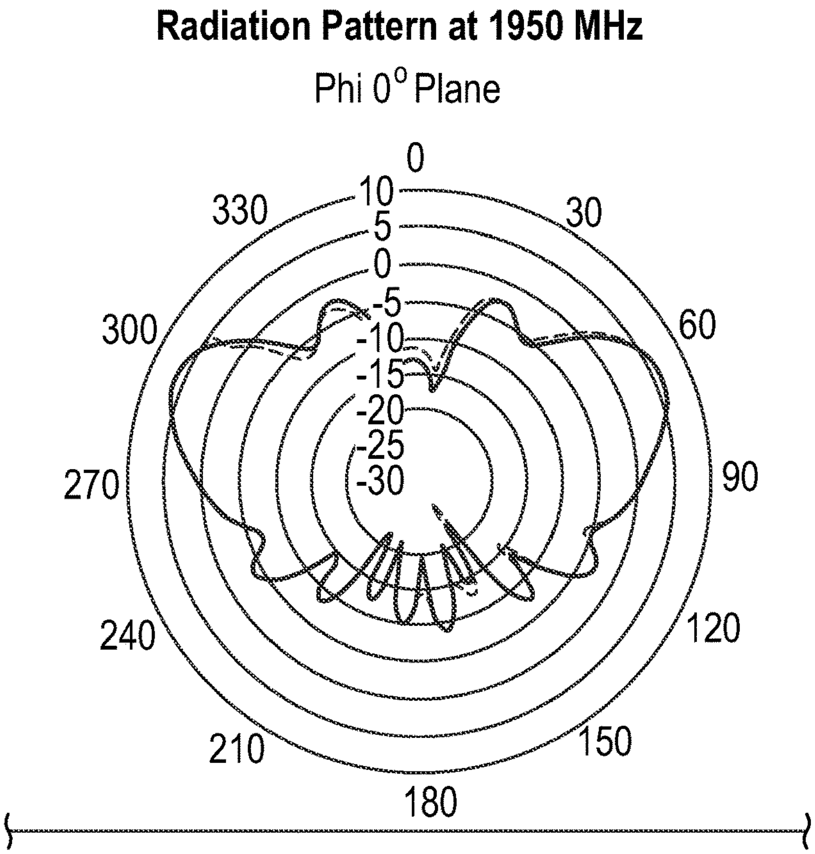
FIG. 33 CONTINUED

Radiation Pattern at 2305 MHz
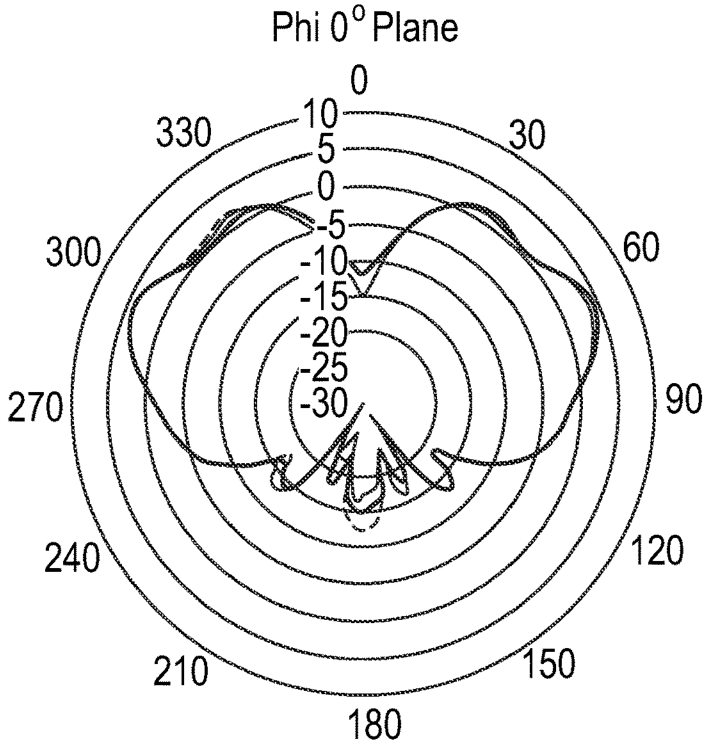
Radiation Pattern at 3300 MHz
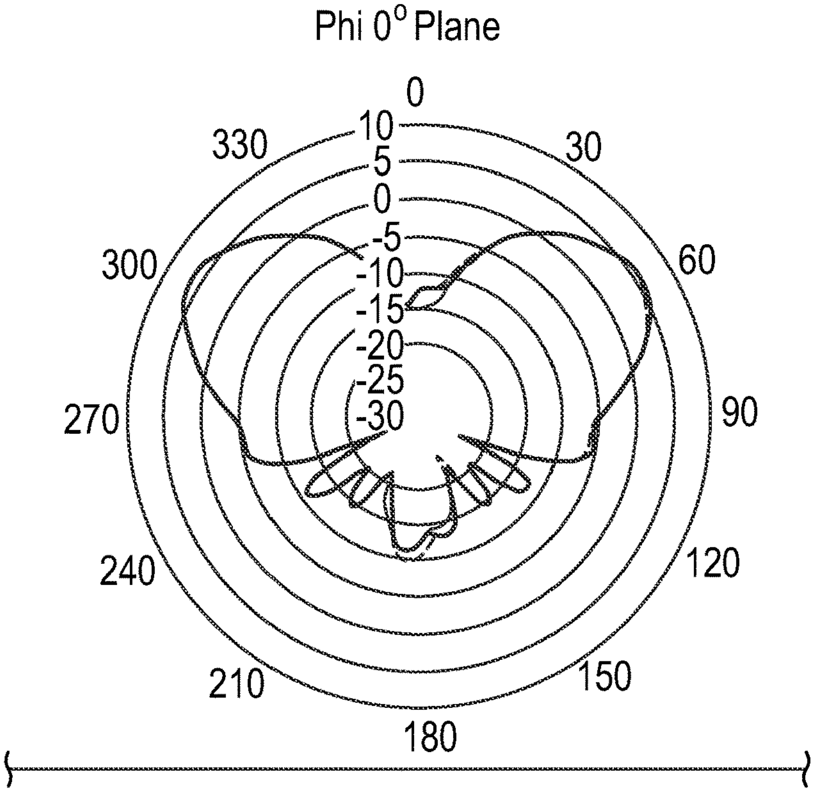
FIG. 34 CONTINUED

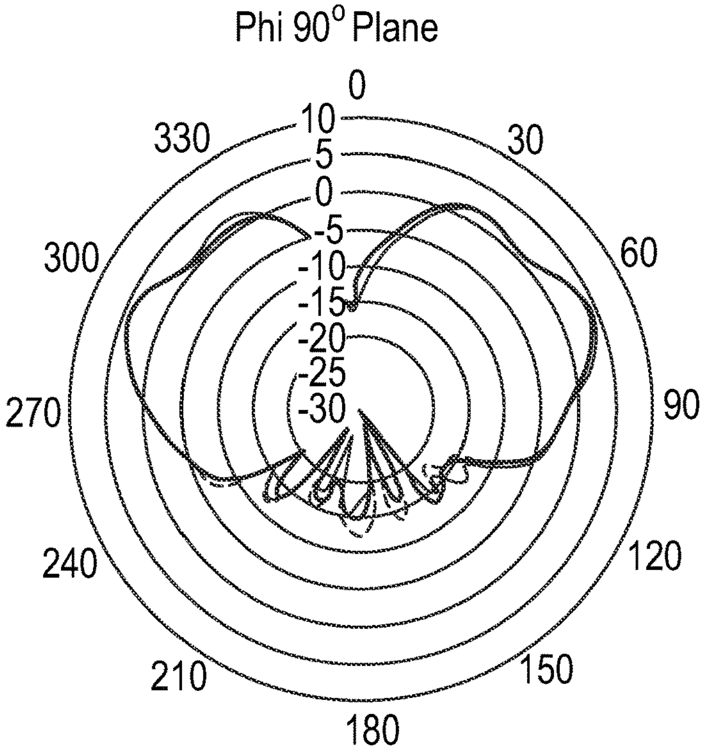
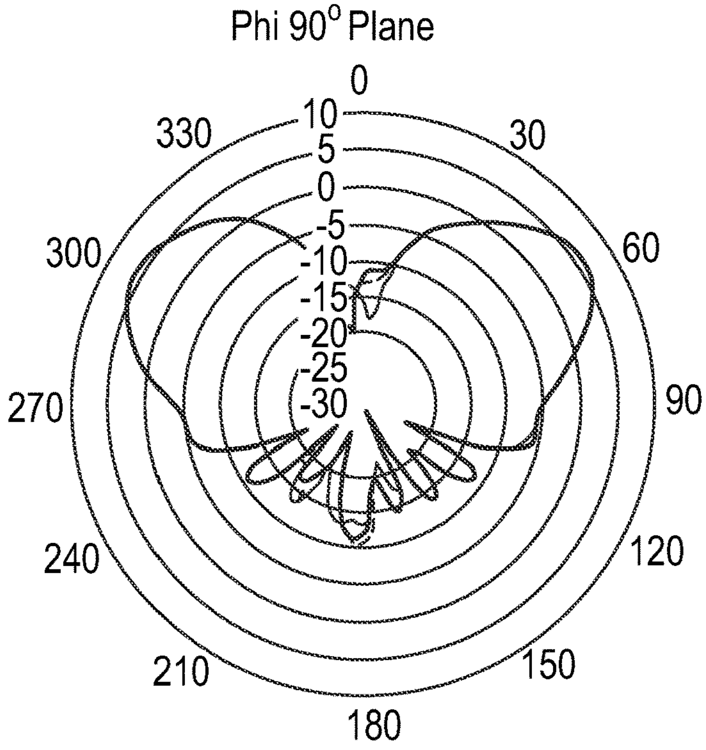
FIG. 34 CONTINUED

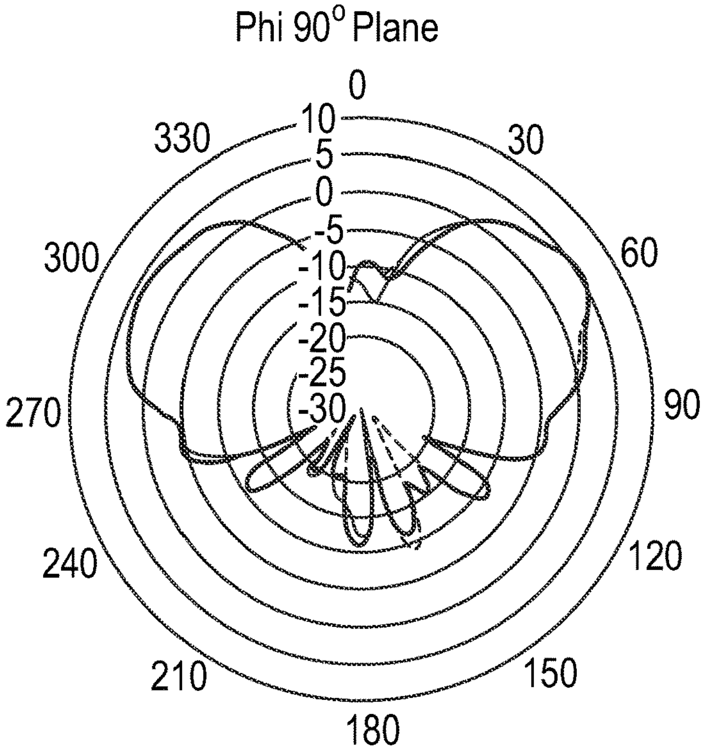
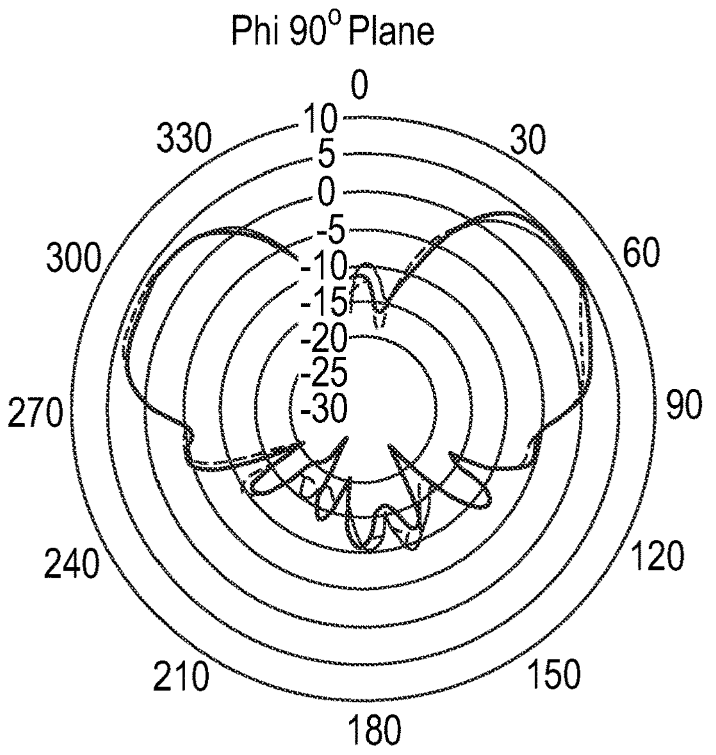
FIG. 35
CONTINUED

Radiation Pattern at 4900 MHz
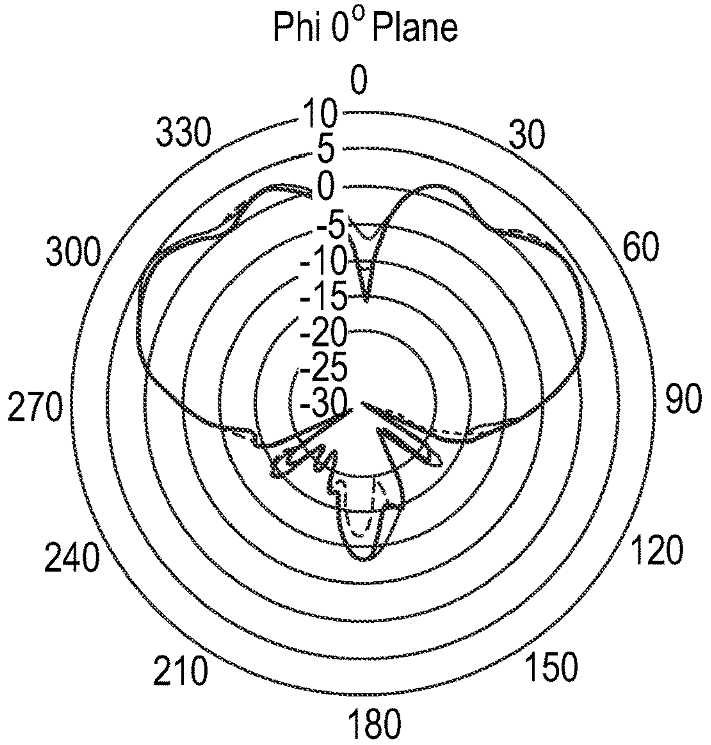
Radiation Pattern at 5950 MHz
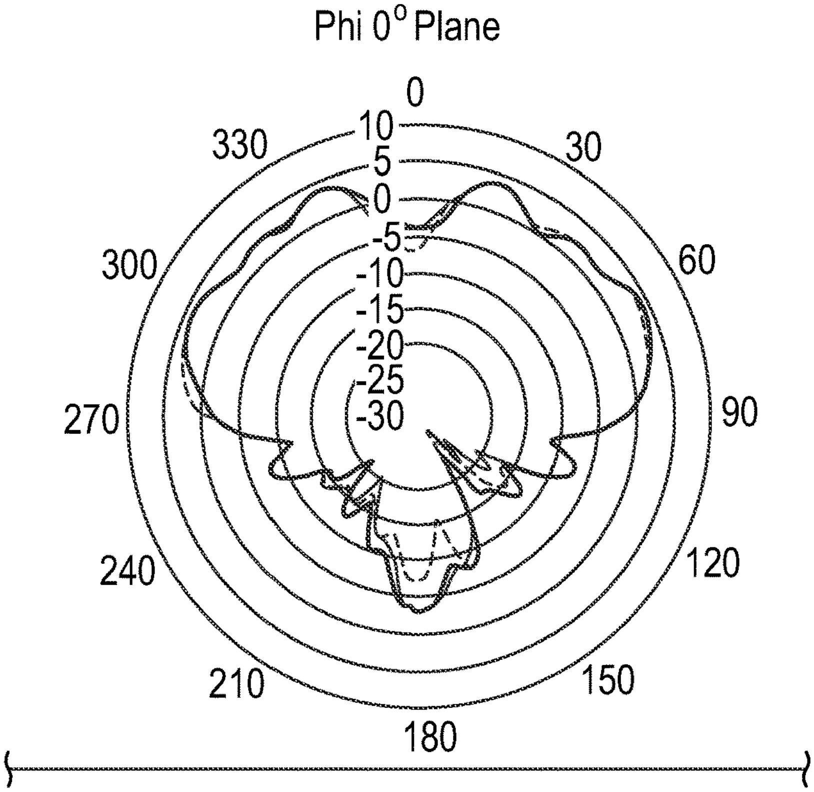
FIG. 36 CONTINUED

OMNIDIRECTIONAL ANTENNA ASSEMBLIES INCLUDING BROADBAND MONOPOLE ANTENNAS

CROSS REFERENCE TO RELATED APPLICATIONS

This application claims benefit to U.S. Provisional Application No. 63/236,117, filed 23 Aug. 2021, titled "OMNIDIRECTIONAL ANTENNA ASSEMBLIES INCLUDING BROADBAND MONOPOLE ANTENNAS", the subject matter of which is herein incorporated by reference in its entirety.

BACKGROUND

The present disclosure relates to antenna assemblies.

Antennas are useful for a variety of wireless communication devices. The antenna is operable for transmitting and/or receiving signals to/from the device. Some known antennas are omnidirectional antennas having a radiation pattern that allows for good transmission and reception from a mobile unit. Generally, an omnidirectional antenna is an antenna that radiates power generally uniformly in one plane with a directive pattern shape in a perpendicular plane. An omnidirectional antenna may be used in applications such as vehicular, public safety, and IoT installations.

BRIEF DESCRIPTION

In one embodiment, an antenna assembly is provided including an antenna base having a feed and an antenna element coupled to the antenna base. The antenna element includes a central radiating element, a first side radiating element coupled to the central radiating element, and a second side radiating element coupled to the central radiating element. The central radiating element, the first side radiating element, and the second side radiating element form a cross shaped antenna structure extending along a central antenna axis. The central radiating element, the first side radiating element, and the second side radiating element having radial symmetry about the central antenna axis for high omni-directional conformance.

In one embodiment, an antenna element is provided and includes a central radiating element having a main panel extending between a top and a bottom of the central radiating element. The main panel of the central radiating element has a first side and a second side. The main panel of the central radiating element has a feed portion at the bottom and a resonator portion at the top. The main panel of the central radiating element has an aperture between the feed portion and the resonator portion of the central radiating element. The central radiating element includes a front wing extending from a front edge of the main panel. The front wing is oriented transverse to the main panel of the central radiating element. The central radiating element includes a rear wing extending from a rear edge of the main panel. The rear wing is oriented transverse to the main panel of the central radiating element. The antenna element includes a first side radiating element coupled to the first side of the central radiating element. The first side radiating element has a main panel extending between a top and a bottom of the first side radiating element. The main panel of the first side radiating element has a feed portion at the bottom and a resonator portion at the top. The main panel of the first side radiating element has an aperture between the feed portion and the resonator portion of the of the first side radiating element. The first side radiating element includes a first side wing extending from a first side edge of the main panel. The first side wing is oriented transverse to the main panel of the first side radiating element. The antenna element includes a second side radiating element coupled to the second side of the central radiating element. The second side radiating element has a main panel extending between a top and a bottom of the second side radiating element. The main panel of the second side radiating element has a feed portion at the bottom and a resonator portion at the top. The main panel of the second side radiating element has an aperture between the feed portion and the resonator portion of the of the second side radiating element. The second side radiating element includes a second side wing extending from a second side edge of the main panel. The second side wing is oriented transverse to the main panel of the second side radiating element. The central radiating element, the first side radiating element, and the second side radiating element form a cross shaped antenna structure.

In another embodiment, an antenna assembly is provided and includes a radome having a cavity. The antenna assembly includes an antenna base having a feed. The antenna assembly includes an antenna element received in the cavity of the radome. The antenna element includes a central radiating element, a first side radiating element coupled to the central radiating element, and a second side radiating element coupled to the central radiating element. The central radiating element. The first side radiating element, and the second side radiating element form a cross shaped antenna structure form a cross shaped antenna structure coupled to the feed of the antenna base. The central radiating element has a main panel extending between a top and a bottom of the central radiating element. The main panel of the central radiating element has a first side and a second side. The main panel of the central radiating element has a feed portion at the bottom coupled to the antenna base and a resonator portion at the top. The main panel of the central radiating element has an aperture between the feed portion and the resonator portion of the central radiating element. The central radiating element includes a front wing extending from a front edge of the main panel. The front wing is oriented transverse to the main panel of the central radiating element. The central radiating element includes a rear wing extending from a rear edge of the main panel. The rear wing is oriented transverse to the main panel of the central radiating element. The first side radiating element coupled to the first side of the central radiating element. The first side radiating element has a main panel extending between a top and a bottom of the first side radiating element. The main panel of the first side radiating element has a feed portion at the bottom coupled to the antenna base and a resonator portion at the top. The main panel of the first side radiating element has an aperture between the feed portion and the resonator portion of the of the first side radiating element. The first side radiating element includes a first side wing extending from a first side edge of the main panel. The first side wing is oriented transverse to the main panel of the first side radiating element. The second side radiating element coupled to the second side of the central radiating element. The second side radiating element has a main panel extending between a top and a bottom of the second side radiating element. The main panel of the second side radiating element has a feed portion at the bottom coupled to the antenna base and a resonator portion at the top. The main panel of the second side radiating element has an aperture between the feed portion and the resonator portion of the of the second side radiating element. The second side radiating element includes a second side wing extending from a second side edge of the main panel. The second side wing is oriented transverse to the main panel of the second side radiating element.

In another embodiment, an antenna assembly is provided and includes a radome having a cavity. The antenna assembly includes an antenna base having a connector body includes a bore. The antenna base has an insulator received in the bore. The insulator includes an insulator bore. The antenna base includes a feed received in the insulator bore. The connector body is electrically grounded. The insulator isolating the feed from the connector body. The antenna assembly includes an antenna element received in the cavity of the radome. The antenna element includes a central radiating element, a first side radiating element coupled to the central radiating element, and a second side radiating element coupled to the central radiating element. The central radiating element. The first side radiating element, and the second side radiating element form a cross shaped antenna structure form a cross shaped antenna structure coupled to the feed of the antenna base. The central radiating element has a main panel extending between a top and a bottom of the central radiating element. The main panel of the central radiating element has a first side and a second side. The main panel of the central radiating element has a feed portion at the bottom coupled to the antenna base and a resonator portion at the top. The main panel of the central radiating element has an aperture between the feed portion and the resonator portion of the central radiating element. The central radiating element includes a front wing extending from a front edge of the main panel. The front wing is oriented transverse to the main panel of the central radiating element. The central radiating element includes a rear wing extending from a rear edge of the main panel. The rear wing is oriented transverse to the main panel of the central radiating element. The first side radiating element coupled to the first side of the central radiating element. The first side radiating element has a main panel extending between a top and a bottom of the first side radiating element. The main panel of the first side radiating element has a feed portion at the bottom coupled to the antenna base and a resonator portion at the top. The main panel of the first side radiating element has an aperture between the feed portion and the resonator portion of the of the first side radiating element. The first side radiating element includes a first side wing extending from a first side edge of the main panel. The first side wing is oriented transverse to the main panel of the first side radiating element. The second side radiating element coupled to the second side of the central radiating element. The second side radiating element has a main panel extending between a top and a bottom of the second side radiating element. The main panel of the second side radiating element has a feed portion at the bottom coupled to the antenna base and a resonator portion at the top. The main panel of the second side radiating element has an aperture between the feed portion and the resonator portion of the of the second side radiating element. The second side radiating element includes a second side wing extending from a second side edge of the main panel. The second side wing is oriented transverse to the main panel of the second side radiating element.

DRAWINGS

The drawings described herein are for illustrative purposes only of selected embodiments and not all possible implementations, and are not intended to limit the scope of the present disclosure in any way.

Figure 2:
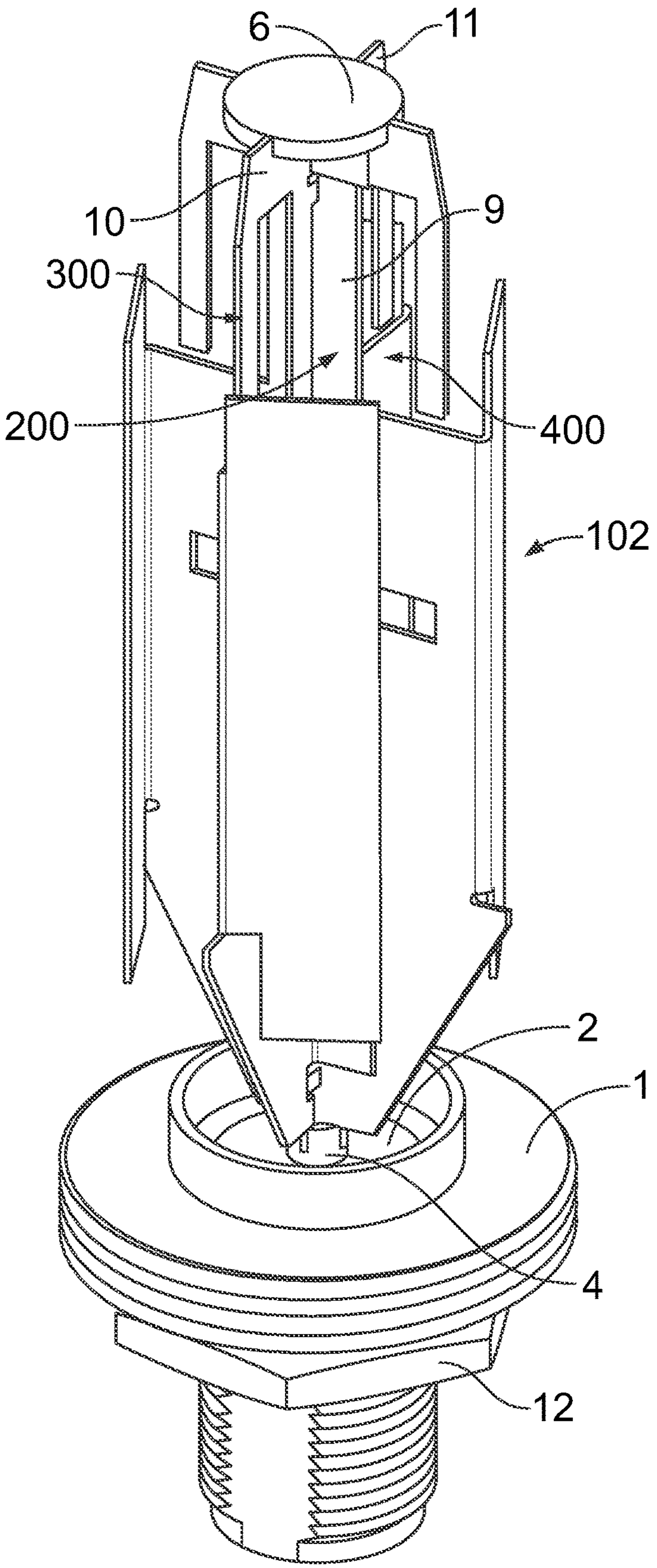
FIG. 2 is an assembled view of the antenna assembly in accordance with an exemplary embodiment.
Figure 4A:
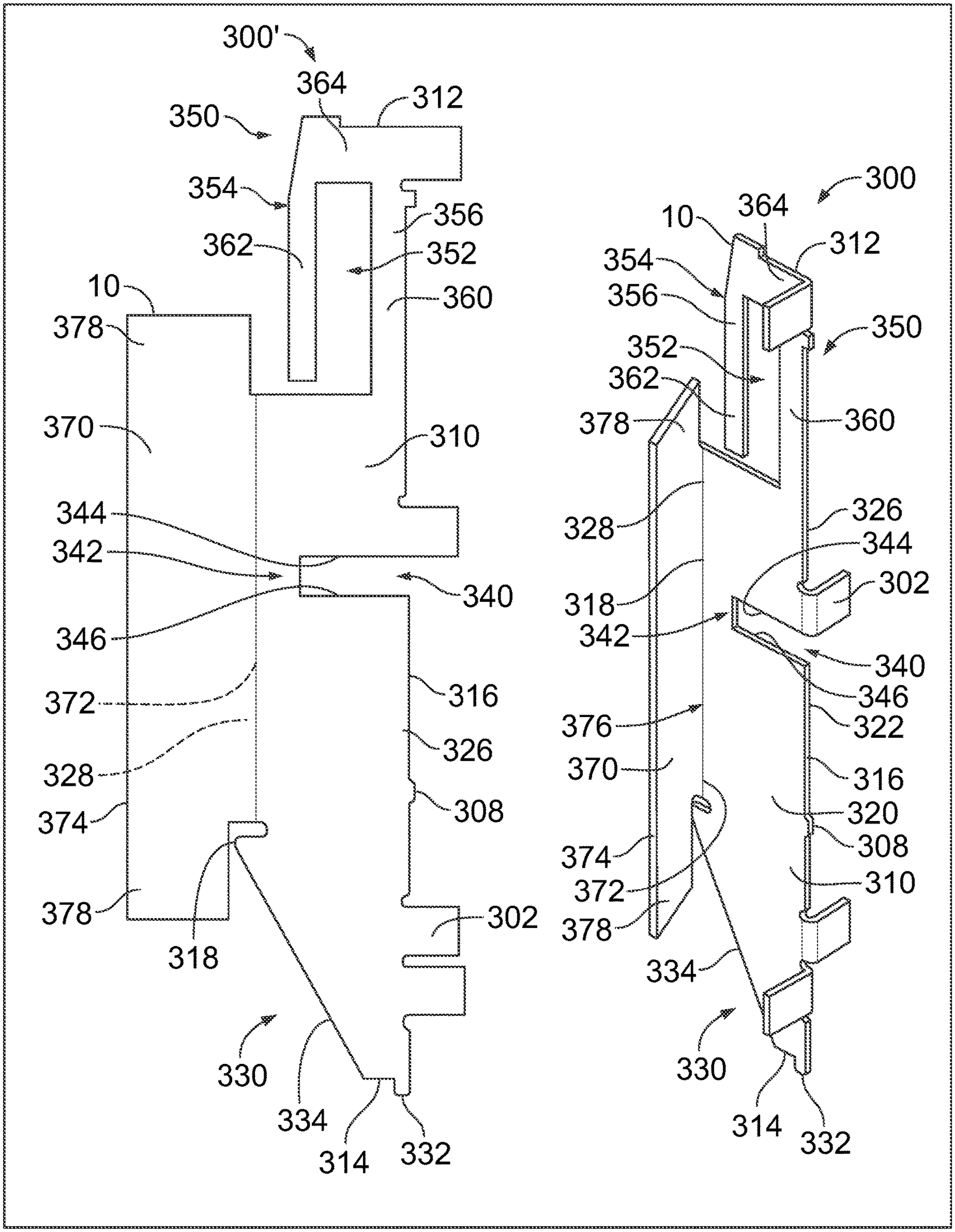
Figure 4B:
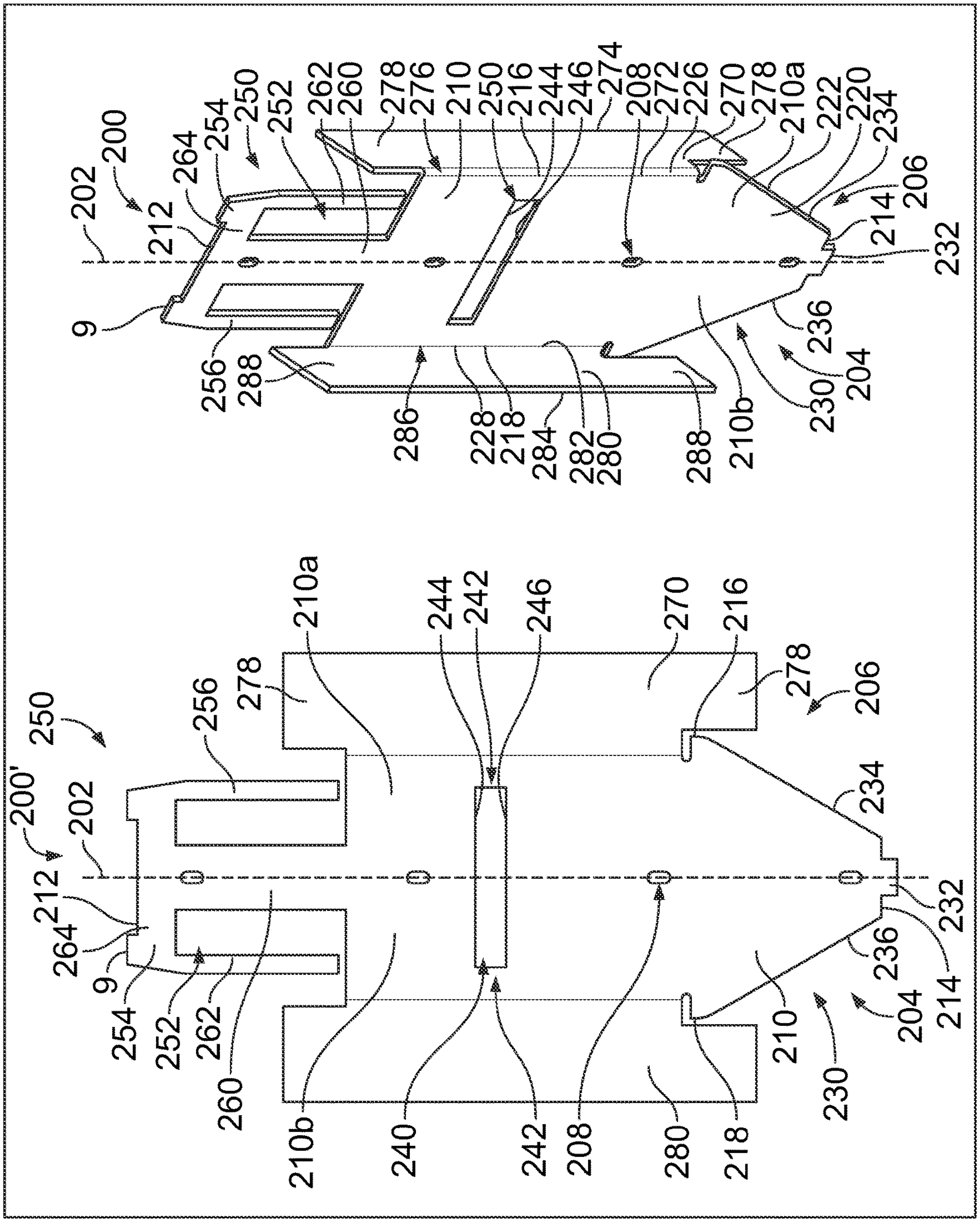
Figure 4C:
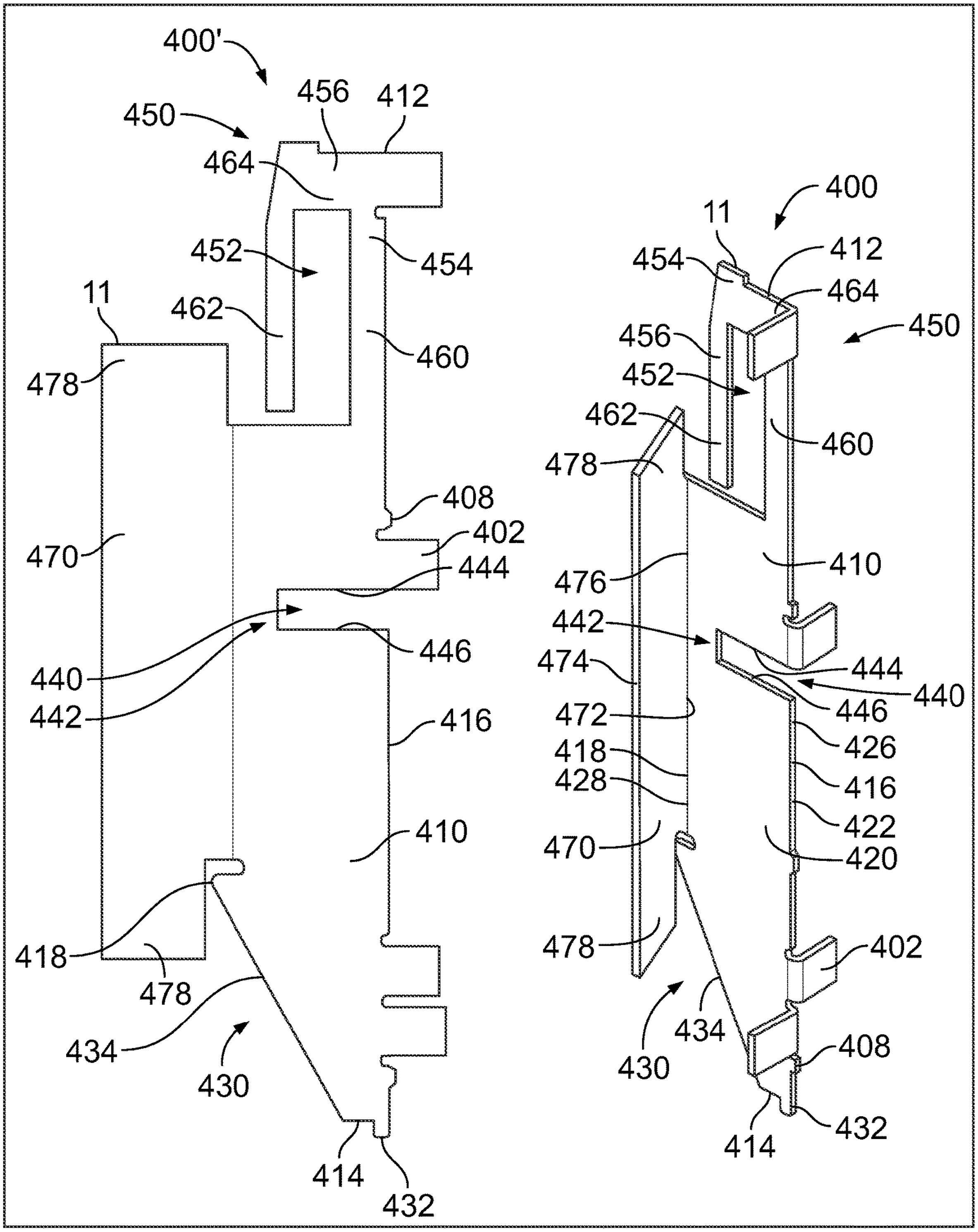

FIGS. 4A, 4B, and 4C respectively illustrate flat patterns and folded configurations of the first side radiating element, the central radiating element, and the second side radiating element, respectively, corresponding to the antenna element shown in FIG. 2 in accordance with an exemplary embodiment.

Figure 4D:
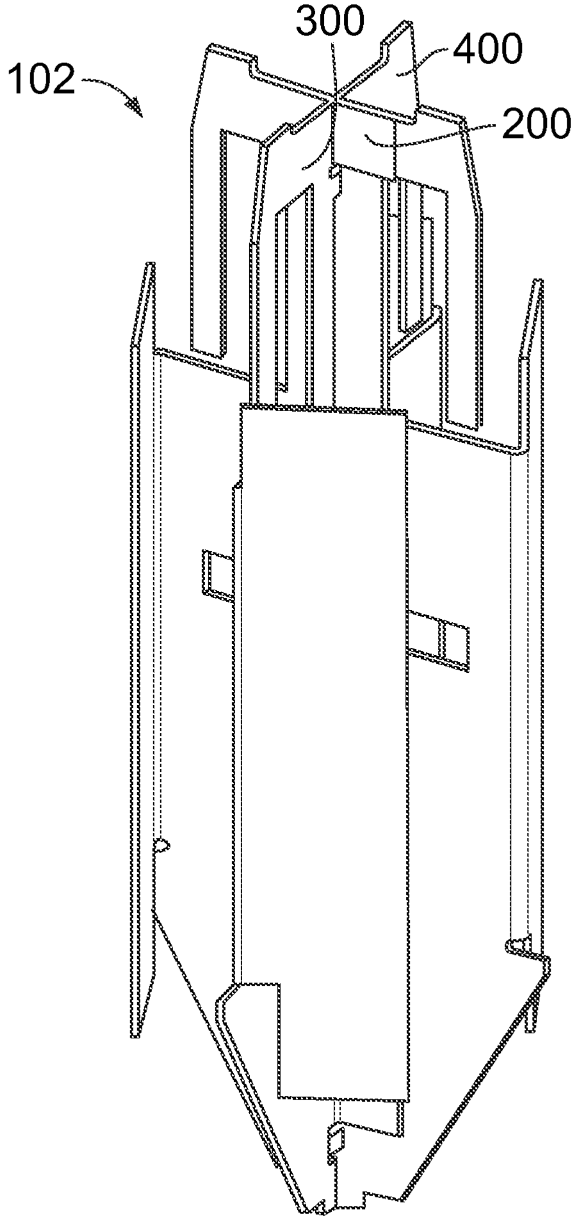

FIG. 4D illustrates the antenna element with the radiating elements after being assembled into a broadband rugged monopole antenna element, corresponding to the antenna element shown in FIG. 2 in accordance with an exemplary embodiment.

Figure 1:
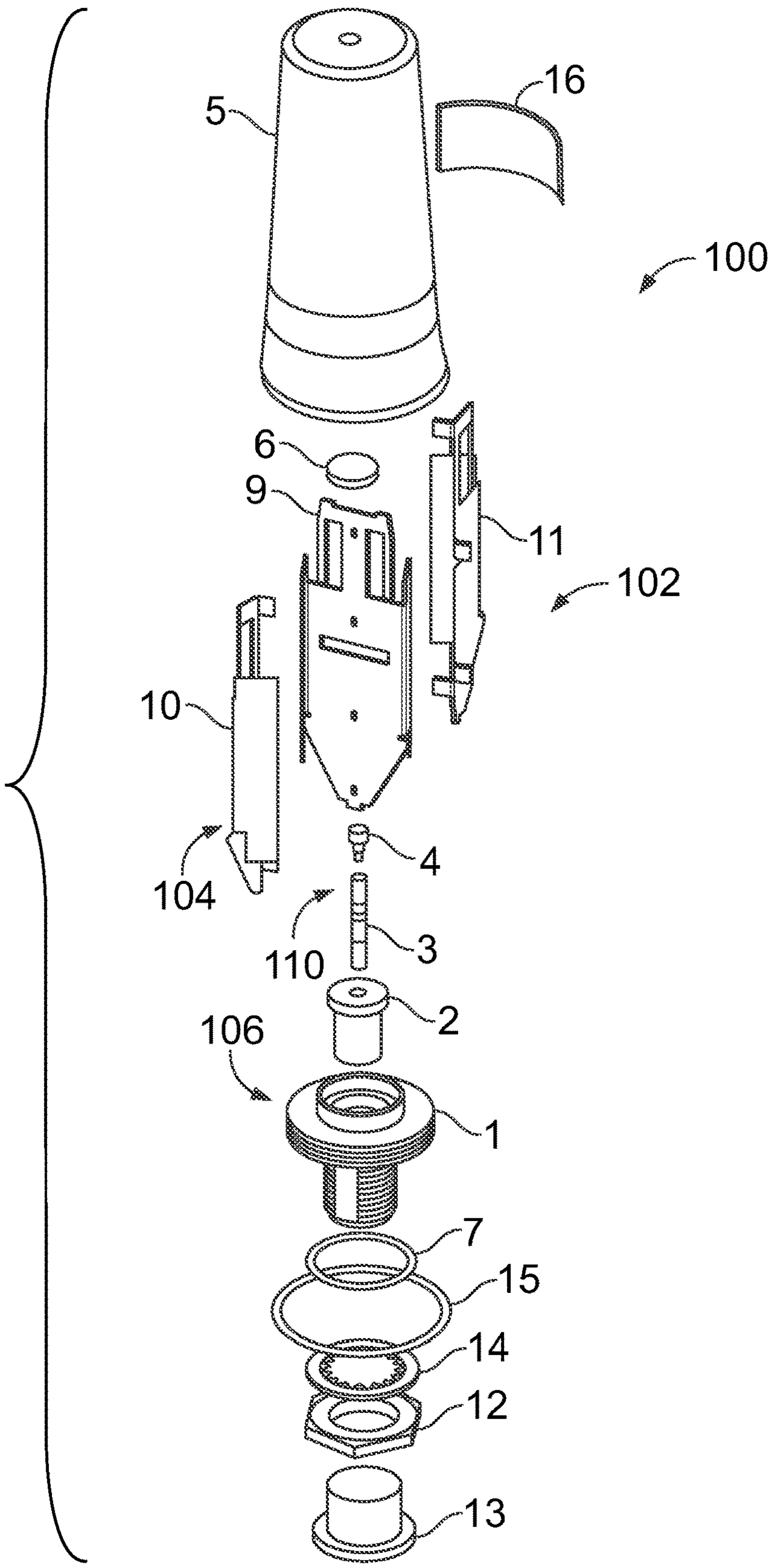
FIG. 1 is an exploded view of the antenna assembly in accordance with an exemplary embodiment.
Figure 5C:
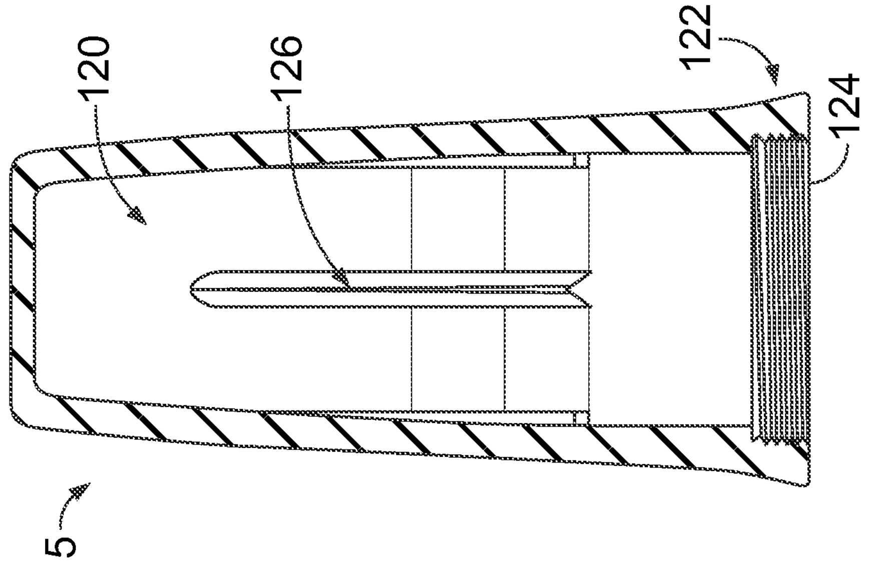
Figure 5B:
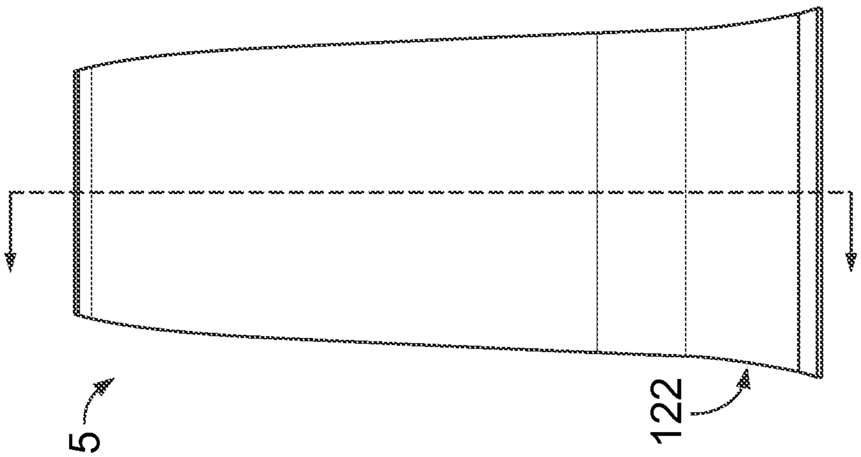
Figure 5A:
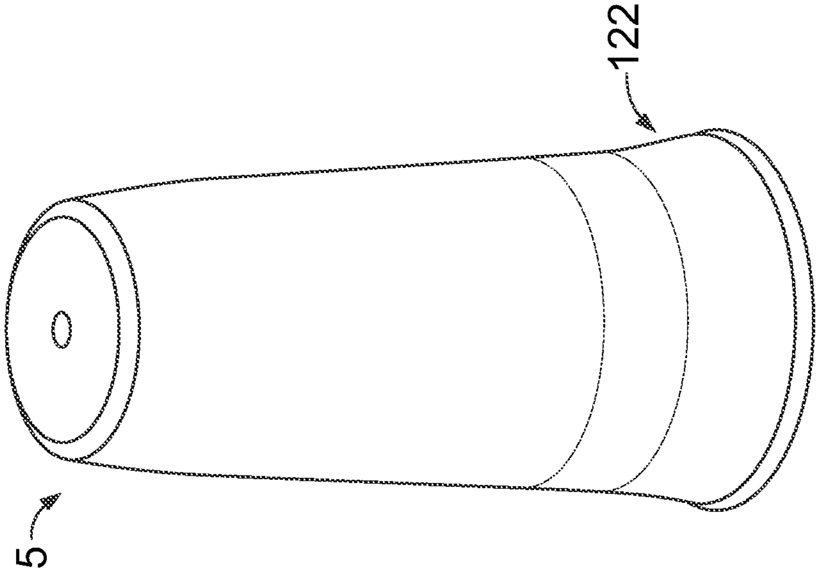

FIG. 5A is a perspective view of the radome of the antenna assembly shown in FIG. 1 in accordance with an exemplary embodiment.

FIG. 5B is a side view of the radome of the antenna assembly shown in FIG. 1 in accordance with an exemplary embodiment.

FIG. 5C is a cross-sectional view of the radome of the antenna assembly shown in FIG. 1 in accordance with an exemplary embodiment.

Figure 6:
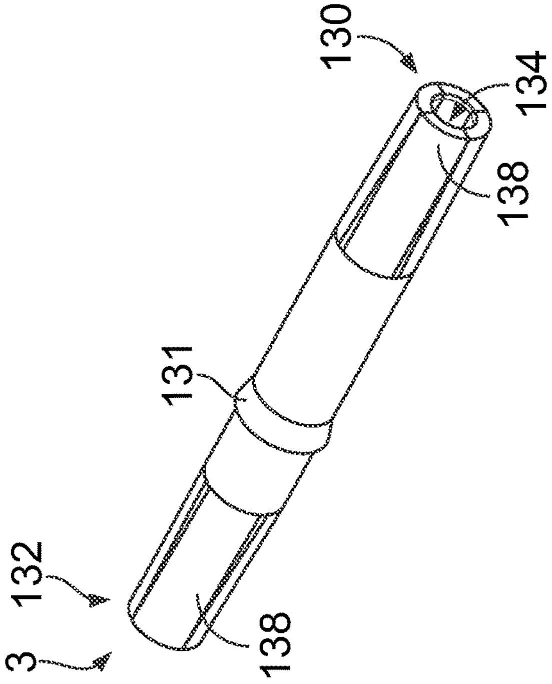

FIG. 6 is a perspective view of the center pin of the antenna assembly as shown in FIG. 1 in accordance with an exemplary embodiment.

Figure 7A:
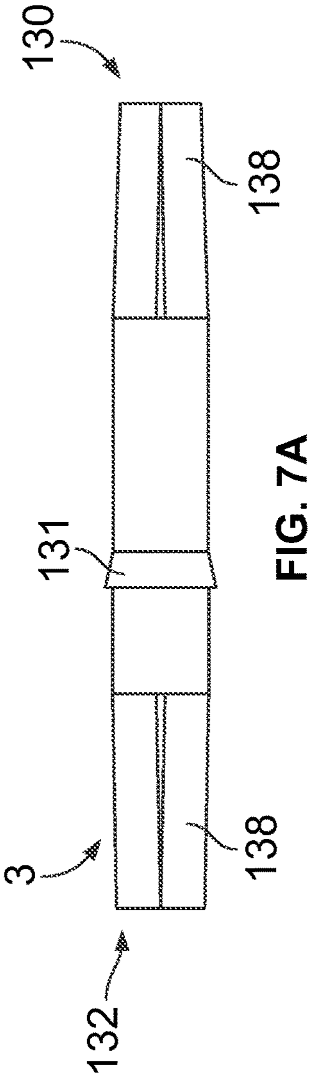

FIG. 7A is a side view of the center pin of the antenna assembly as shown in FIG. 1 in accordance with an exemplary embodiment.

Figure 7B:
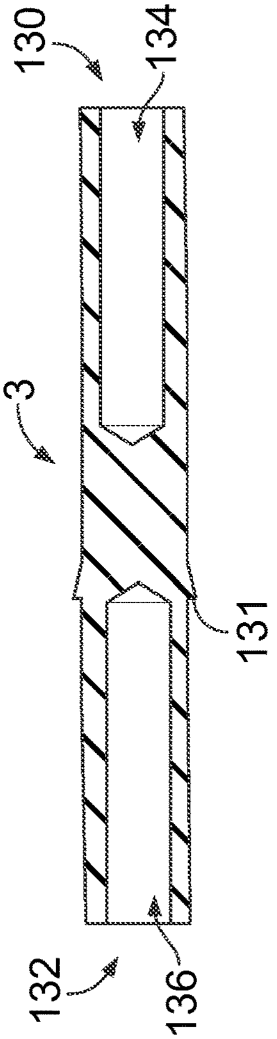

FIG. 7B is a cross-sectional view of the center pin of the antenna assembly as shown in FIG. 1 in accordance with an exemplary embodiment.

Figure 8:
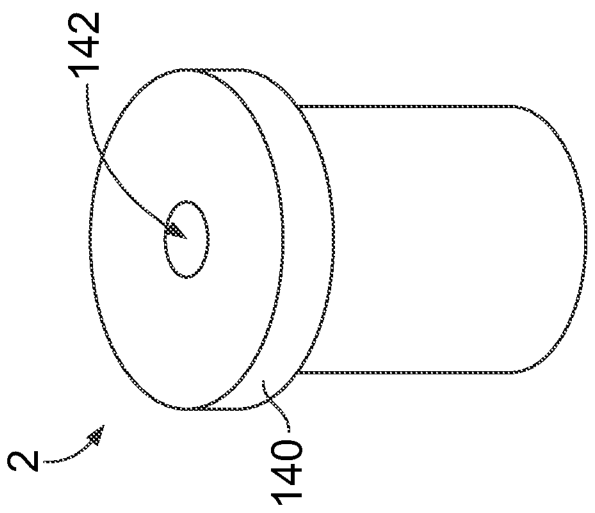

FIG. 8 is a perspective view of the electrical insulator of the antenna assembly as shown in FIG. 1 in accordance with an exemplary embodiment.

Figure 9:
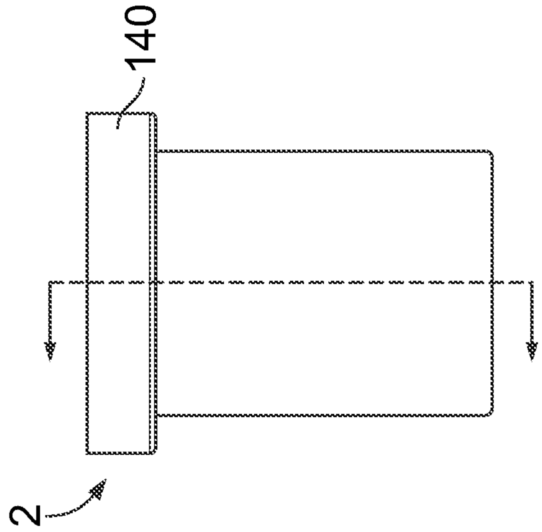

FIG. 9 is a side view of the electrical insulator of the antenna assembly as shown in FIG. 1 in accordance with an exemplary embodiment.

Figure 10:
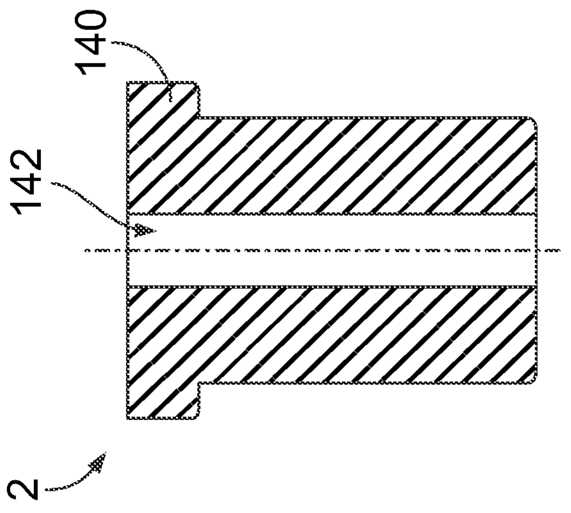

FIG. 10 is a cross-sectional view of the electrical insulator of the antenna assembly as shown in FIG. 1 in accordance with an exemplary embodiment.

Figure 11:
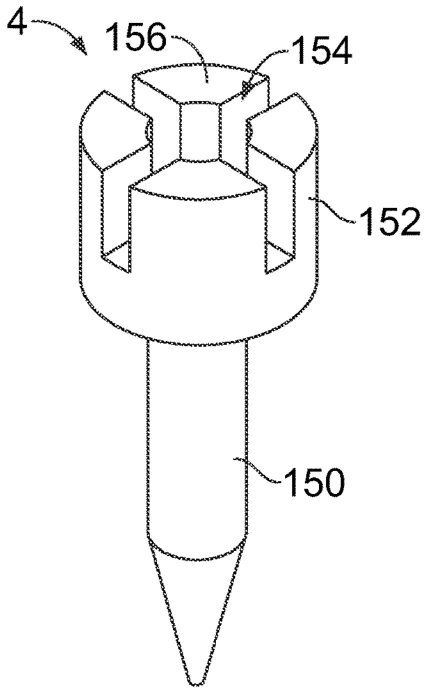

FIG. 11 is a perspective view of the contact pin of the antenna assembly shown in FIG. 1 in accordance with an exemplary embodiment.

Figure 12:
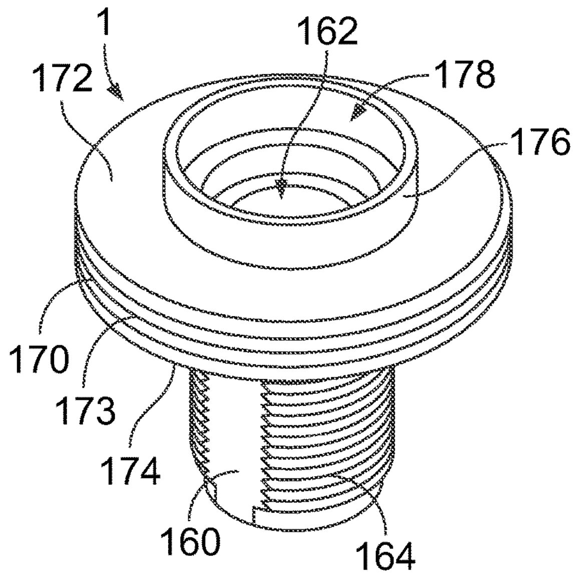

FIG. 12 is a perspective view of the connector body of the antenna assembly shown in FIG. 1 in accordance with an exemplary embodiment.

Figure 13:
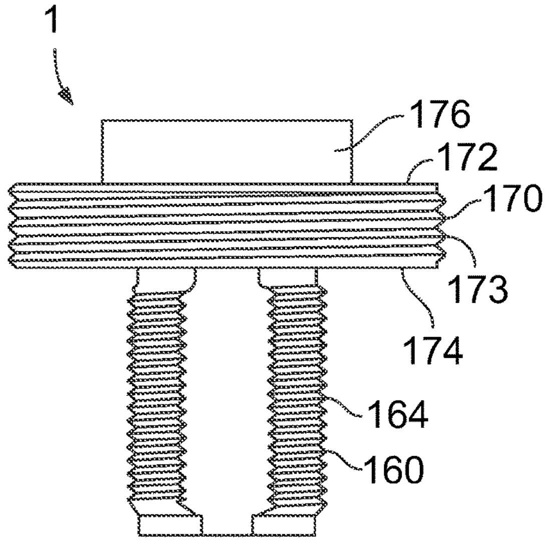

FIG. 13 is a side view of the connector body of the antenna assembly in accordance with an exemplary embodiment.

Figure 14:
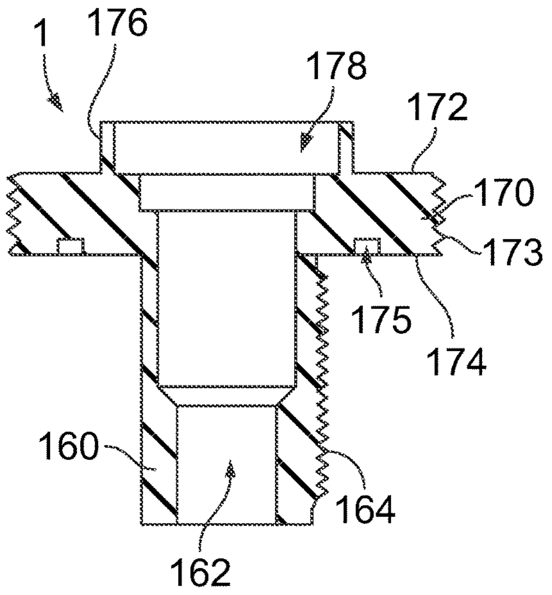

FIG. 14 is a cross-sectional view of the connector body of the antenna assembly in accordance with an exemplary embodiment.

Figure 15:
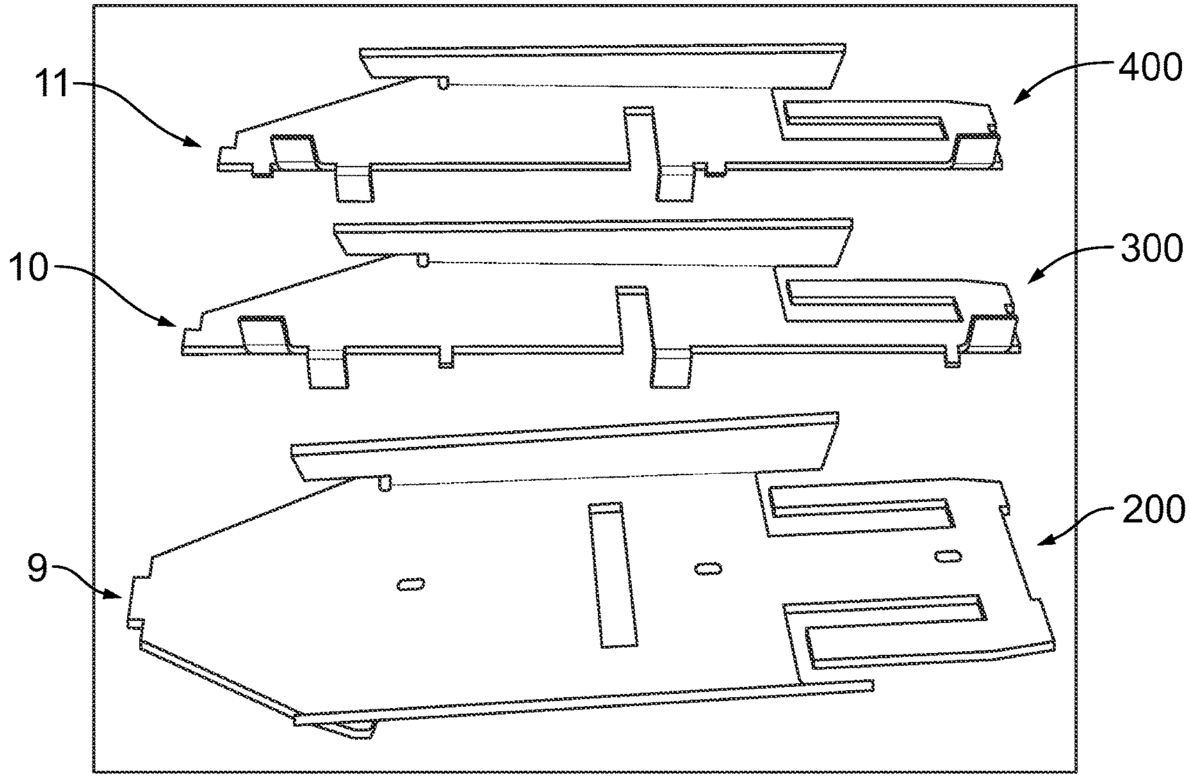

FIG. 15 illustrates the first side radiating element, the central radiating element, and the second side radiating element corresponding to the antenna element shown in FIG. 2 in accordance with an exemplary embodiment.

Figure 16:
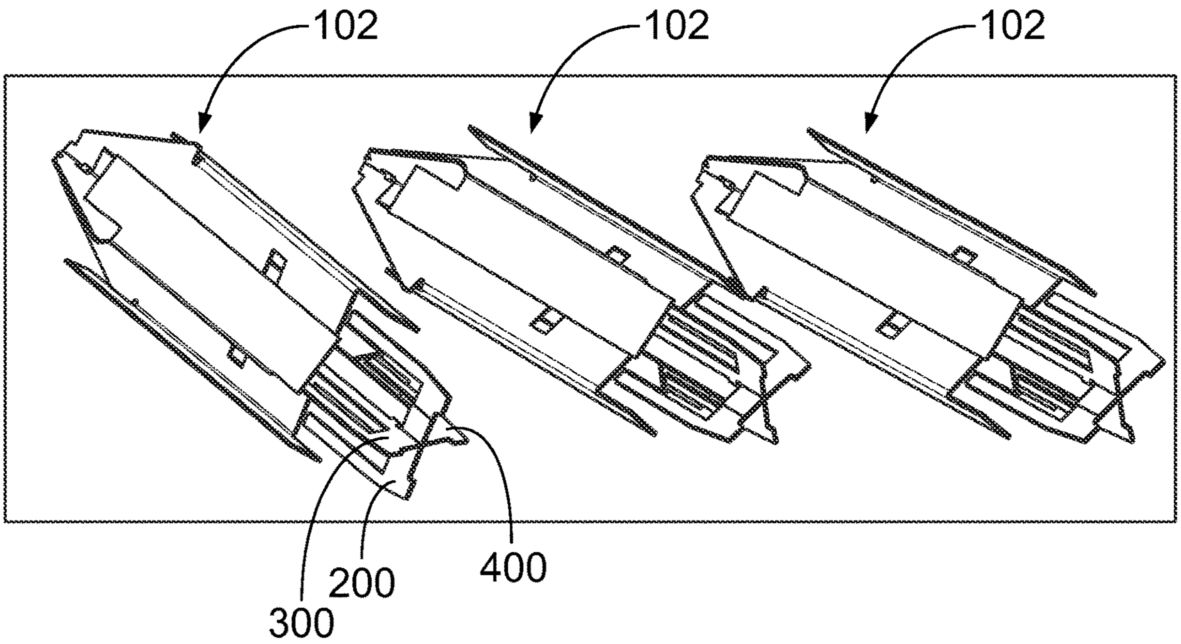

FIG. 16 illustrates perspective views of the antenna elements with the radiating elements after being assembled (for example, soldered, spot welded, and the like) into a broadband rugged monopole antenna element, corresponding to the antenna element shown in FIG. 2 in accordance with an exemplary embodiment.

Figure 17:
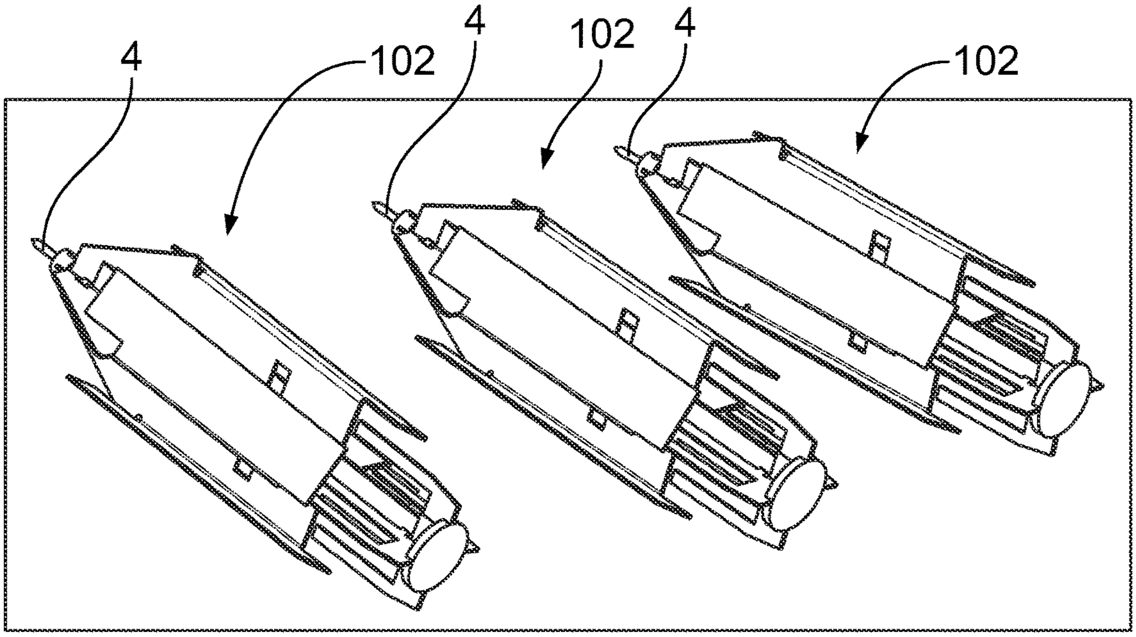

FIG. 17 illustrates perspective views of the antenna elements connected to the corresponding contact pins in accordance with an exemplary embodiment.

Figure 18A:
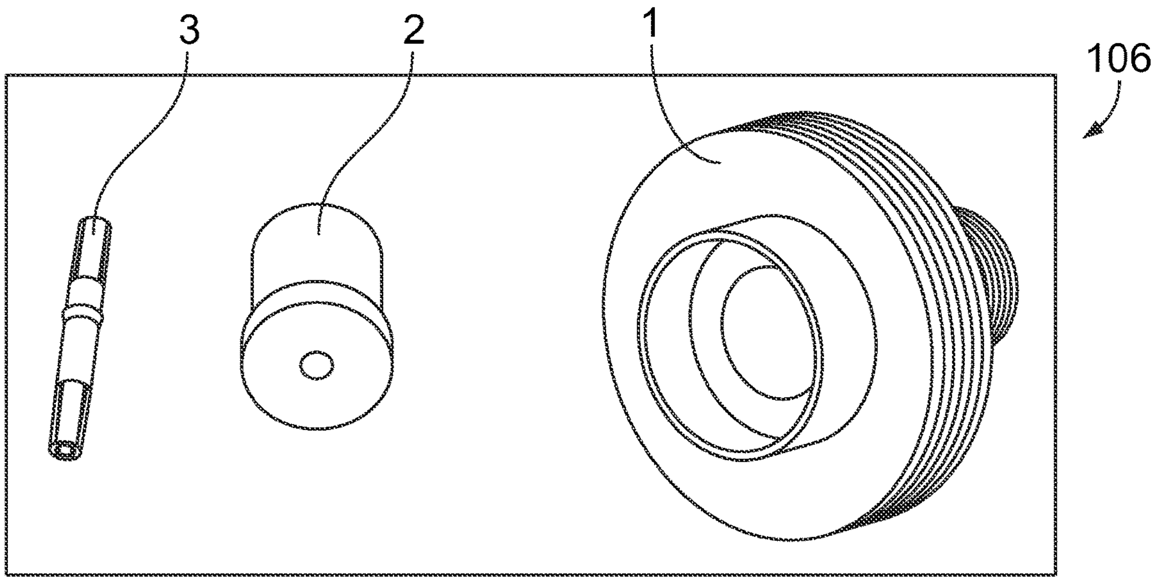

FIG. 18A is an exploded view of the antenna base showing the connector body, the insulator and the center pin in accordance with an exemplary embodiment.

Figure 18B:
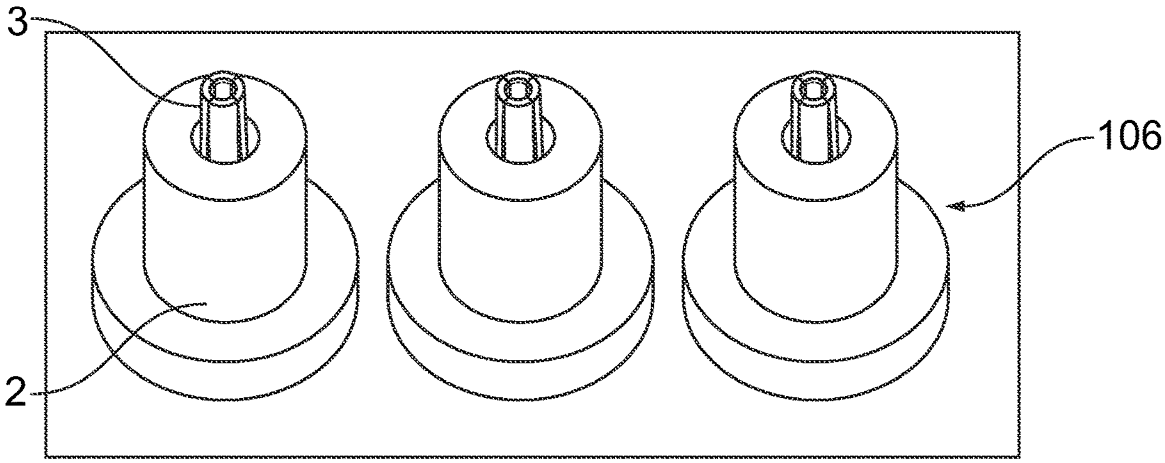

FIG. 18B is a partially assembled view of a portion of the antenna base showing the center pins received in corresponding insulators in accordance with an exemplary embodiment.

Figure 19:
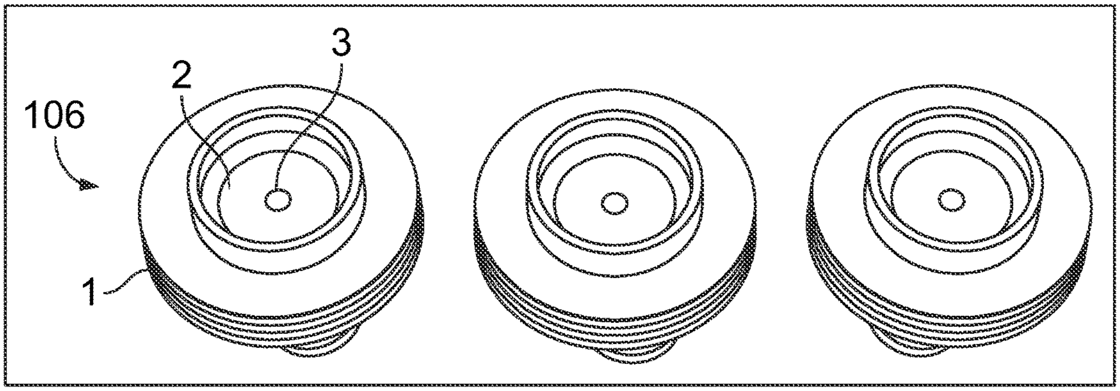

FIG. 19 is an assembled view of the antenna bases showing the center pins and the insulators received in corresponding connector bodies in accordance with an exemplary embodiment.

Figure 20:
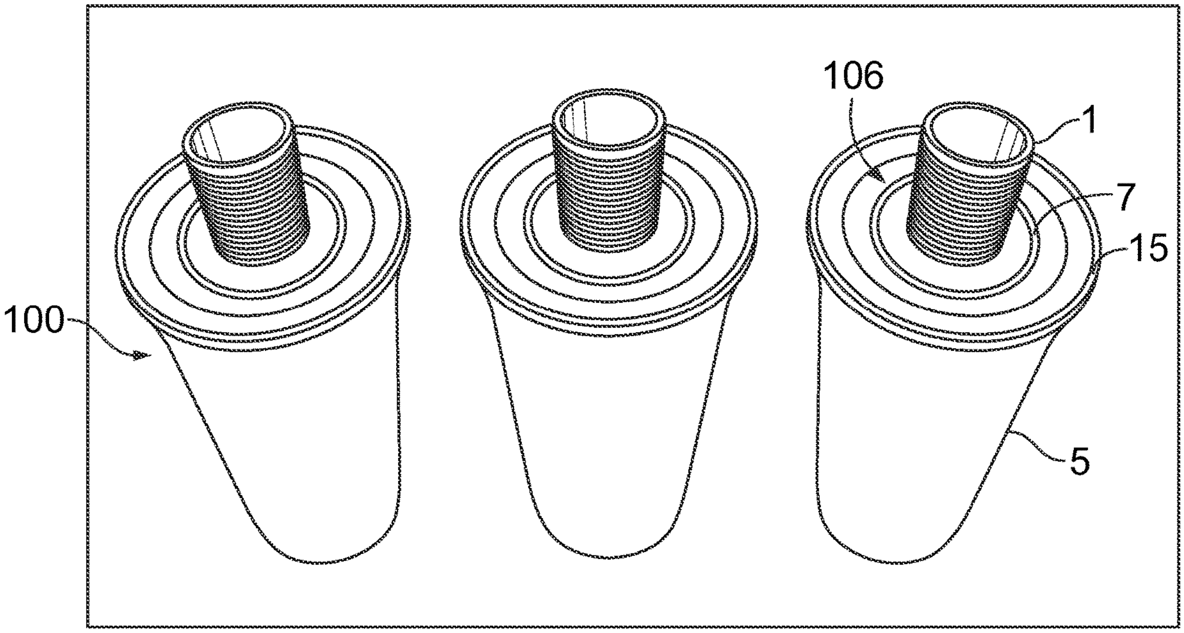

FIG. 20 illustrates bottom perspective views of the antenna assemblies with the antenna elements and the antenna bases in the corresponding radomes in accordance with an exemplary embodiment.

FIG. 21 illustrates RF specifications tables and compliance data for a prototype antenna assembly in accordance with an exemplary embodiment.

FIG. 22 illustrates RF specifications tables and compliance data for a prototype antenna assembly in accordance with an exemplary embodiment.

FIG. 23A illustrates tables with antenna characteristics and performance specifications for a prototype antenna assembly in accordance with an exemplary embodiment.

FIG. 23B illustrates tables with antenna characteristics and performance specifications for a prototype antenna assembly in accordance with an exemplary embodiment.

Figure 24:
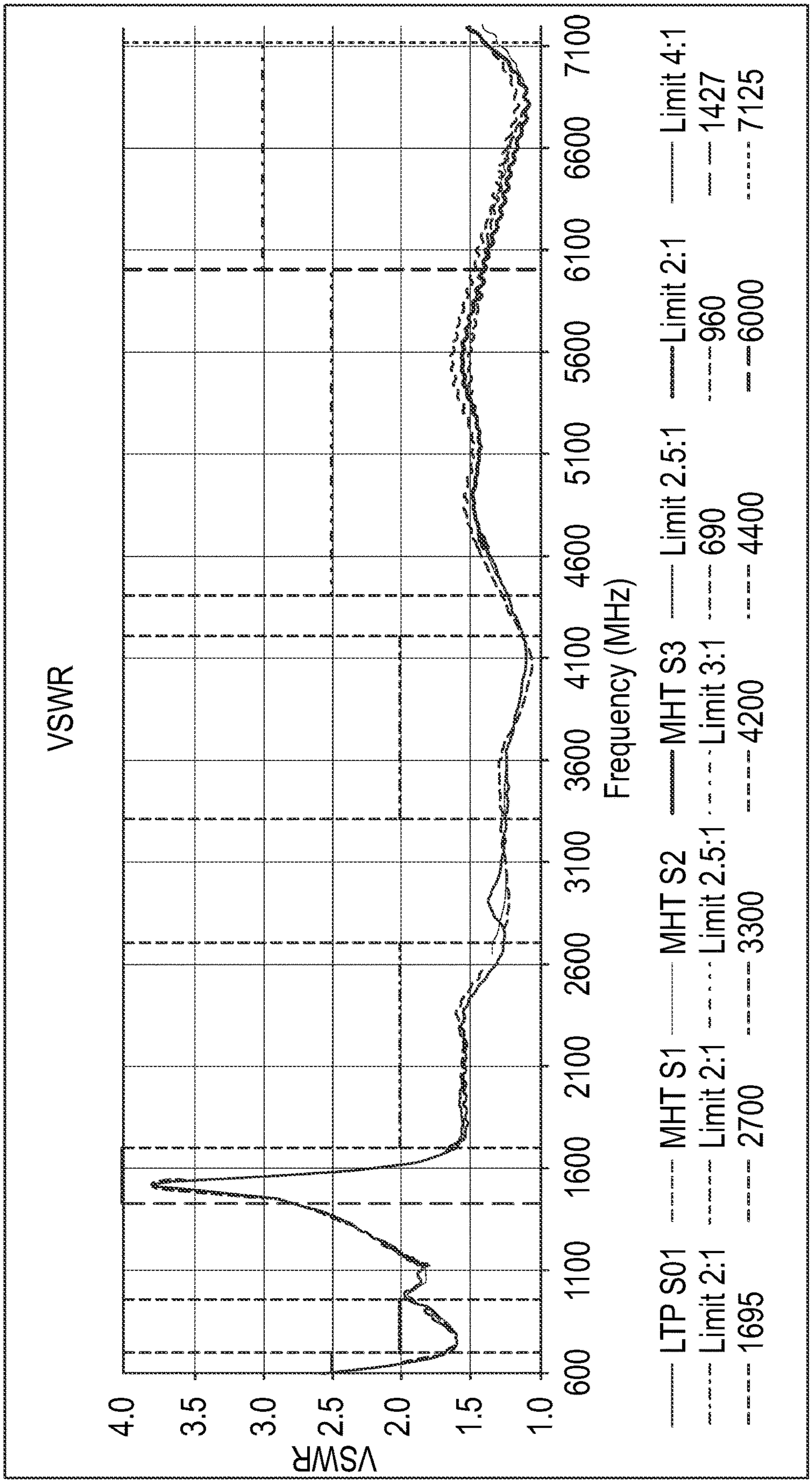

FIG. 24 illustrates line graphs of voltage standing wave ratio (VSWR) versus frequency in megahertz (MHZ) measured for the three prototype antenna assemblies shown in FIG. 20 including installed O-rings in accordance with an exemplary embodiment.

Figure 25:
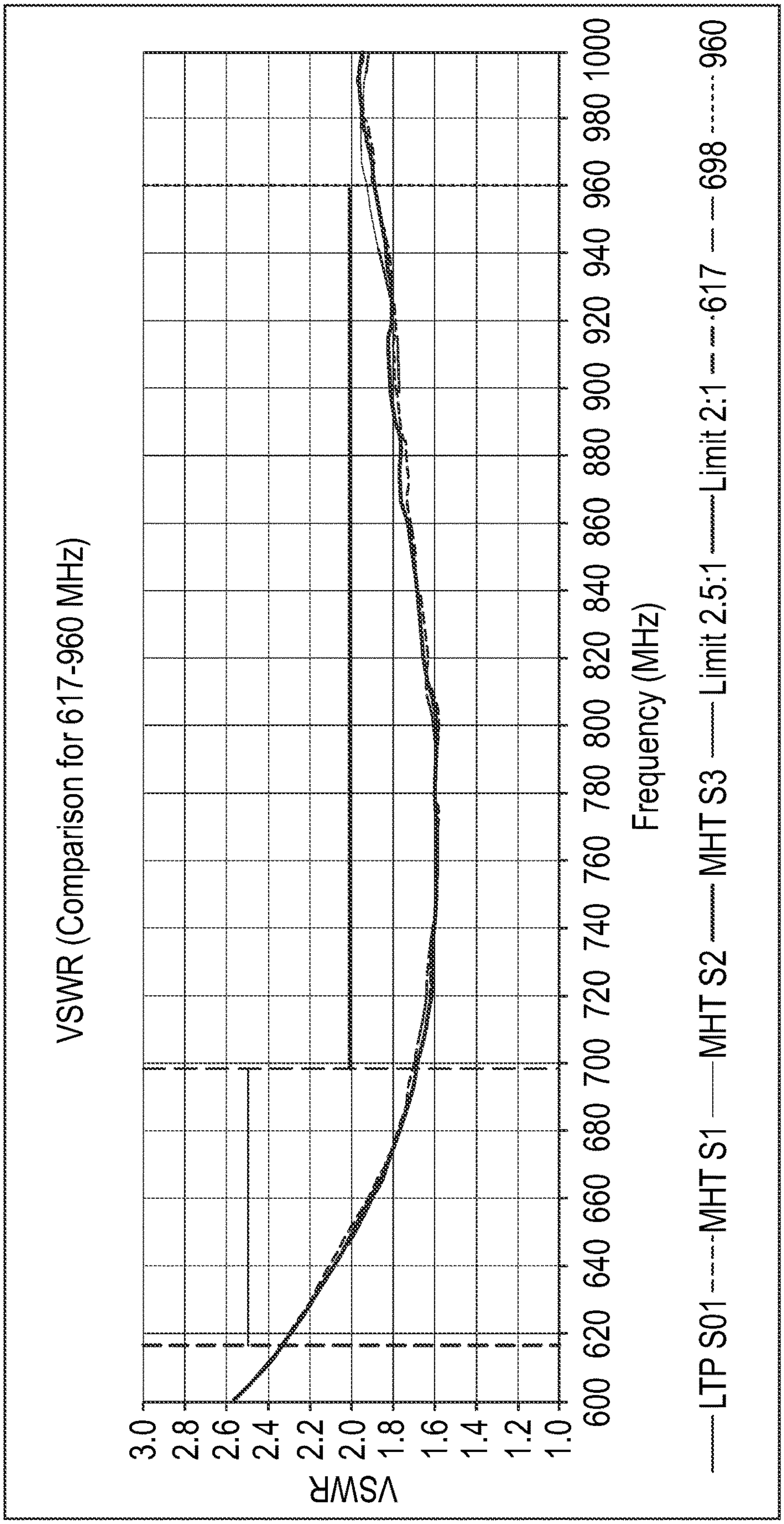

FIG. 25 illustrates line graphs of voltage standing wave ratio (VSWR) versus frequency in megahertz (MHZ) measured for the three prototype antenna assemblies shown in FIG. 20 including installed O-rings in accordance with an exemplary embodiment.

Figure 26:
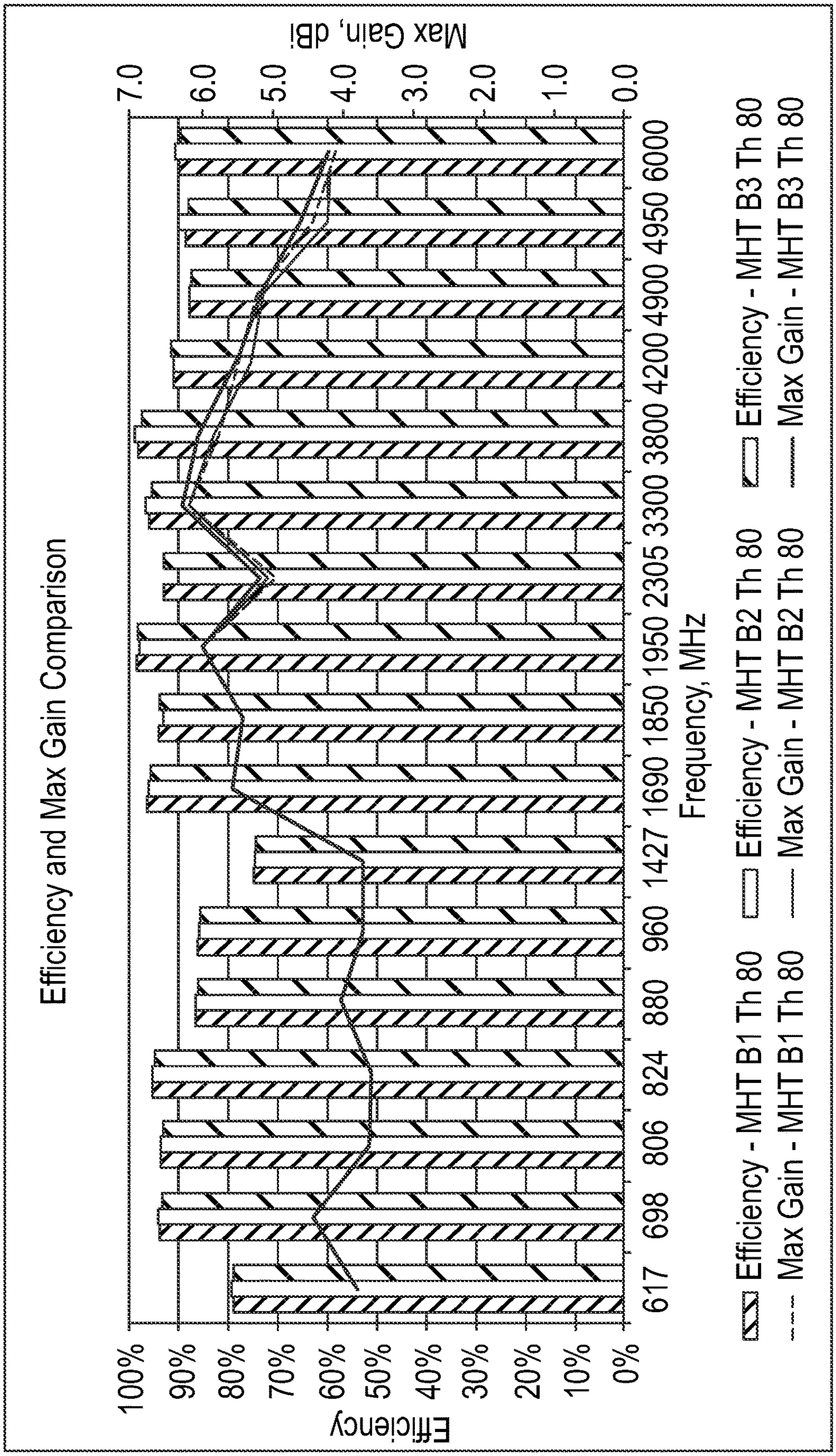

FIG. 26 illustrates a bar graph of efficiency (%) and a line graph of maximum gain in decibels relative to isotropic radiator (dBi) versus frequency (MHz) for the three prototype antenna assemblies shown in FIG. 20 in accordance with embodiments herein.

Figure 27:
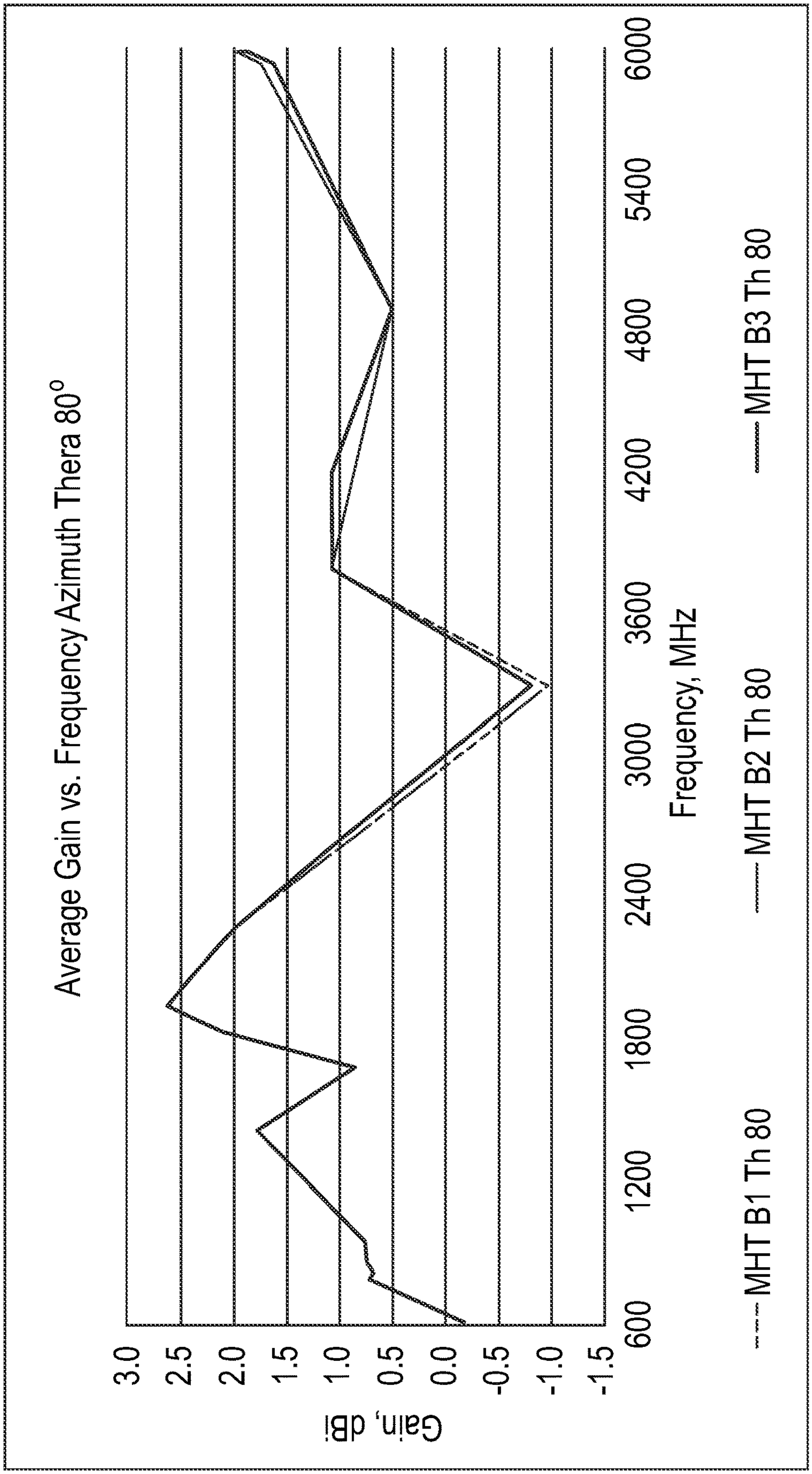

FIG. 27 illustrates a line graph of average gain (dBi) versus frequency (MHz) azimuth theta 80° for the three prototype antenna assemblies shown in FIG. 20 in accordance with embodiments herein.

Figure 28:
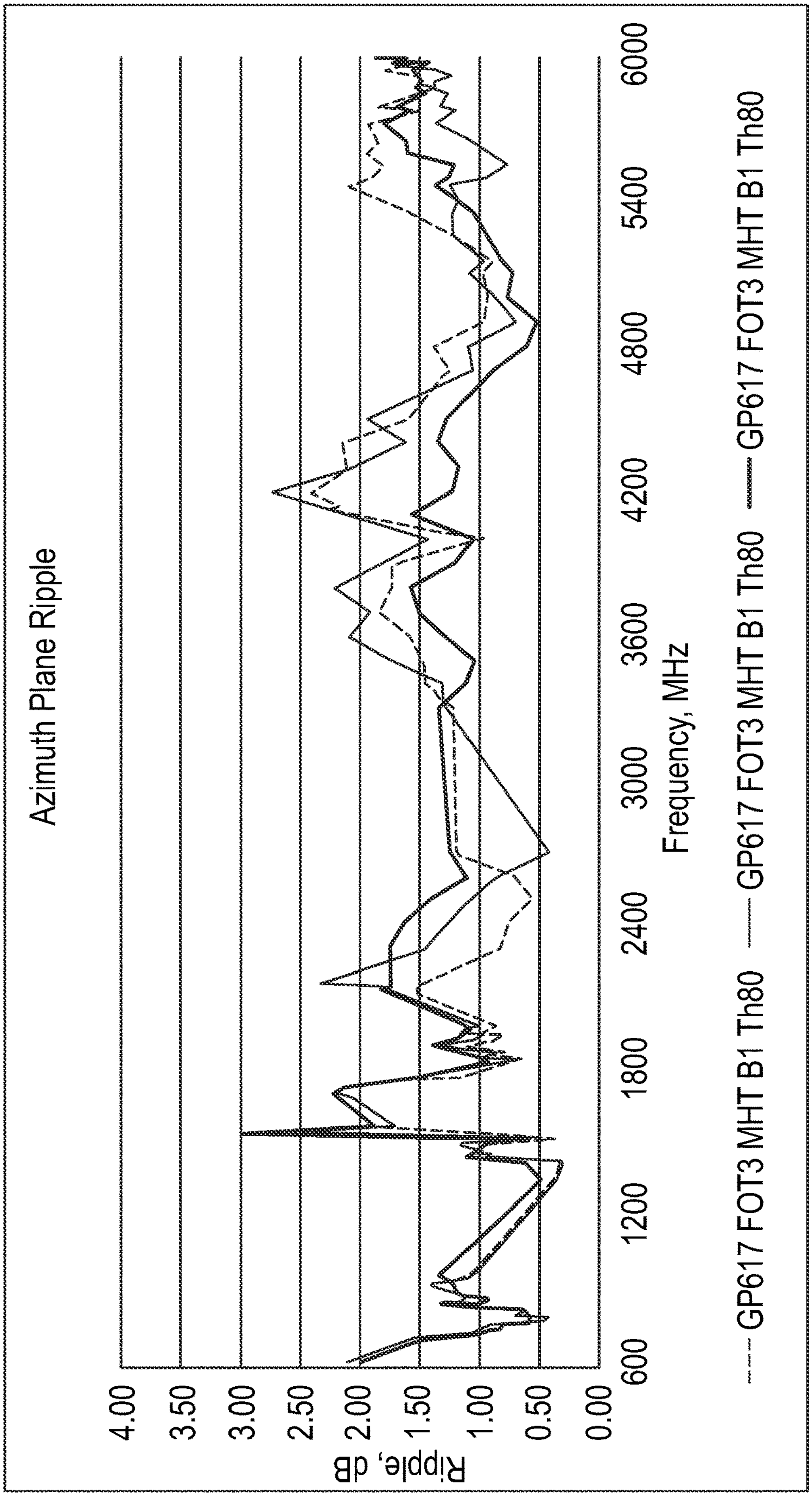

FIG. 28 includes a line graph of azimuth plane ripple (dB) versus frequency (MHz) for the three prototype antenna assemblies shown in FIG. 20 in accordance with embodiments herein.

Figure 29:
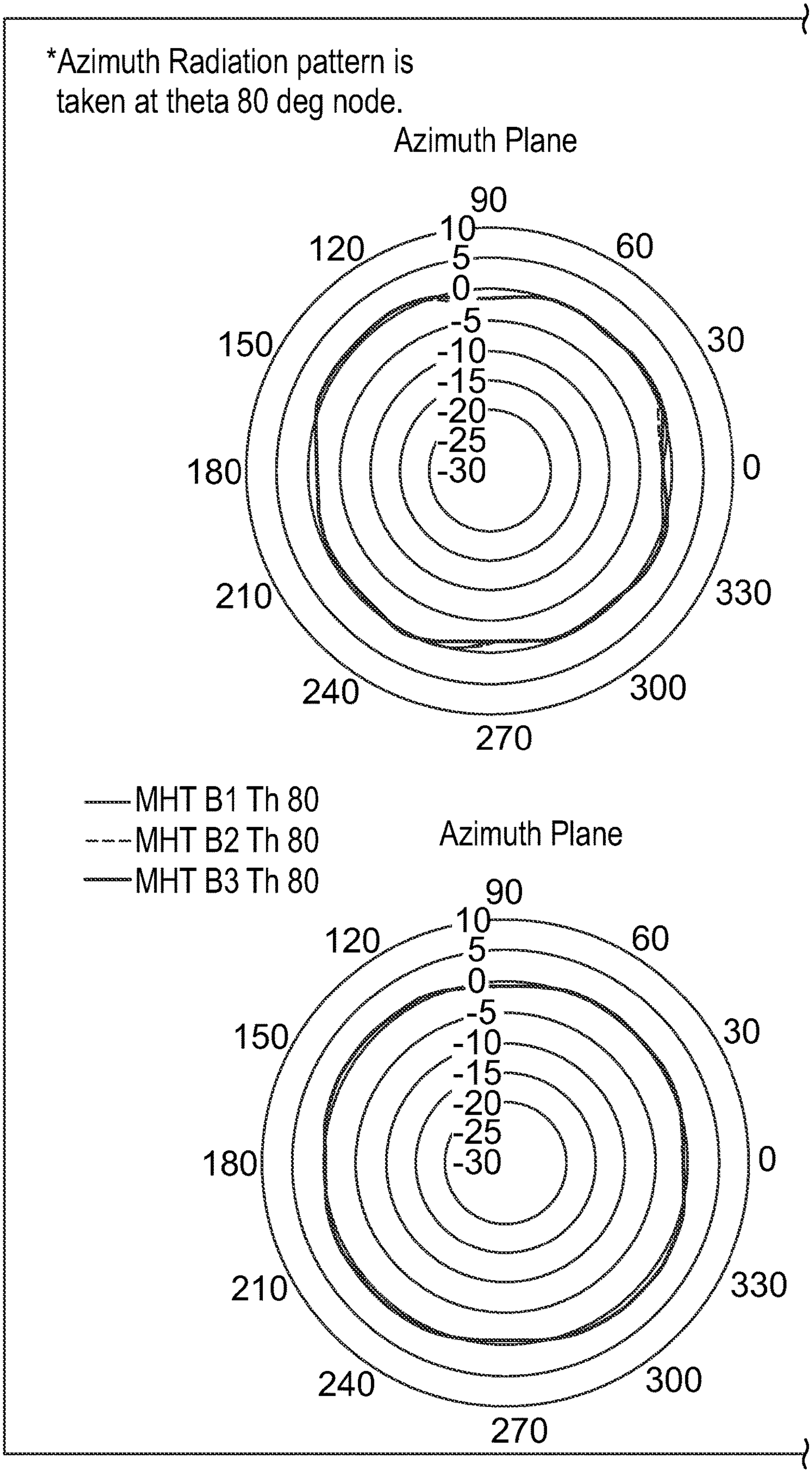

FIG. 29 illustrates radiation patterns (azimuth plane, phi zero degree plane, and phi ninety degree plane) measured for the three prototype antenna assemblies shown in FIG. 20 at frequencies of 617 MHz and 698 MHz, in accordance with embodiments herein.

Figure 30:
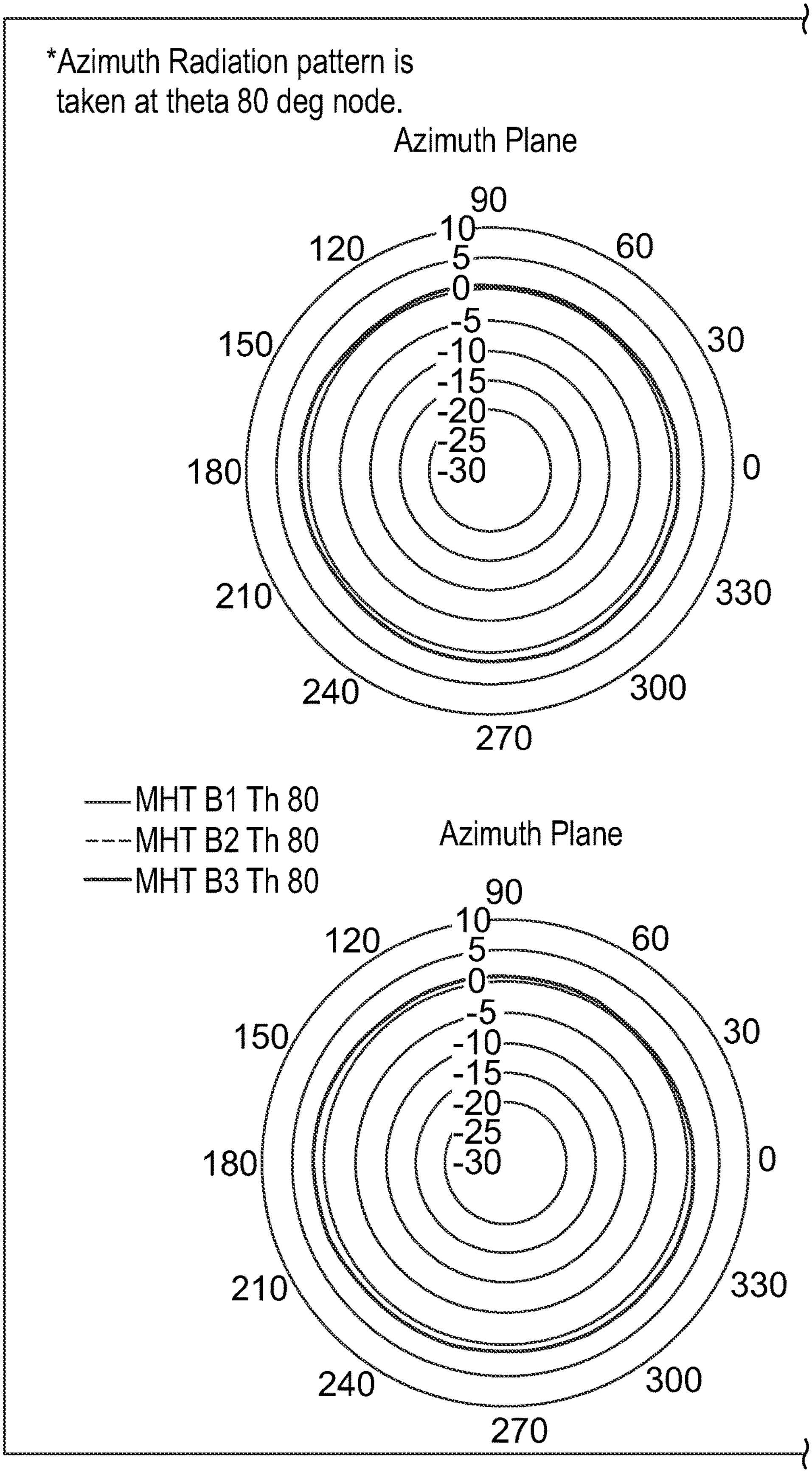
Figure 30:
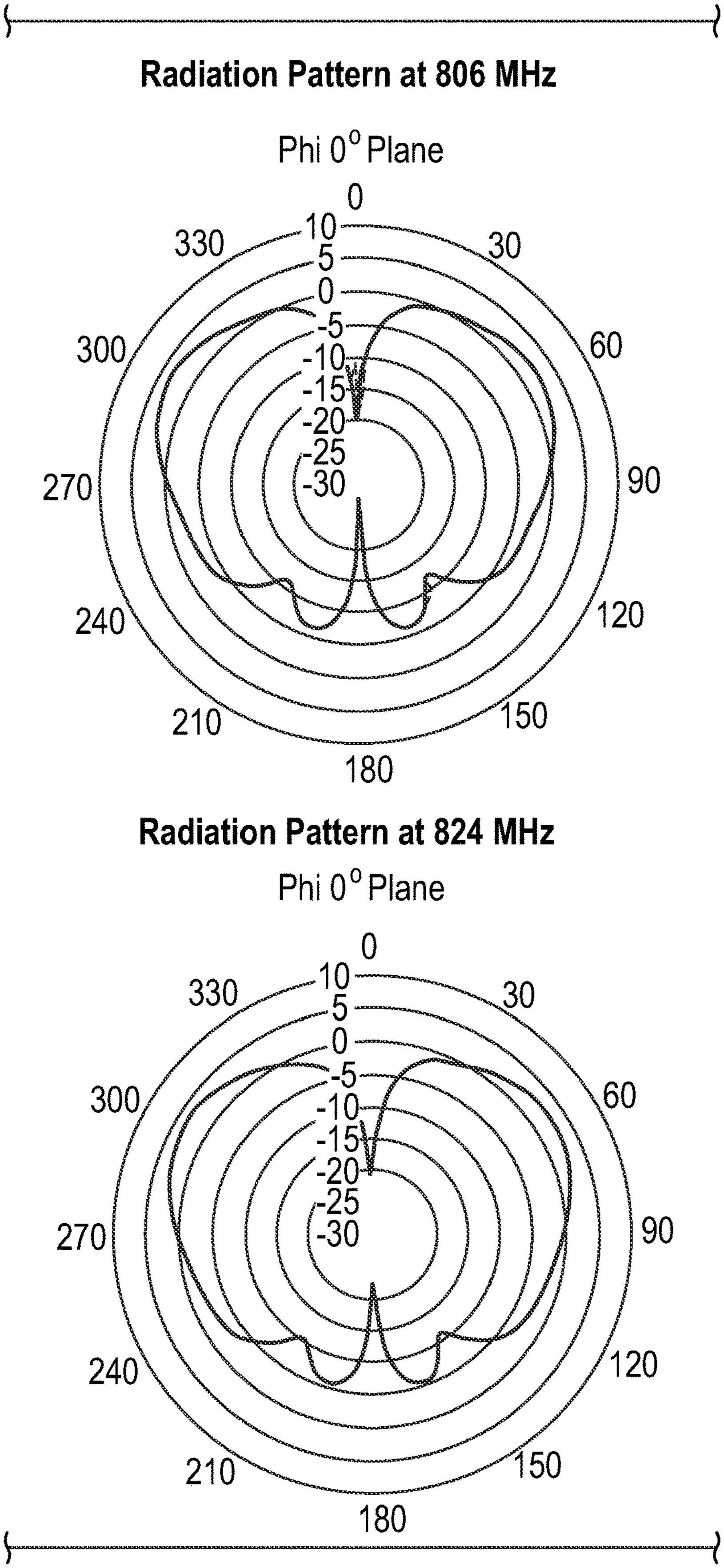

FIG. 30 illustrates radiation patterns (azimuth plane, phi zero degree plane, and phi ninety degree plane) measured for the three prototype antenna assemblies shown in FIG. 20 at frequencies of 806 MHz and 824 MHz, in accordance with embodiments herein.

Figure 31:
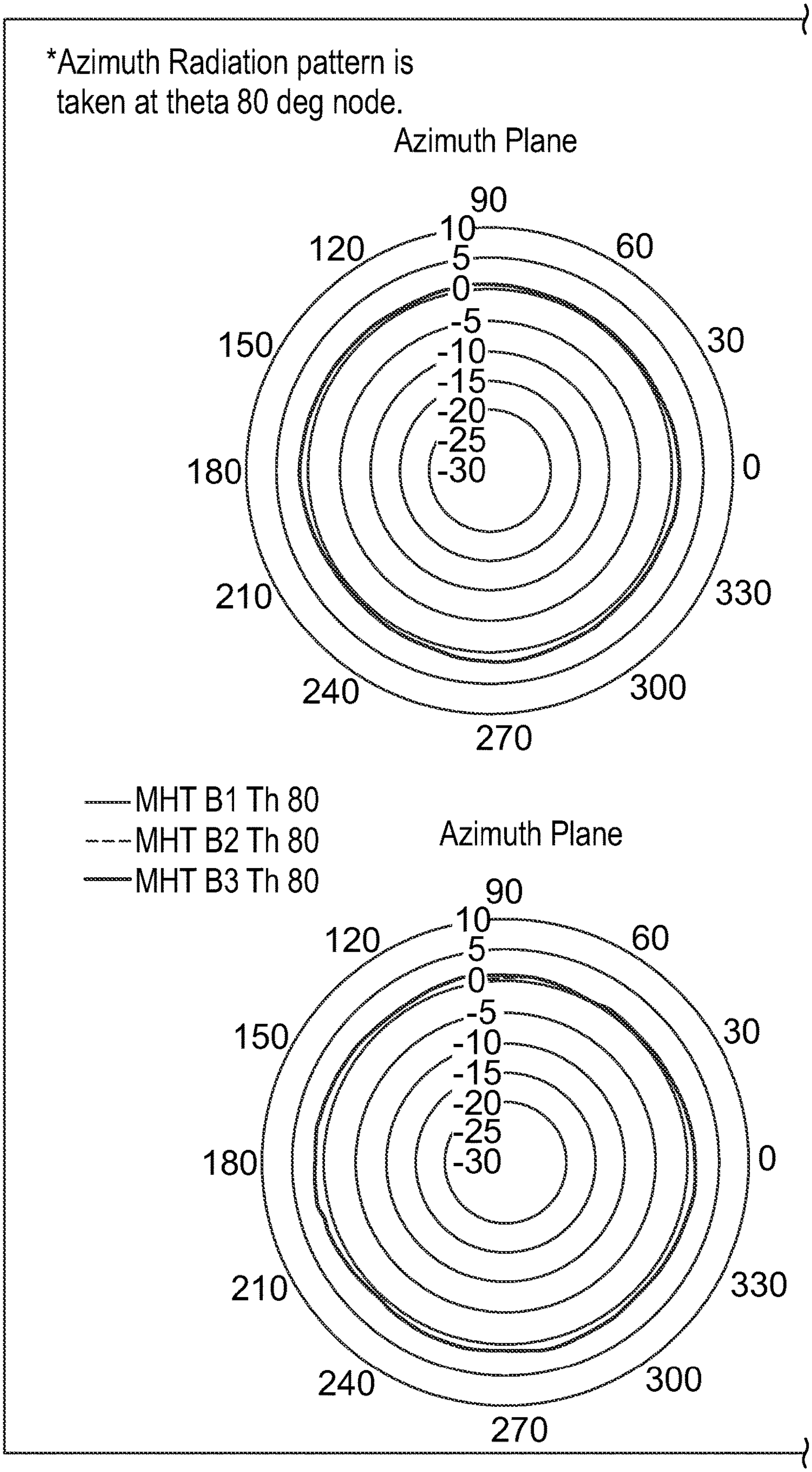
Figure 31:
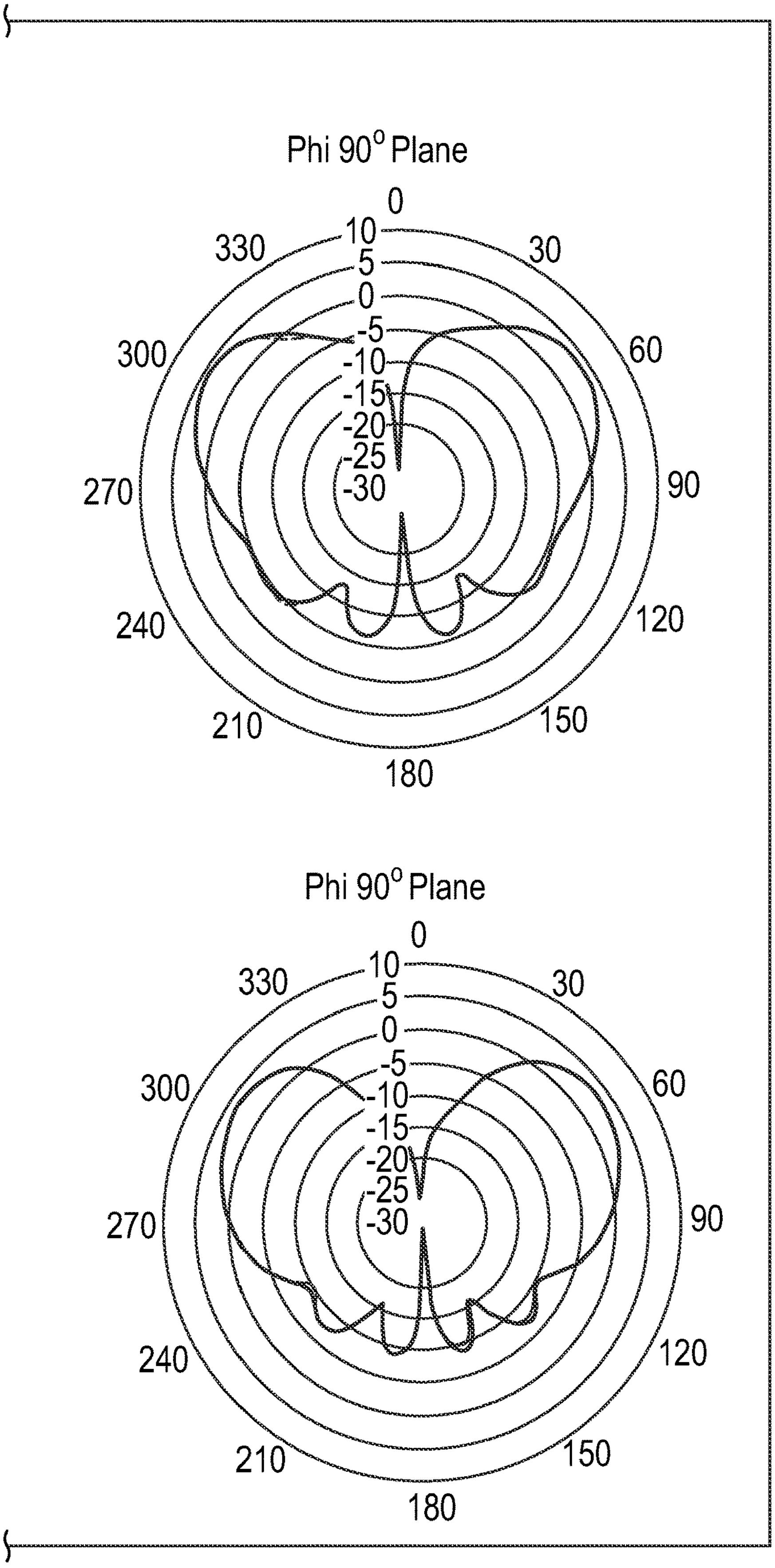

FIG. 31 illustrates radiation patterns (azimuth plane, phi zero degree plane, and phi ninety degree plane) measured for the three prototype antenna assemblies shown in FIG. 20 at frequencies of 880 MHz and 960 MHz, in accordance with embodiments herein.

Figure 32:
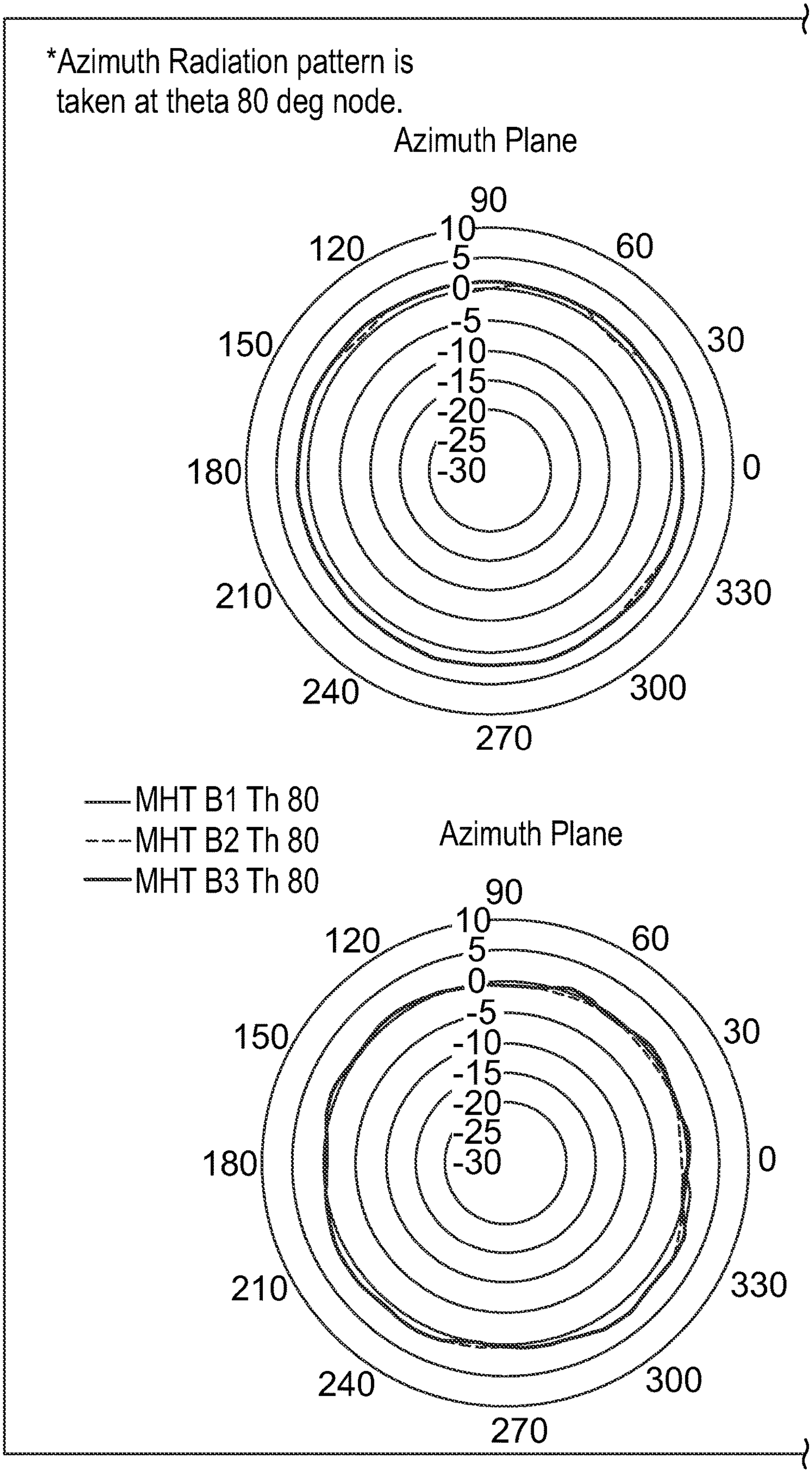
Figure 32:
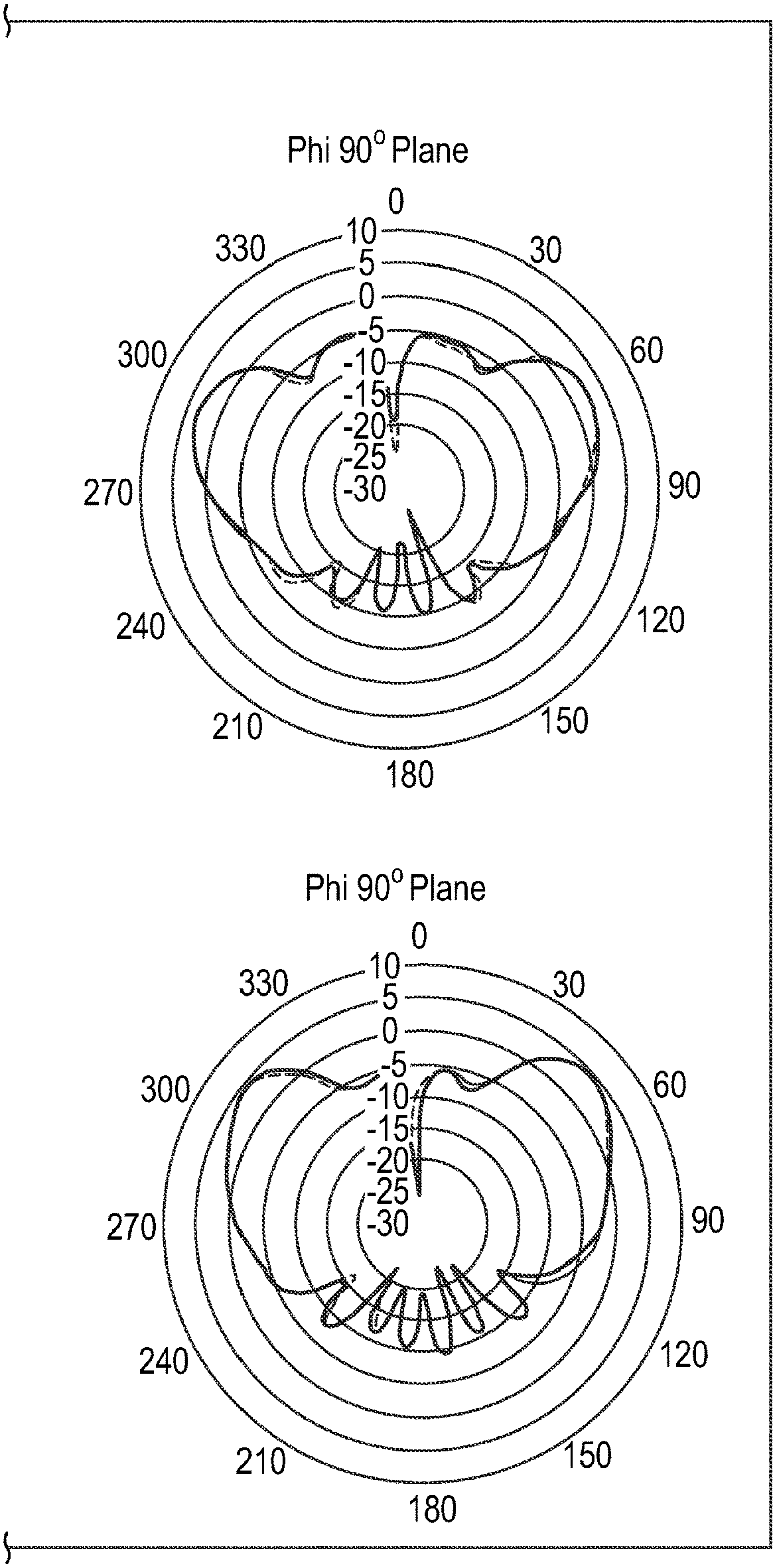

FIG. 32 illustrates radiation patterns (azimuth plane, phi zero degree plane, and phi ninety degree plane) measured for the three prototype antenna assemblies shown in FIG. 20 at frequencies of 1427 MHz and 1690 MHz, in accordance with embodiments herein.

Figure 33:
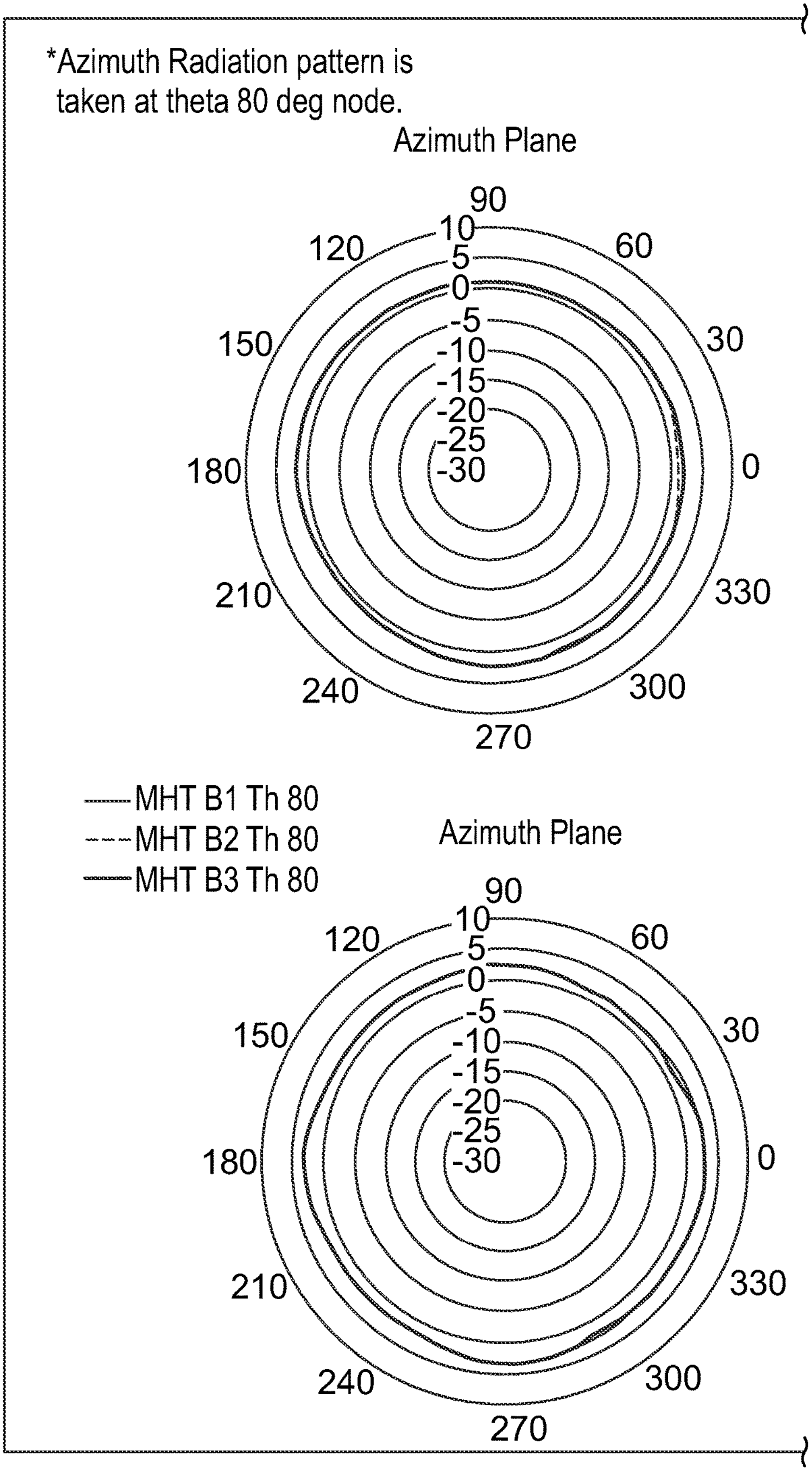
Figure 33:
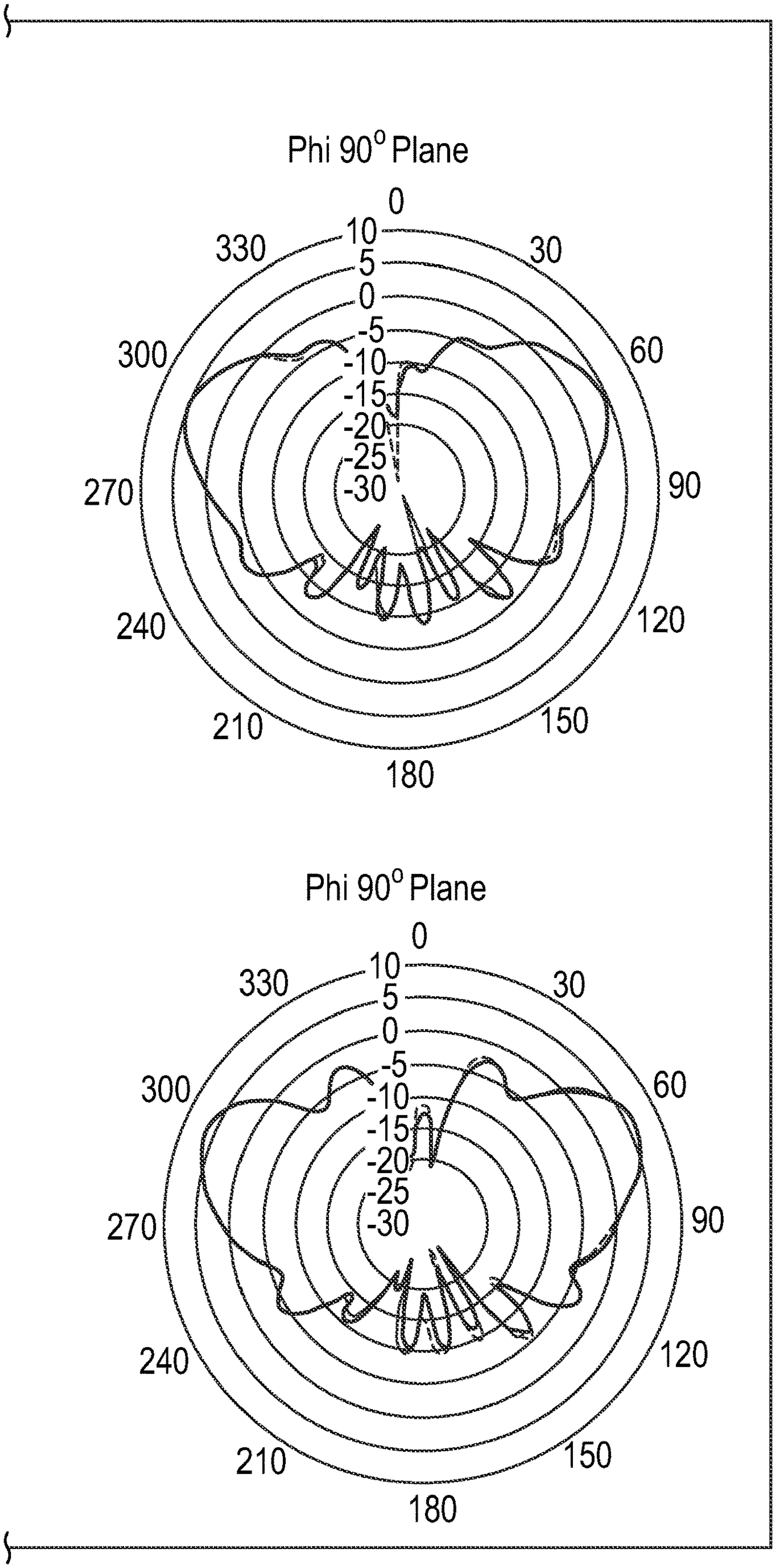

FIG. 33 illustrates radiation patterns (azimuth plane, phi zero degree plane, and phi ninety degree plane) measured for the three prototype antenna assemblies shown in FIG. 20 at frequencies of 1850 MHz and 1950 MHz, in accordance with embodiments herein.

Figure 34:
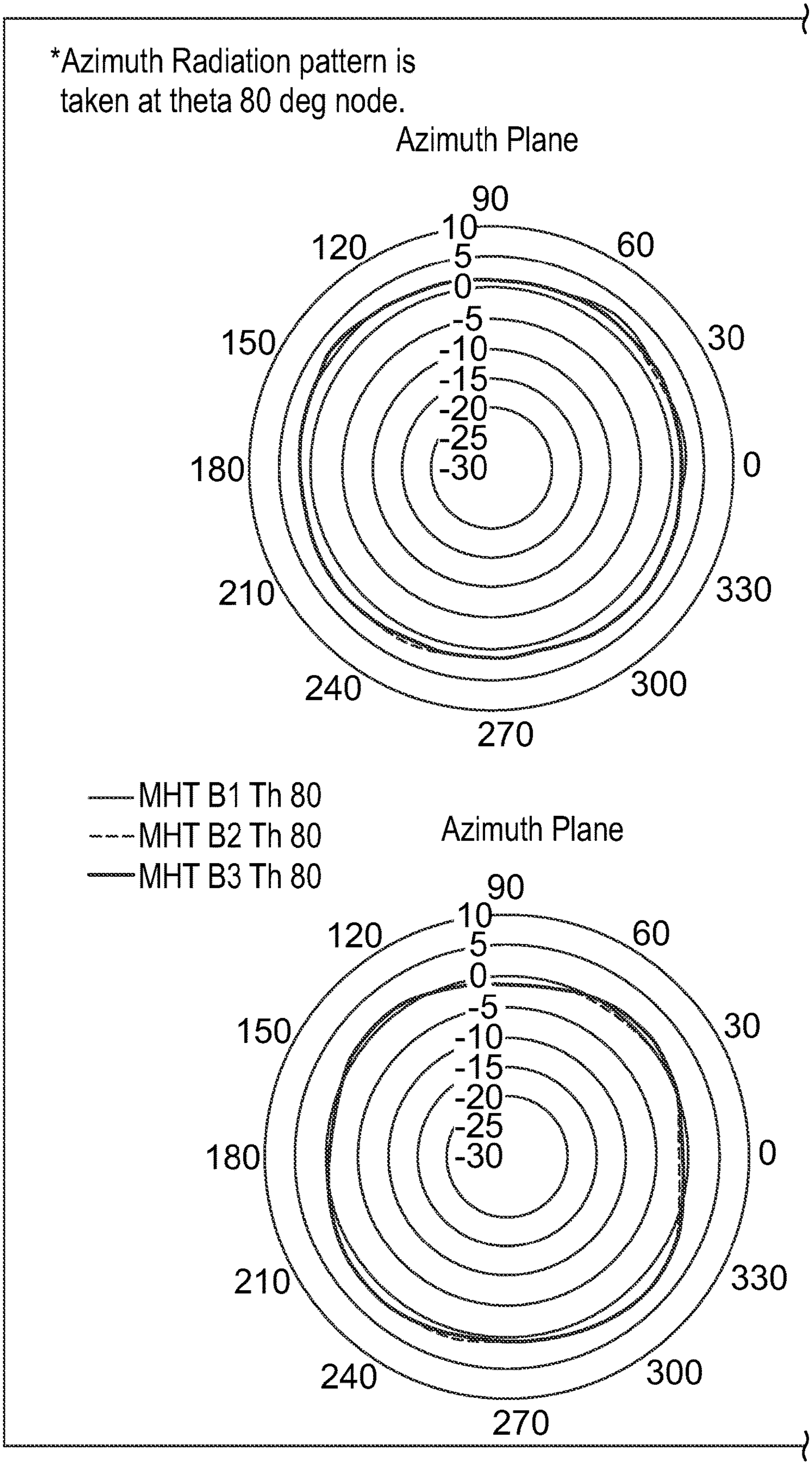

FIG. 34 illustrates radiation patterns (azimuth plane, phi zero degree plane, and phi ninety degree plane) measured for the three prototype antenna assemblies shown in FIG. 20 at frequencies of 2305 MHz and 3300 MHz, in accordance with embodiments herein.

Figure 35:
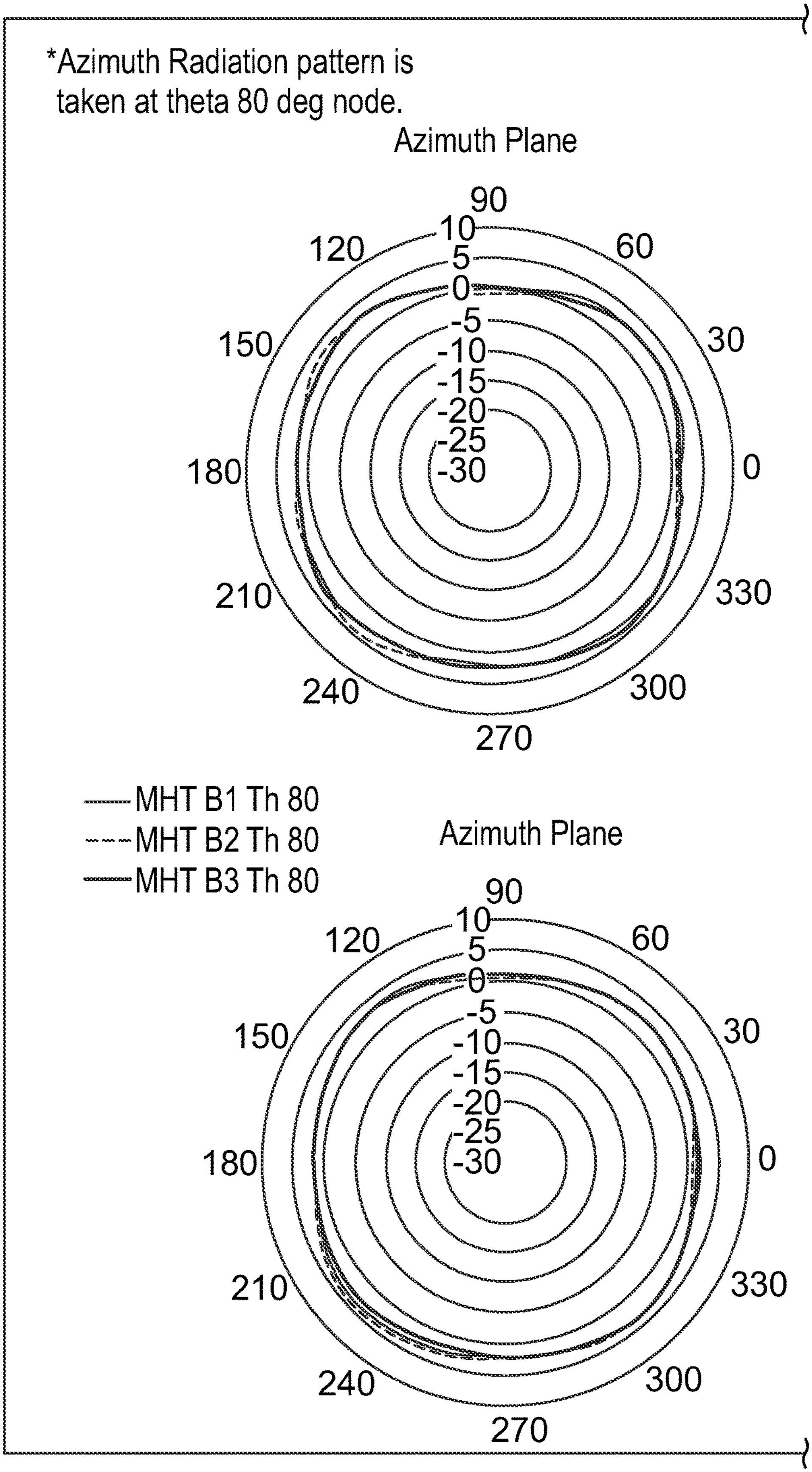
Figure 35:
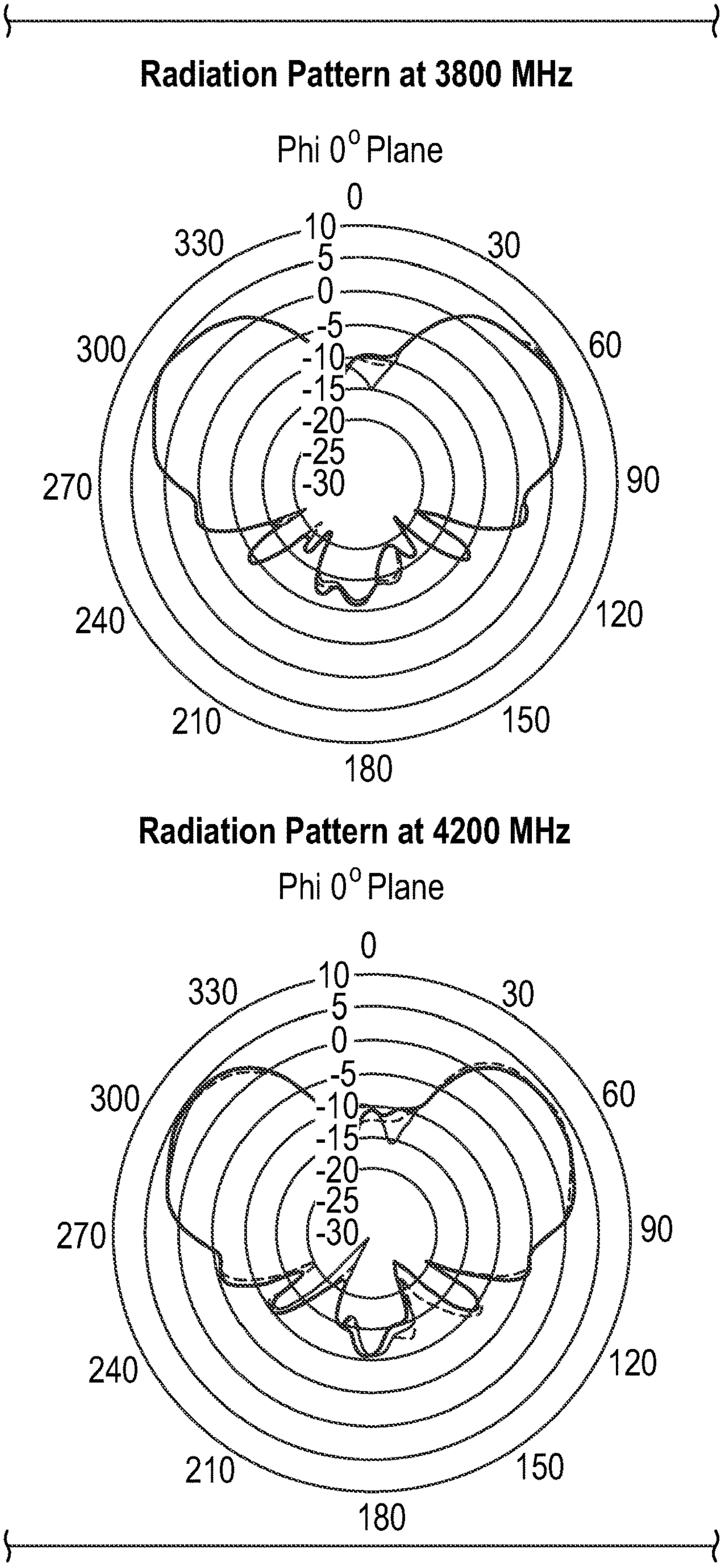

FIG. 35 illustrates radiation patterns (azimuth plane, phi zero degree plane, and phi ninety degree plane) measured for the three prototype antenna assemblies shown in FIG. 20 at frequencies of 3800 MHz and 4200 MHz, in accordance with embodiments herein.

Figure 36:
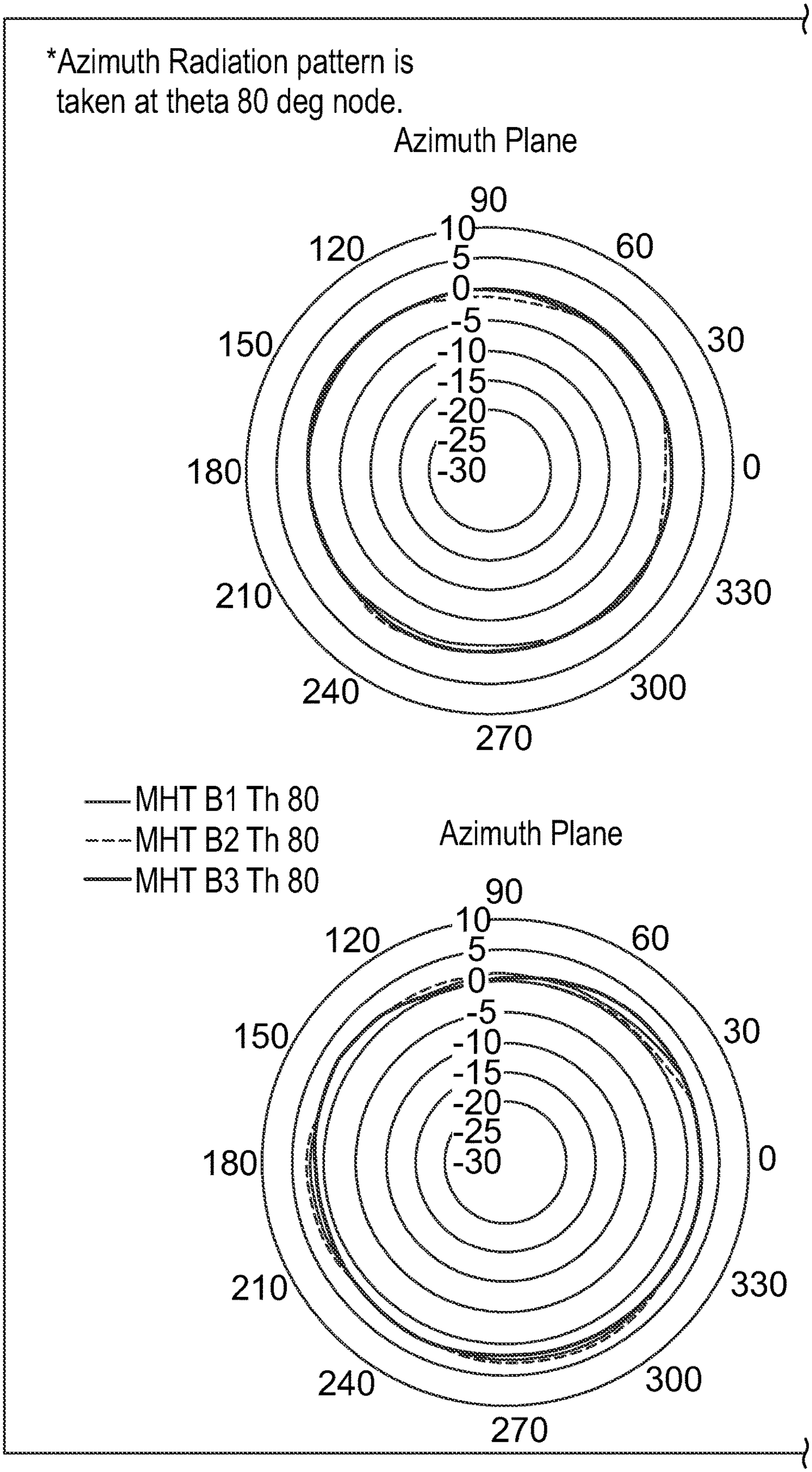
Figure 36:
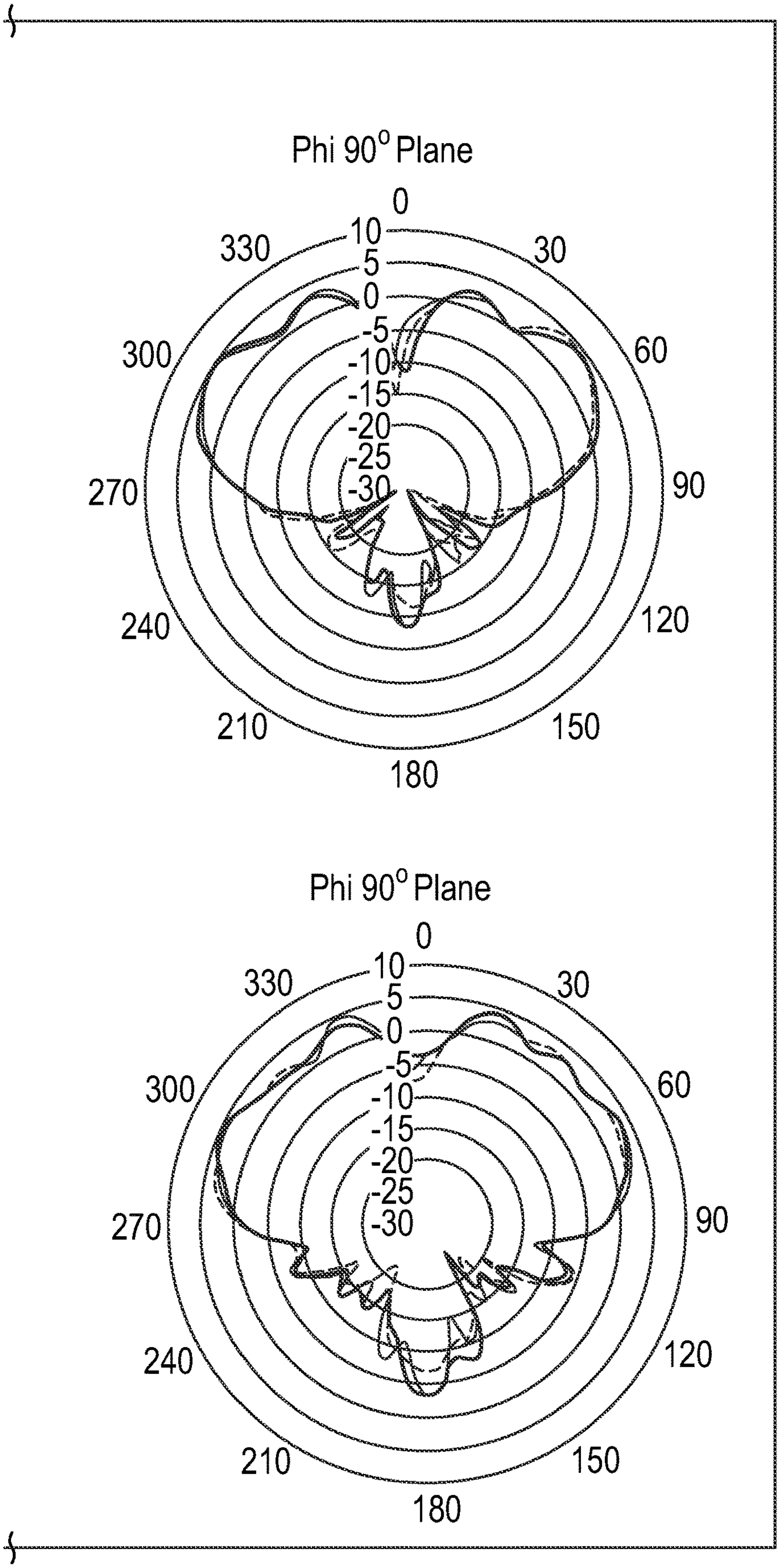

FIG. 36 illustrates radiation patterns (azimuth plane, phi zero degree plane, and phi ninety degree plane) measured for the three prototype antenna assemblies shown in FIG. 20 at frequencies of 4900 MHz and 5950 MHz, in accordance with embodiments herein.

Figure 37:
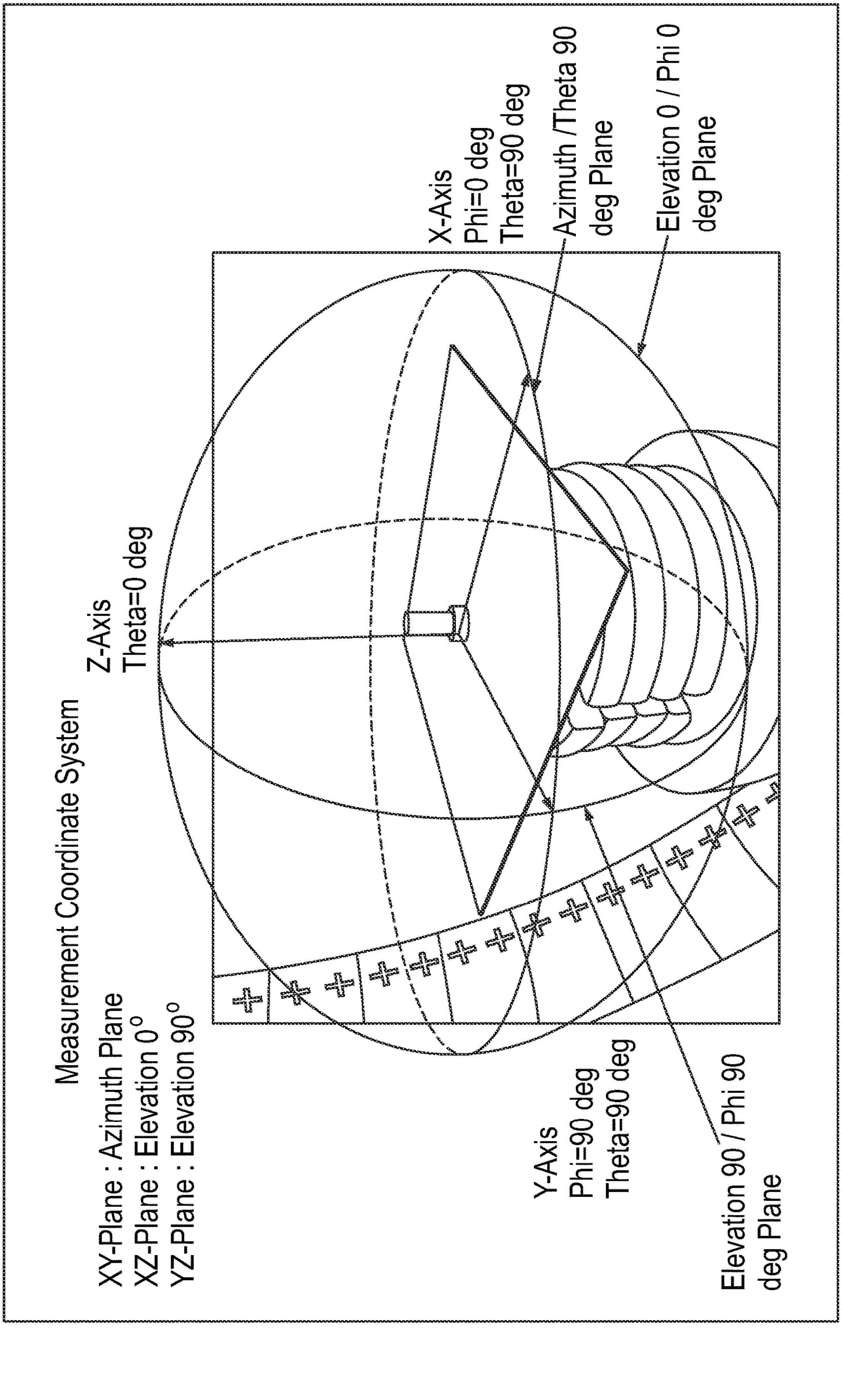

FIG. 37 illustrates the measurement coordinate system and the Azimuth Plane/Theta 90 Degree Plane (XY-Plane), the Elevation 0°/Phi Zero Degree Plane (XZ-Plane), and the Elevation 90°/Phi Ninety Degree Plane (YZ-Plane) in accordance with an exemplary embodiment.

Figure 38:
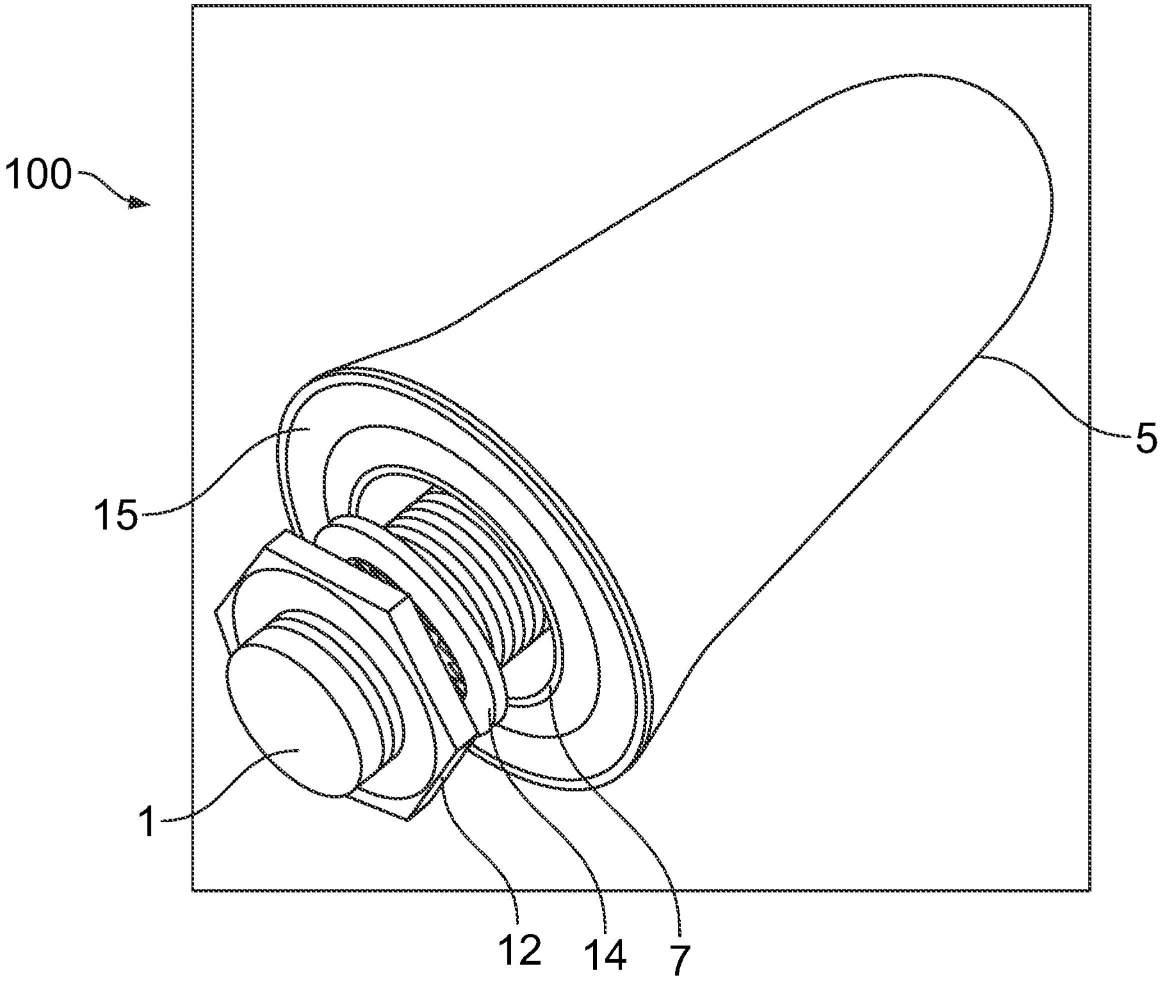

FIG. 38 shows a prototype antenna assembly in accordance with an exemplary embodiment.

Figure 39:
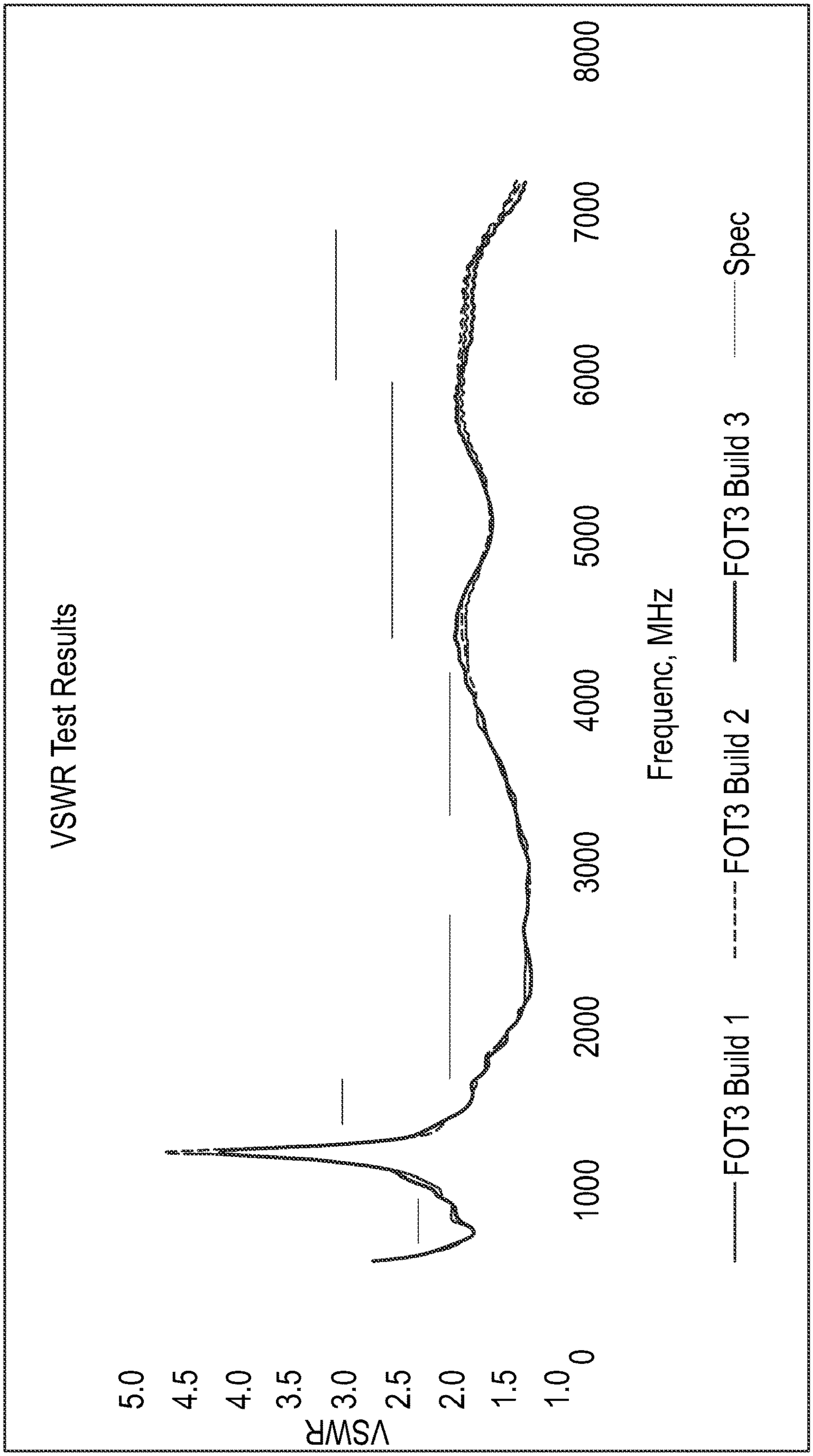

FIG. 39 illustrates line graphs illustrating voltage standing wave ratio (VSWR) versus frequency (MHZ) measured for three prototype antenna assemblies as shown in FIG. 38 in accordance with an exemplary embodiment.

Figure 40:
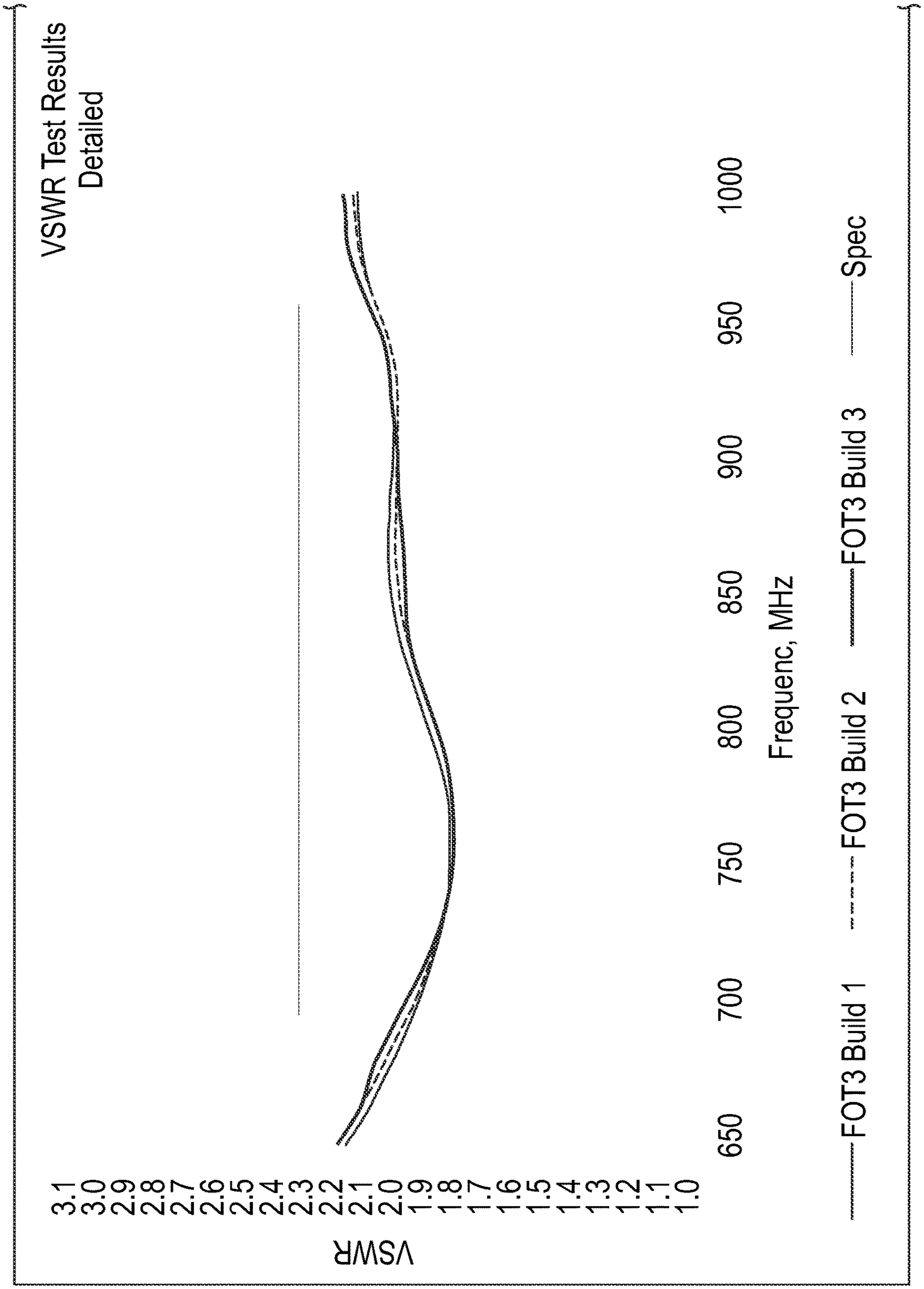
Figure 40:
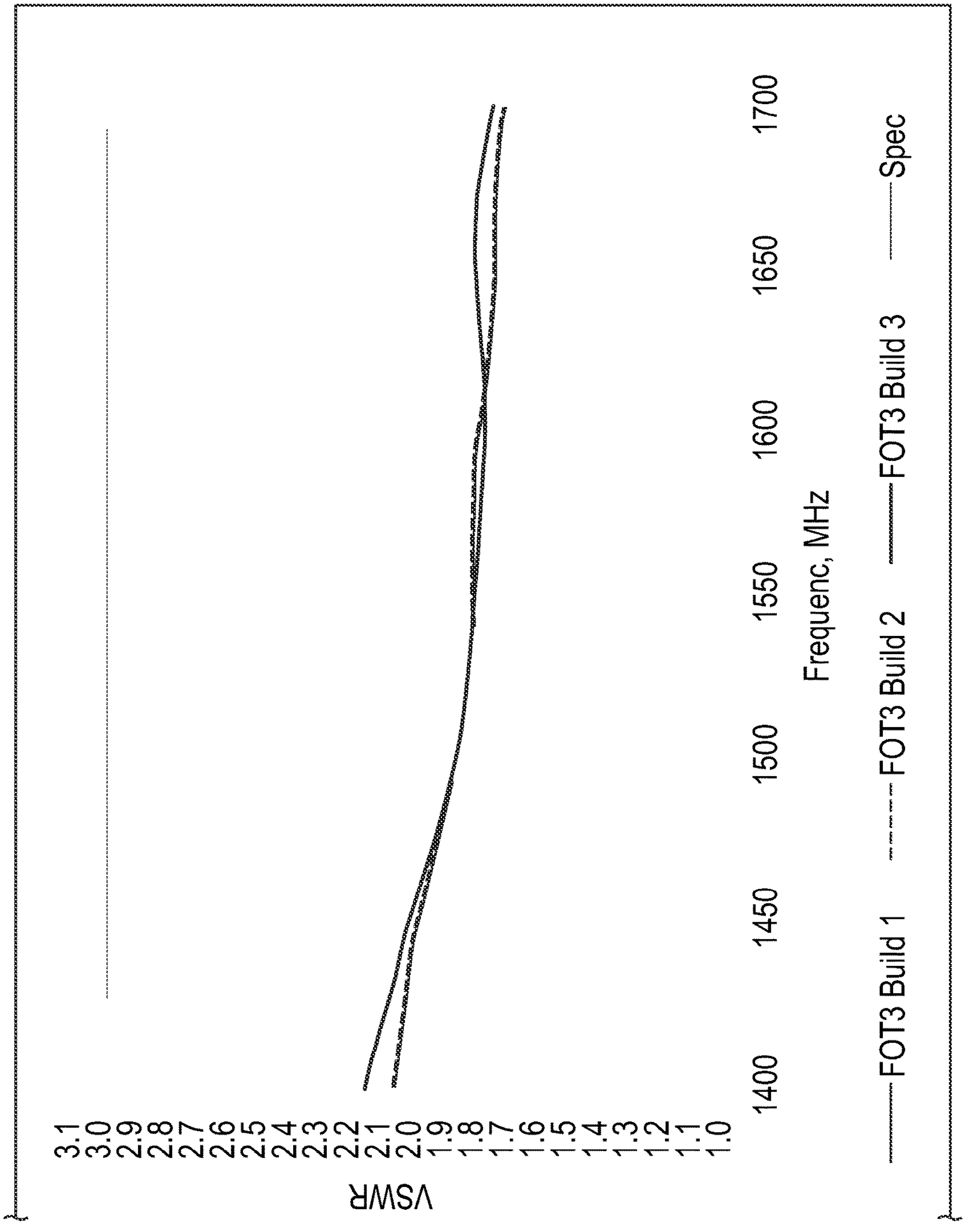

FIG. 40 illustrates line graphs illustrating voltage standing wave ratio (VSWR) versus frequency (MHZ) measured for three prototype antenna assemblies as shown in FIG. 38 in accordance with an exemplary embodiment.

Figure 41:
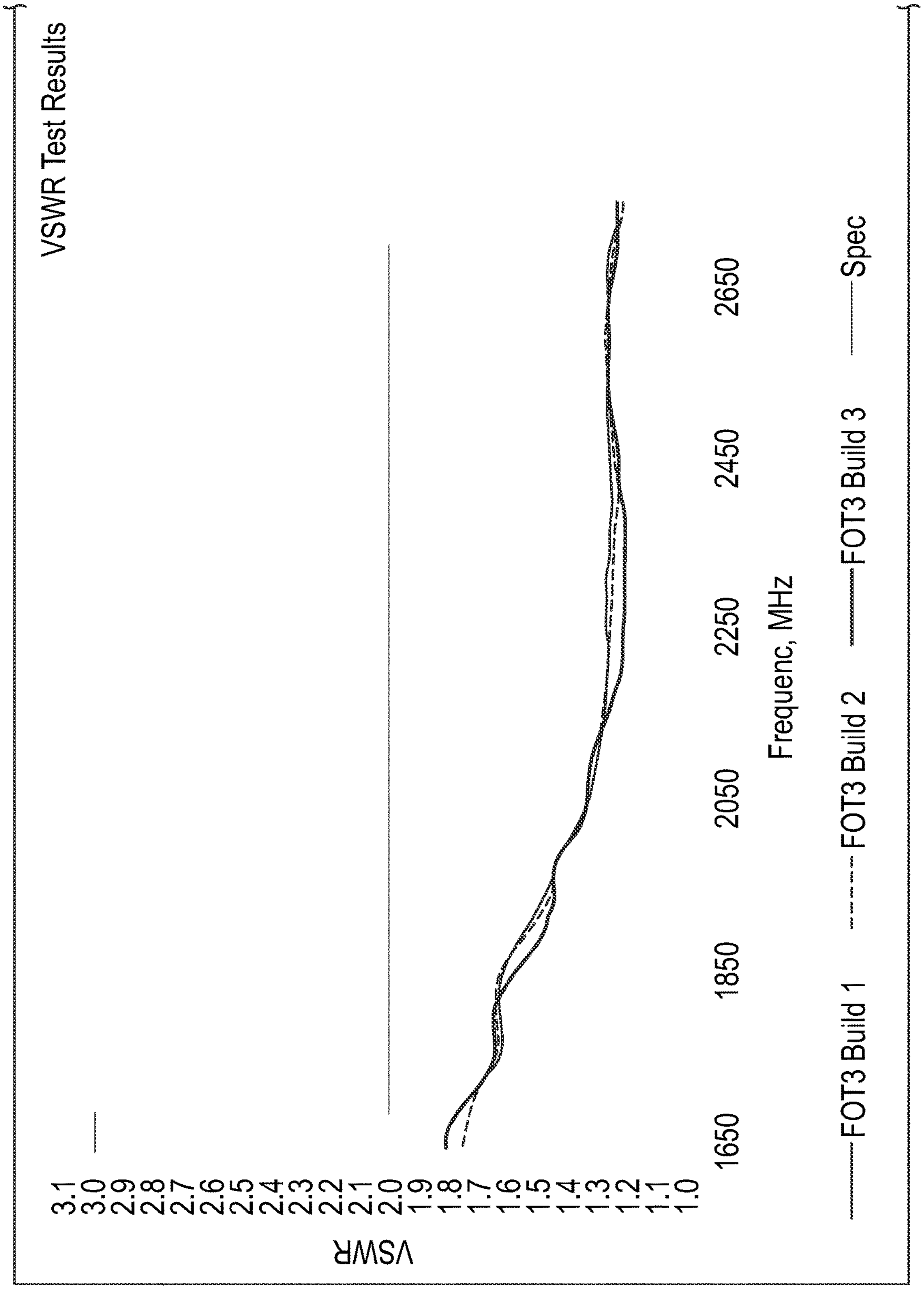
Figure 41:
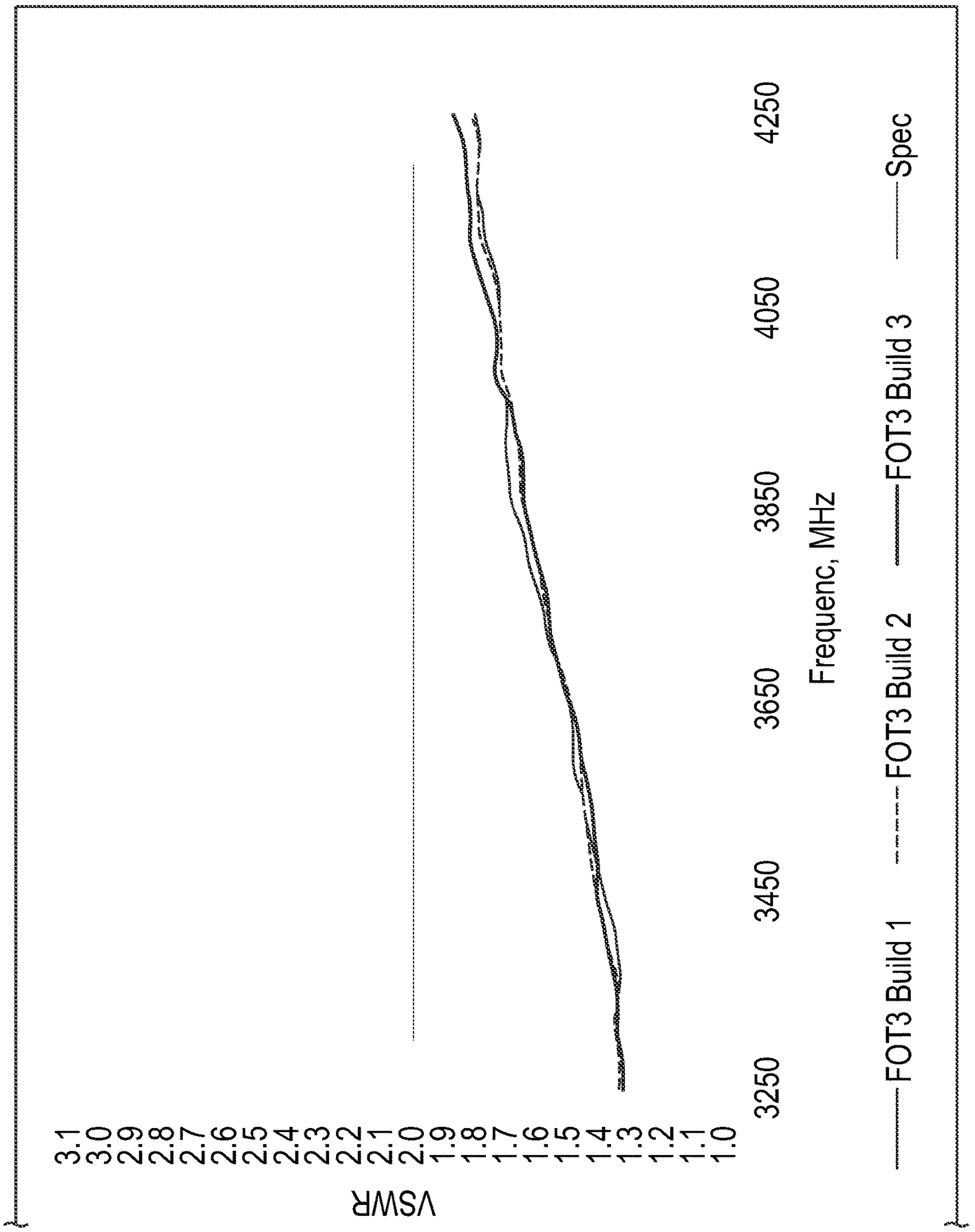

FIG. 41 illustrates line graphs illustrating voltage standing wave ratio (VSWR) versus frequency (MHZ) measured for three prototype antenna assemblies as shown in FIG. 38 in accordance with an exemplary embodiment.

Figure 42:
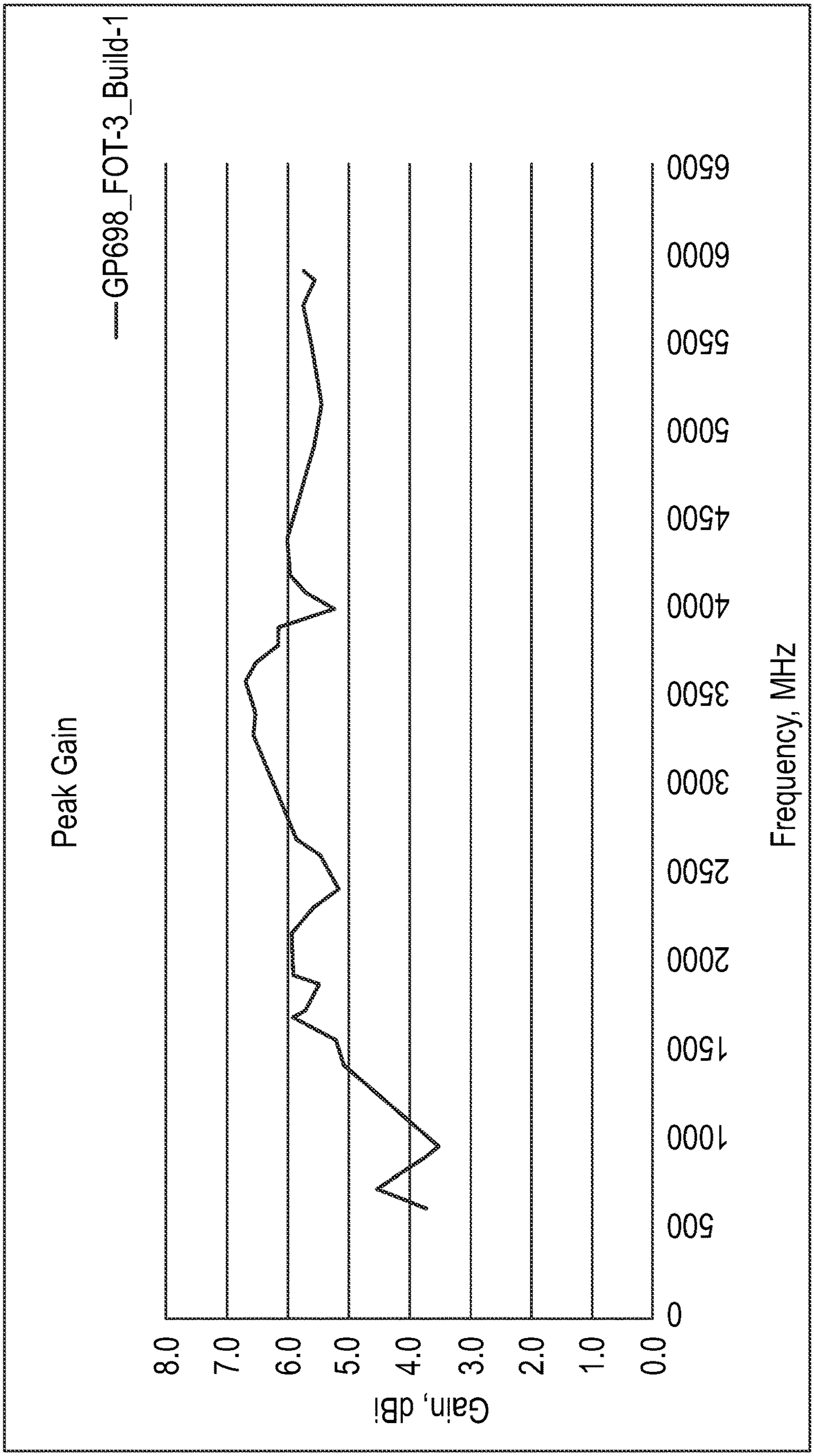

FIG. 42 is a line graph of peak gain (dBi) versus frequency (MHZ) measured for a prototype antenna assembly as shown in FIG. 38 in accordance with an exemplary embodiment.

Figure 43:
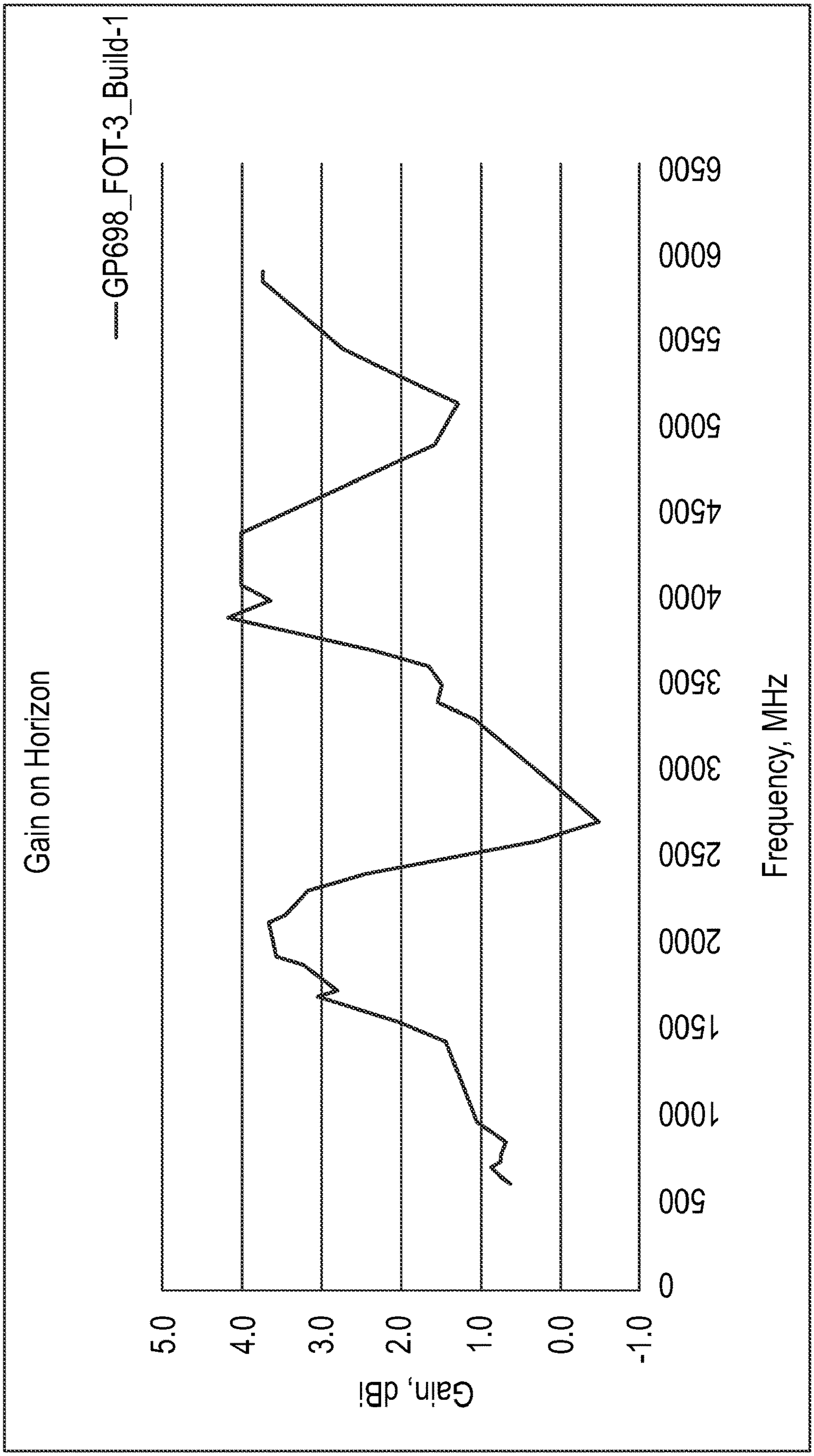

FIG. 43 is a line graph of gain (dBi) on horizon versus frequency (MHZ) measured for a prototype antenna assembly as shown in FIG. 38 in accordance with an exemplary embodiment.

Figure 44:
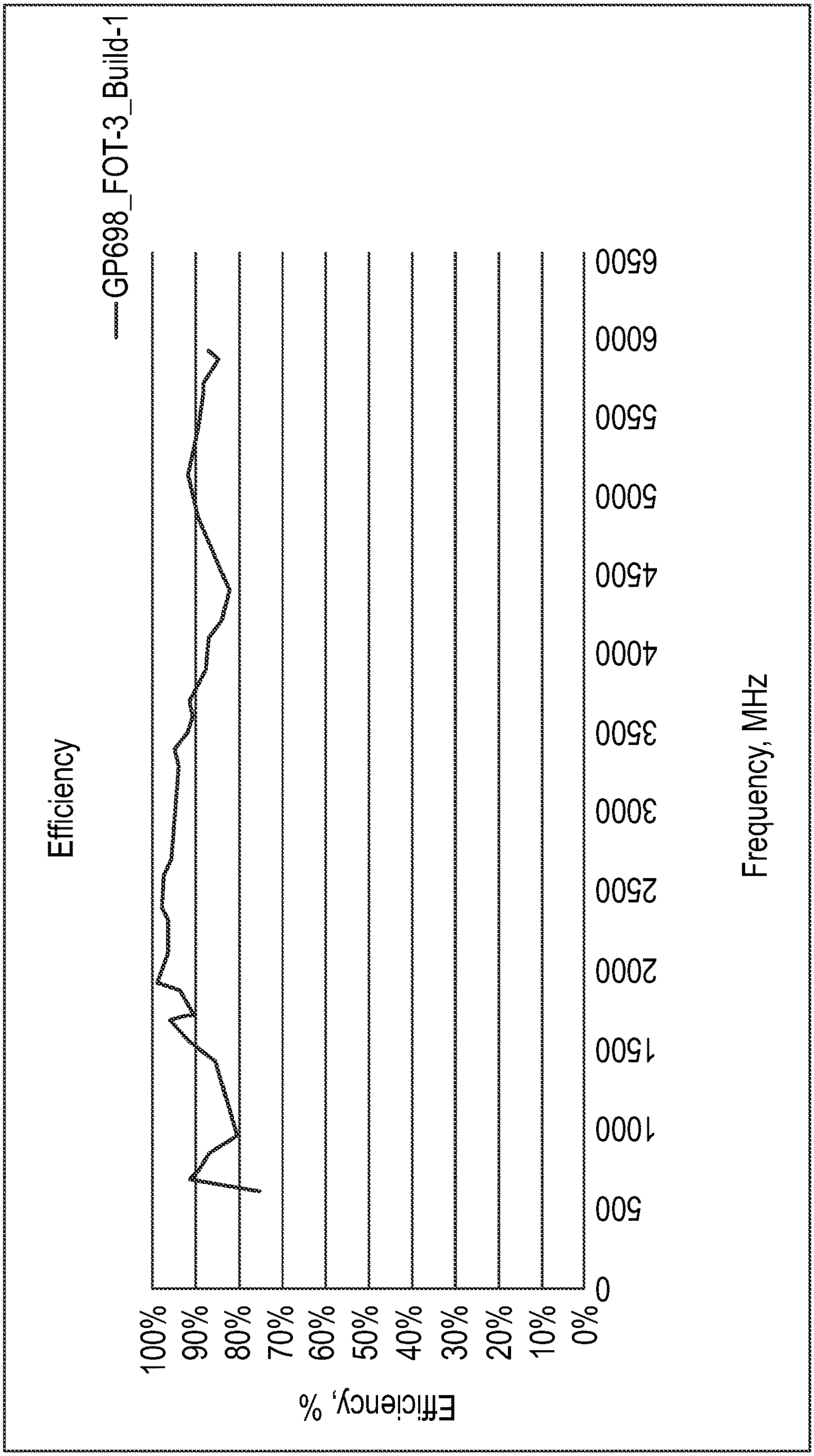
Figure 45:
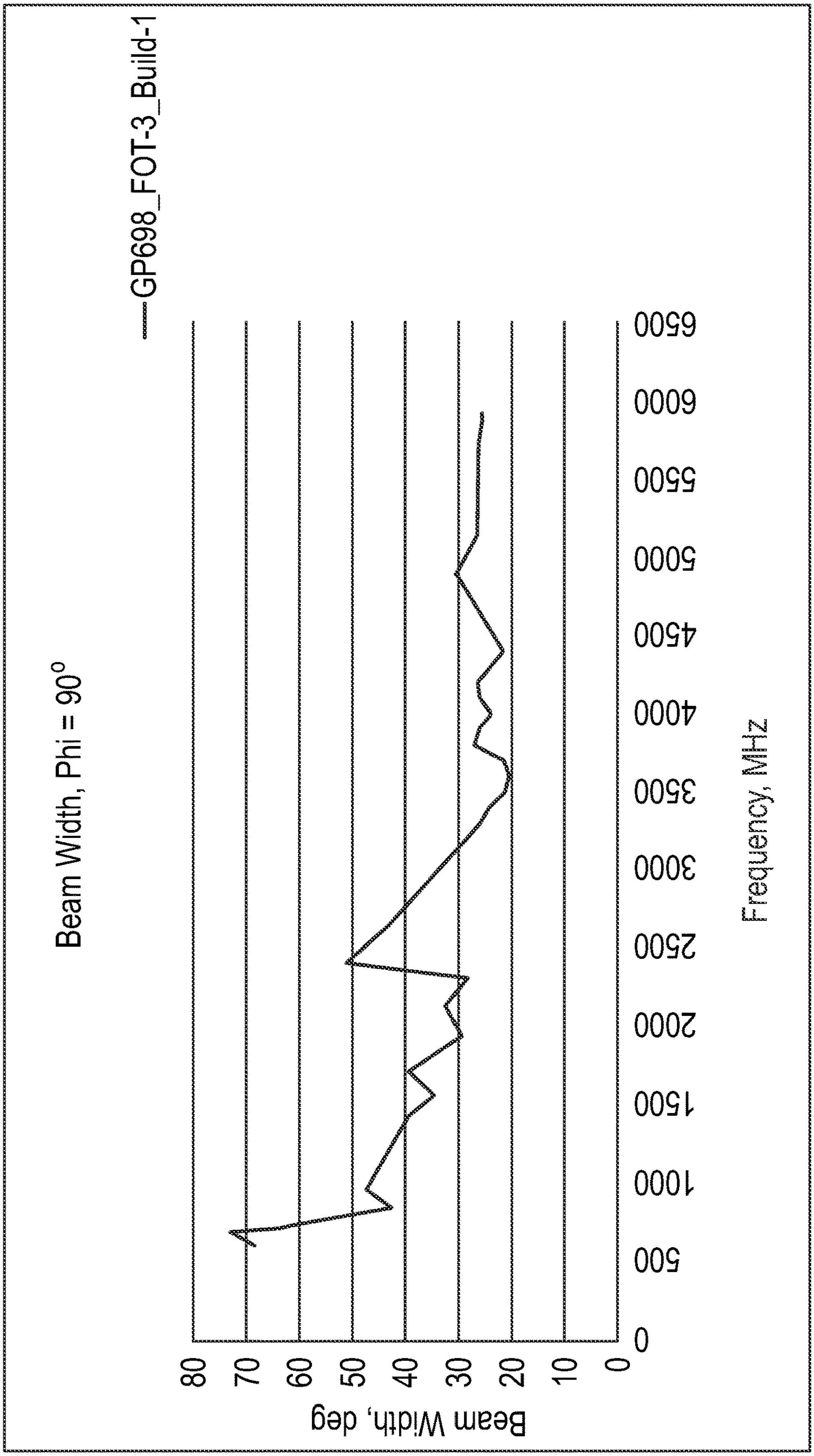

FIG. 44 is a line graph of efficiency (%) versus frequency (MHZ) measured for a prototype antenna assembly as shown in FIG. 38 in accordance with an exemplary embodiment FIG. 45 is a line graph of beam width (degrees), Phi=90° versus frequency (MHZ) measured for a prototype antenna assembly as shown in FIG. 38 in accordance with an exemplary embodiment.

Figure 46:
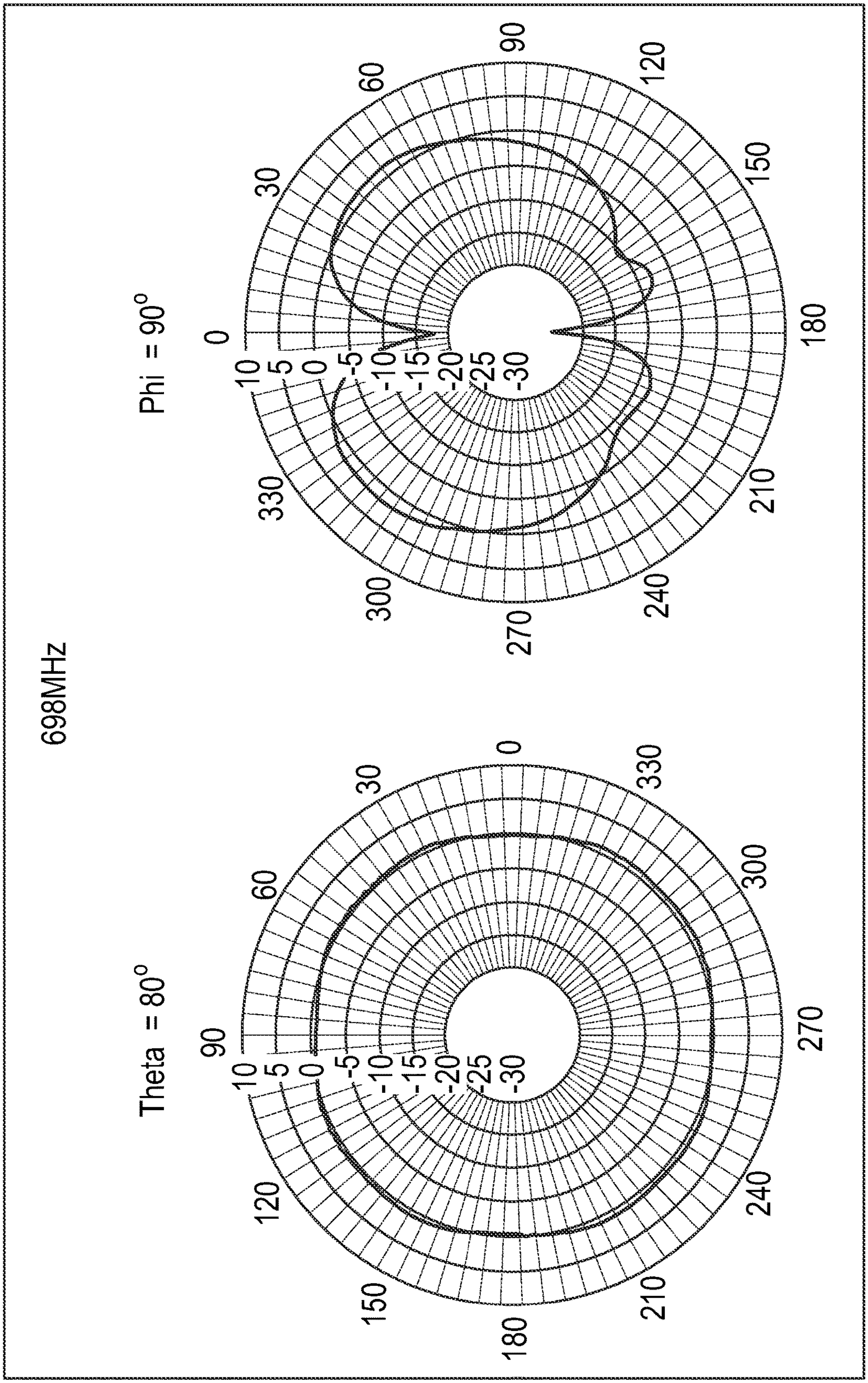

FIG. 46 illustrates radiation patterns (azimuth plane, phi zero degree plane, and phi ninety degree plane) measured for a prototype antenna assembly as shown in FIG. 38 at a frequency of 698 MHz.

Figure 47:
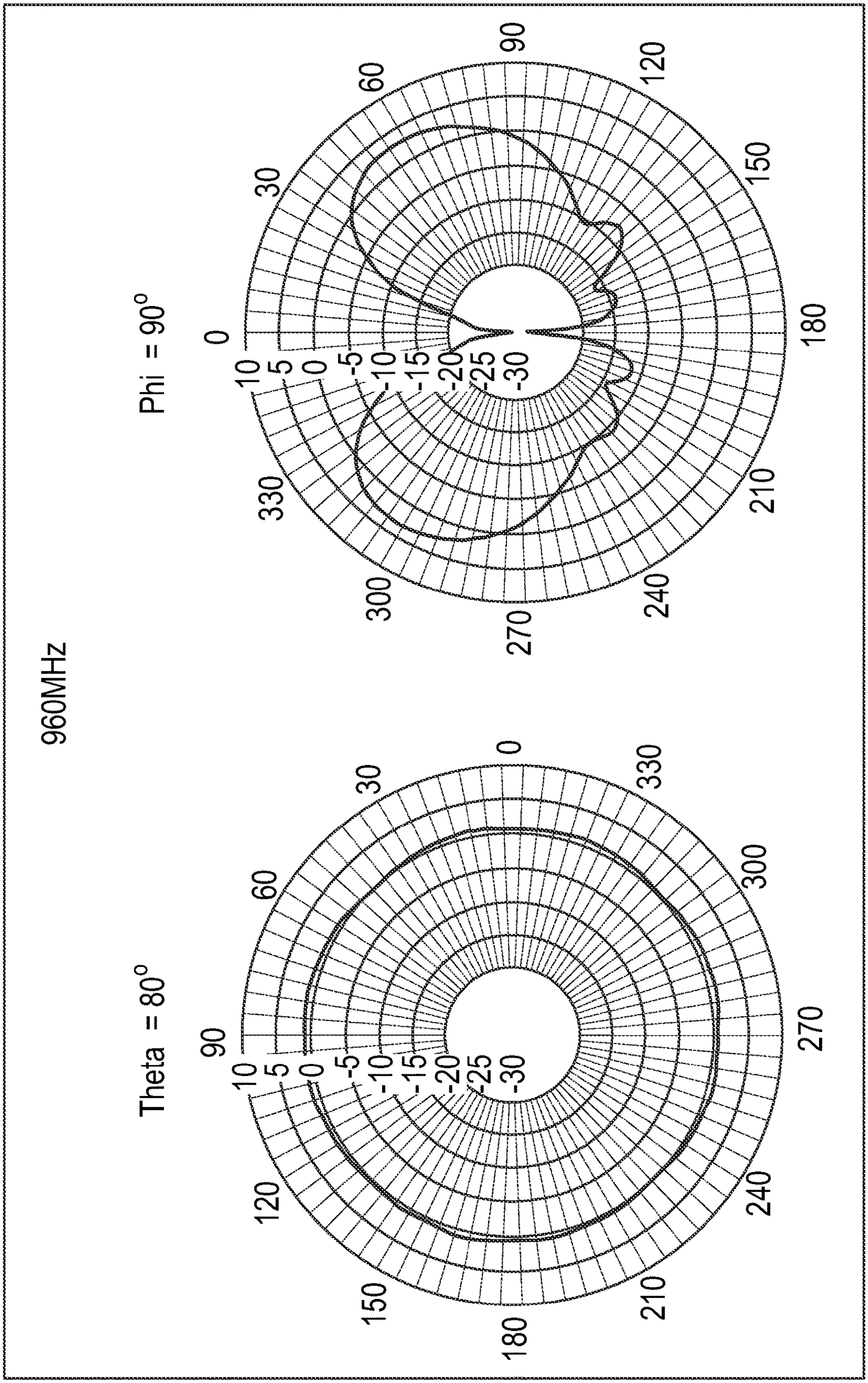

FIG. 47 illustrates radiation patterns (azimuth plane, phi zero degree plane, and phi ninety degree plane) measured for a prototype antenna assembly as shown in FIG. 38 at a frequency of 960 MHz.

Figure 48:
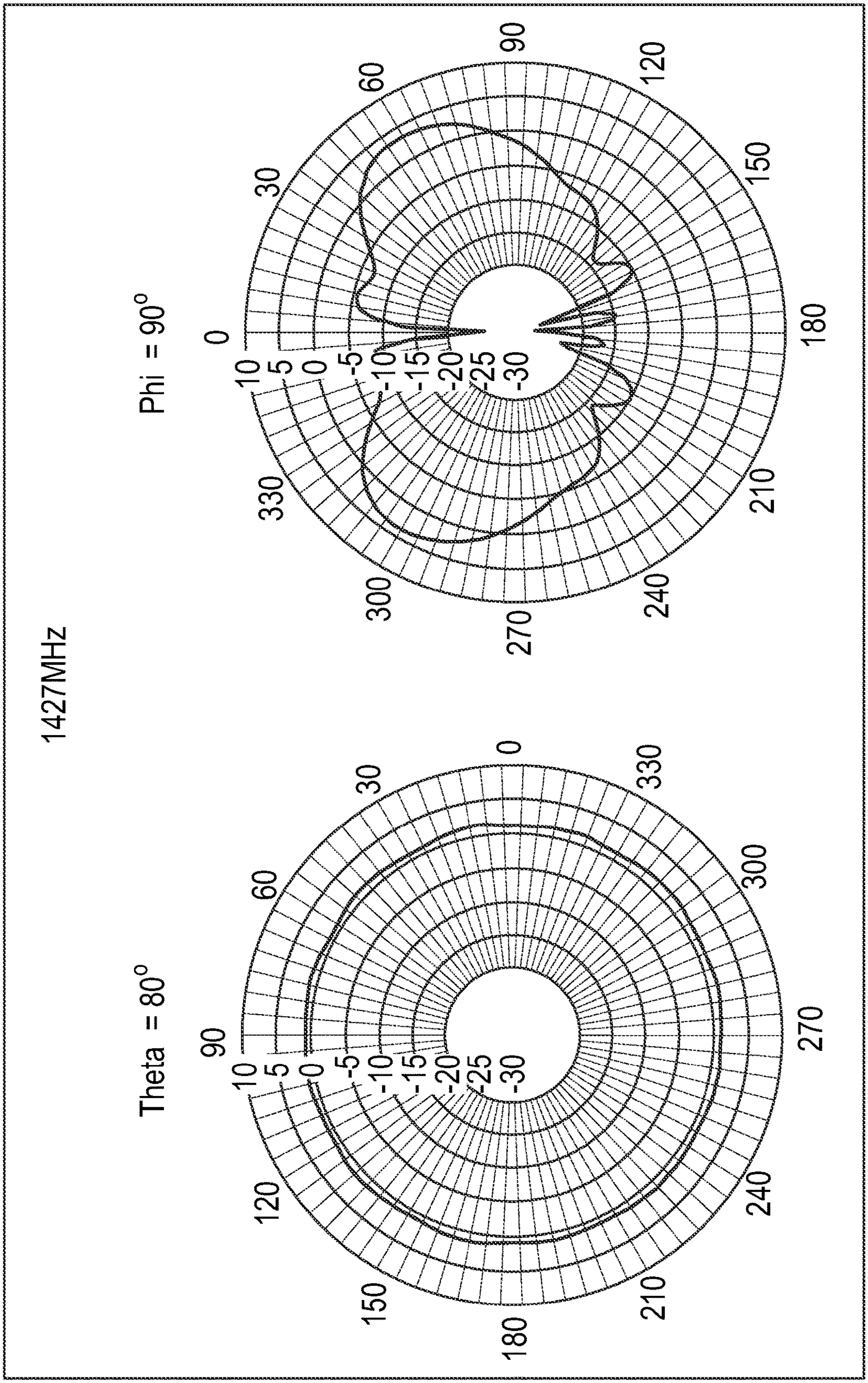

FIG. 48 illustrates radiation patterns (azimuth plane, phi zero degree plane, and phi ninety degree plane) measured for a prototype antenna assembly as shown in FIG. 38 at a frequency of 1427 MHz.

Figure 49:
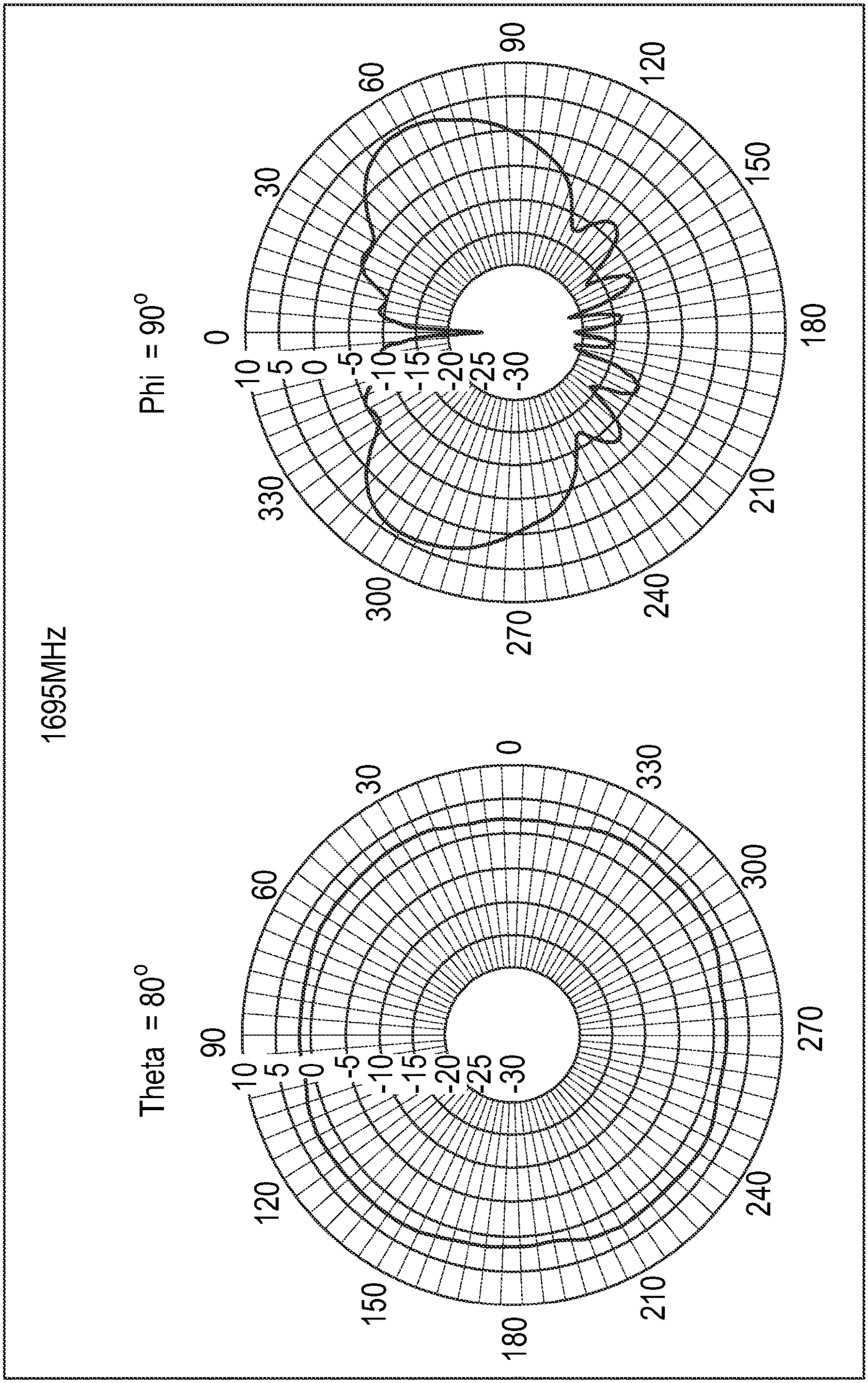

FIG. 49 illustrates radiation patterns (azimuth plane, phi zero degree plane, and phi ninety degree plane) measured for a prototype antenna assembly as shown in FIG. 38 at a frequency of 1695 MHz.

Figure 50:
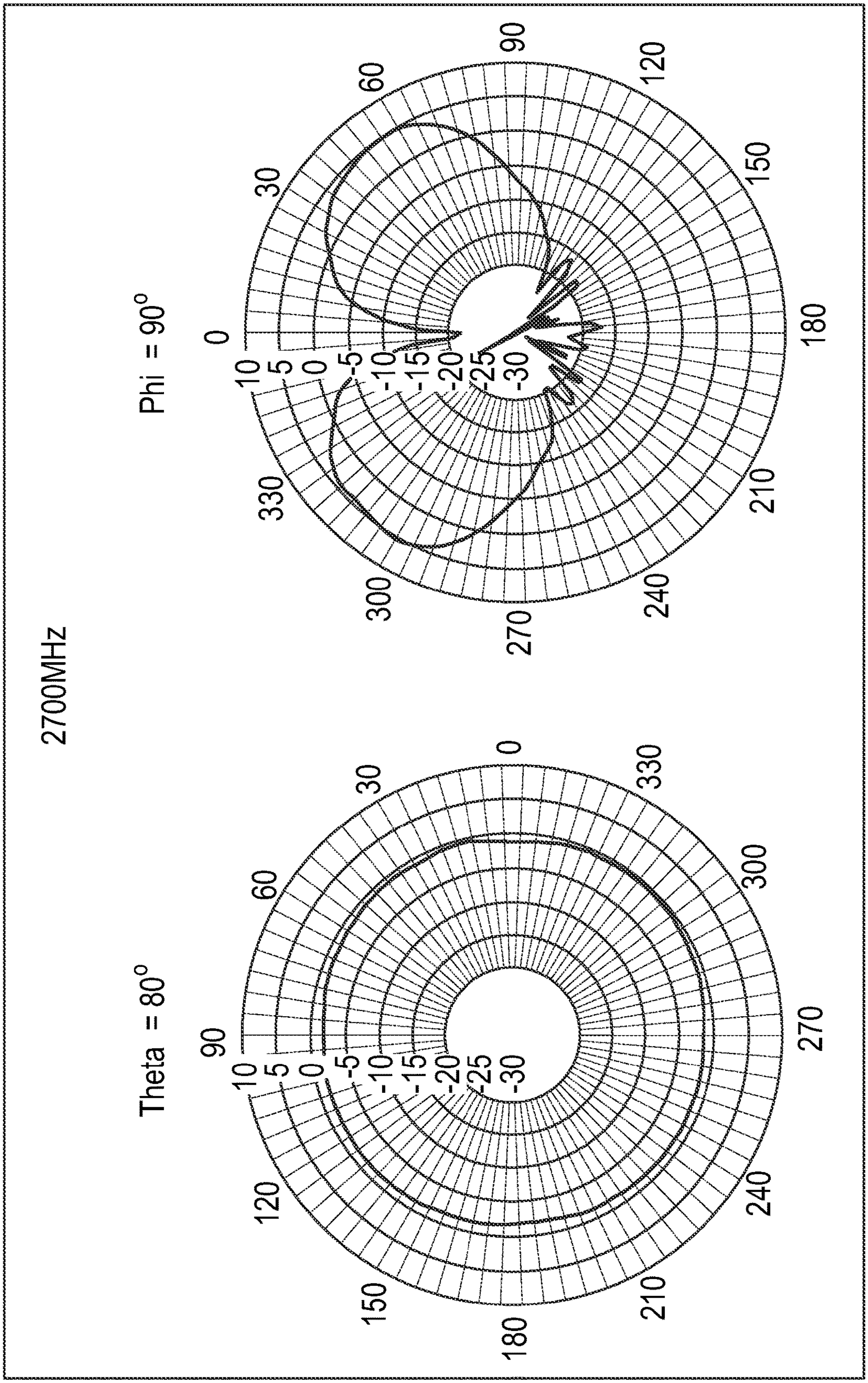

FIG. 50 illustrates radiation patterns (azimuth plane, phi zero degree plane, and phi ninety degree plane) measured for a prototype antenna assembly as shown in FIG. 38 at a frequency of 2700 MHz.

Figure 51:
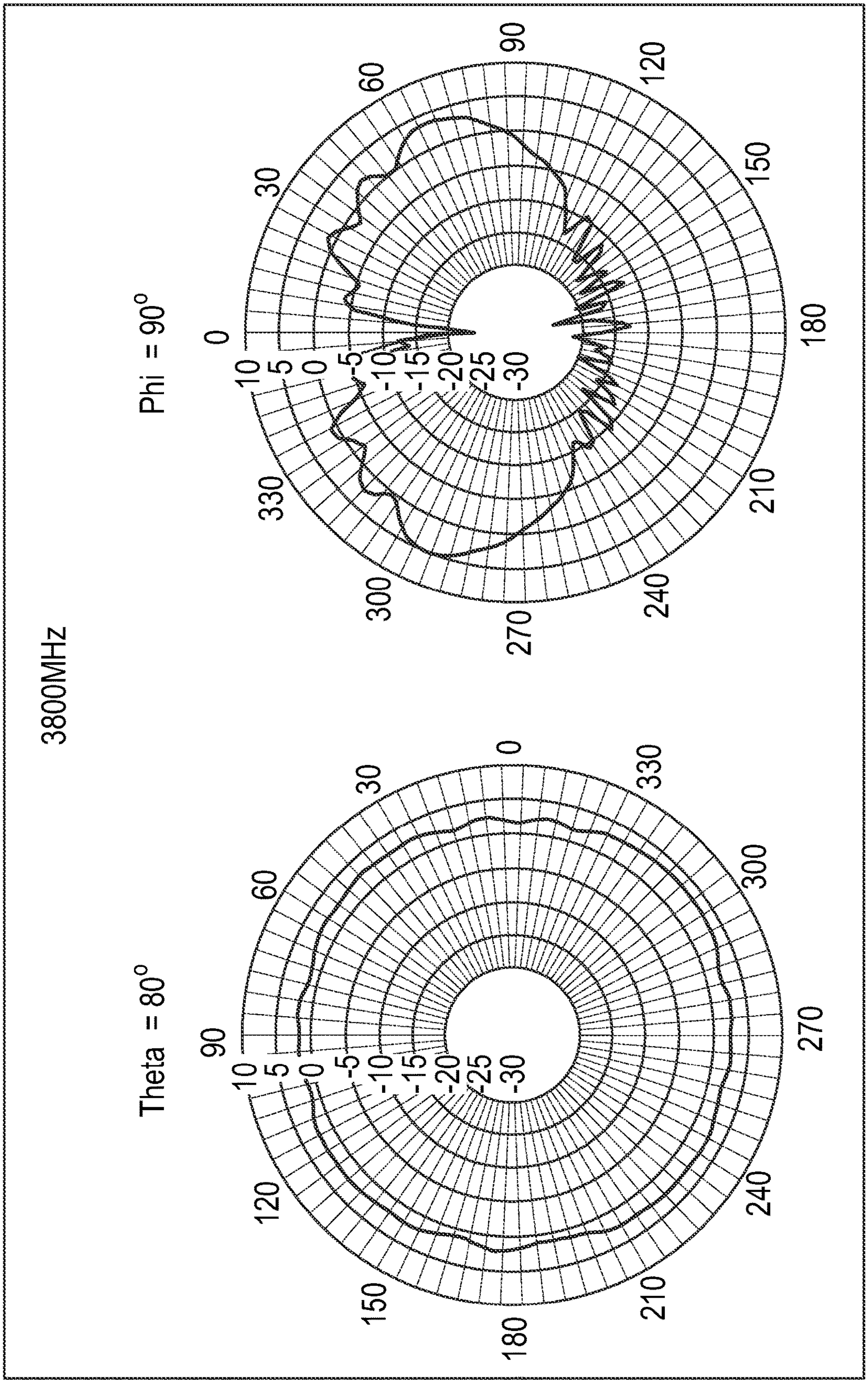

FIG. 51 illustrates radiation patterns (azimuth plane, phi zero degree plane, and phi ninety degree plane) measured for a prototype antenna assembly as shown in FIG. 38 at a frequency of 3800 MHz.

Figure 52:
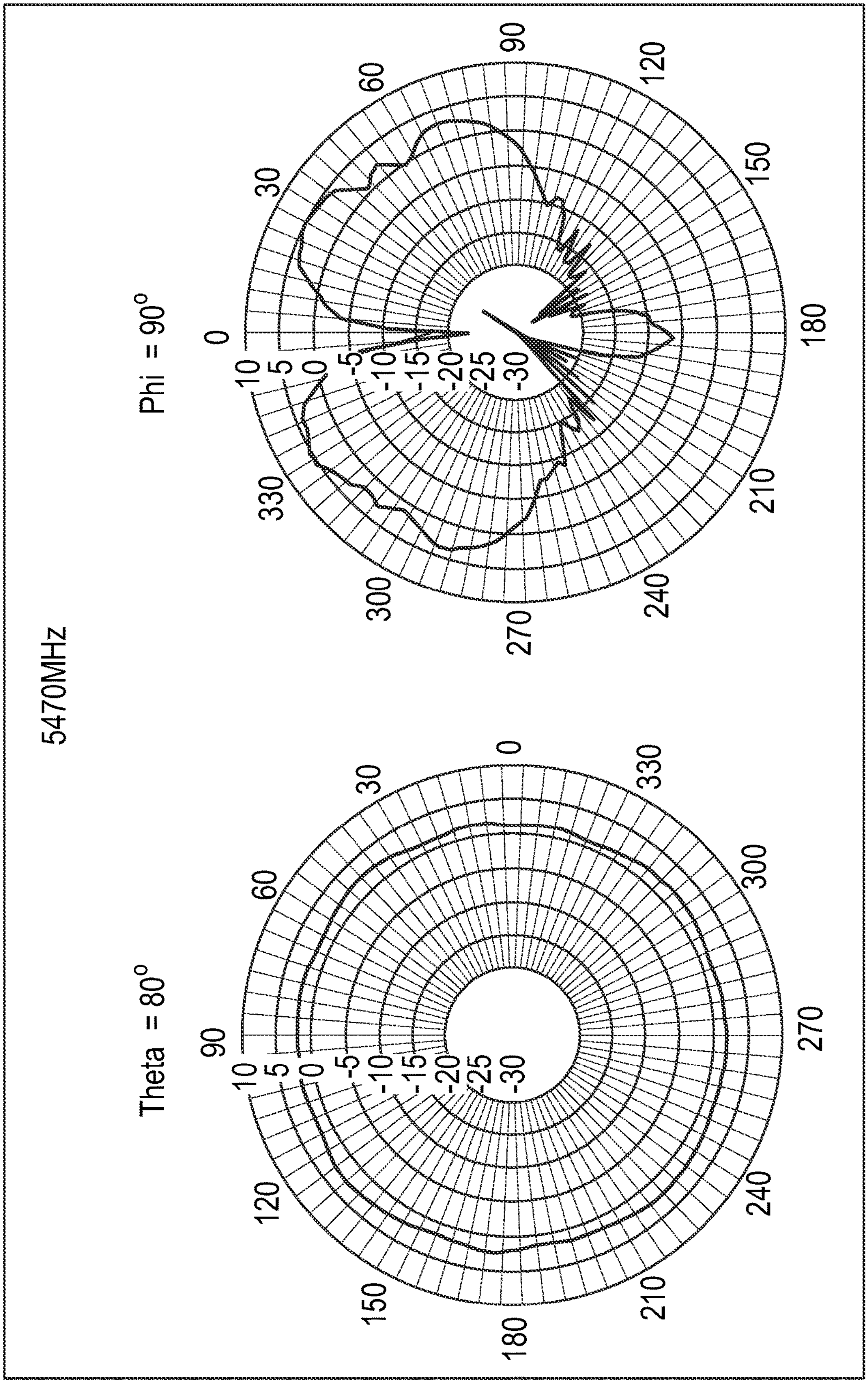

FIG. 52 illustrates radiation patterns (azimuth plane, phi zero degree plane, and phi ninety degree plane) measured for a prototype antenna assembly as shown in FIG. 38 at a frequency of 5470 MHz.

Figure 53:
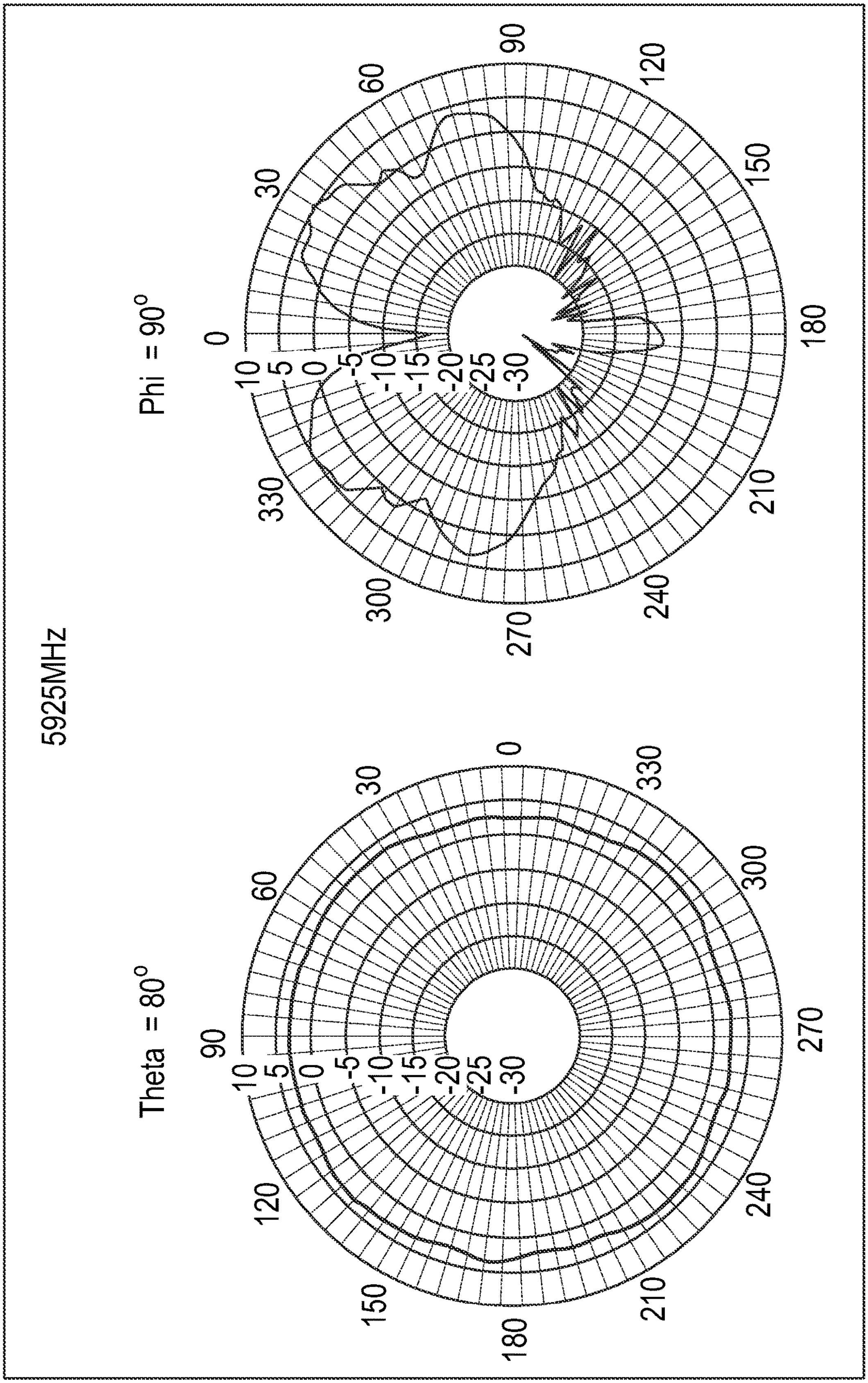

FIG. 53 illustrates radiation patterns (azimuth plane, phi zero degree plane, and phi ninety degree plane) measured for a prototype antenna assembly as shown in FIG. 38 at a frequency of 5925 MHz.

Corresponding reference numerals may indicate corresponding (but not necessarily identical) parts throughout the several views of the drawings.

DETAILED DESCRIPTION

Example embodiments will now be described more fully with reference to the accompanying drawings.

Disclosed herein are exemplary embodiments of antenna assemblies 100 including broadband rugged monopole antennas with high omnidirectional pattern conformity. As disclosed herein, exemplary embodiments may be configured to have improved bandwidth and omnidirectional performance. In various embodiments, the antenna assemblies 100 may be operable at frequencies from about 617 megahertz (MHz) to about 7125 MHz. In other embodiments, the antenna assemblies 100 may be operable at frequencies from about 698 megahertz (MHz) to about 7125 MHz. The antenna assemblies 100 may be operable at other target frequencies in alternative embodiments.

In exemplary embodiments, the antenna assembly 100 includes an antenna element 102 having a plurality of radiating elements 104 coupled to an antenna base 106 and surrounded by a radome 5. The radiating elements 104 may form a cross-shaped antenna structure for the antenna element 102. The radiating elements 104 are electrically connected to a feed 110 of the antenna base 106. In various embodiments, the radiating elements 104 are centrifugally symmetric radiating elements that enable broadband impedance, which allows the antenna assembly be used in a wide range of frequencies. The radiating elements 104 may be used in telecommunication applications at a wide range of telecommunication frequencies, including frequencies from about 617 MHz to about 7125 MHz or frequencies from about 698 megahertz (MHz) to about 7125 MHz, etc.

The radiating elements 104 may be tapered and folded radiating elements to provide a condensed overall shape, such as to have a small outer perimeter and/or to fit within a condensed space, such as the radome 5. In an exemplary embodiment, the radiating elements 104 include folded, crossed, tapered, metal elements that emulate wideband impedance characteristics of a conventional conical structure but at lower cost with less manufacturing complexity than the conical structure. Folding the radiating elements 104 decreases the volume for more compact packaging as compared to the conical structure.

A cylindrical ring may be integrated into the antenna base 106 of the antenna assembly 100. The cylindrical ring is configured to be operable or function as an impedance tuning component that enhances impedance bandwidth performance.

In an exemplary embodiment, strategically placed and sized cuts, slots, and apertures in the radiating elements 104 enhance impedance bandwidth and control radiating currents to optimize the gain above horizon across the bands of operation. The enhanced gain above horizon is further augmented by exceedingly low azimuth gain ripple enabled by the radially symmetrical antenna element 102.

In an exemplary embodiment, the antenna assemblies 100 may be configured to be operable with extreme omnidirectional conformance. The antenna assemblies 100 may be operable with less than 3 decibel variation and minimized variation in gain performance above horizon over frequencies from about 617 megahertz (MHz) to about 7125 MHz or frequencies from about 698 megahertz (MHz) to about 7125 MHz, etc.

Figure 3:
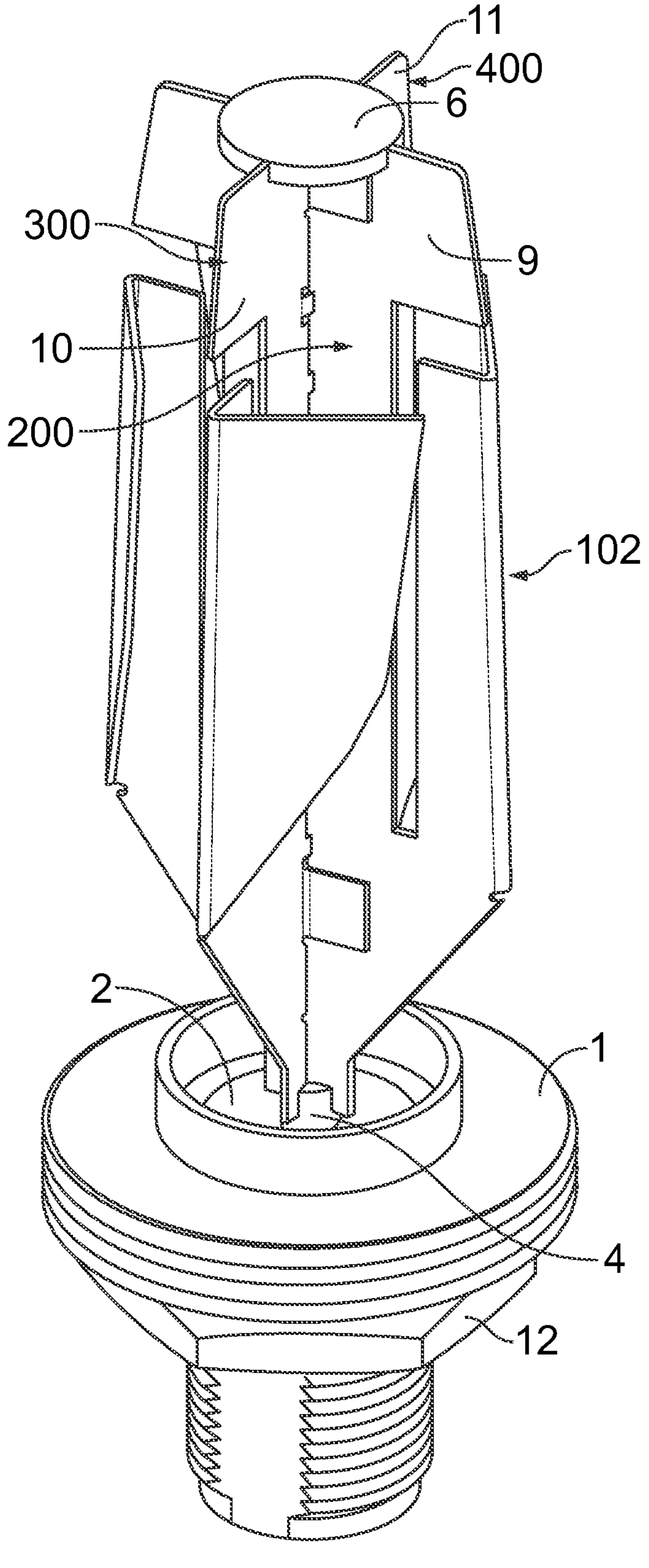
FIG. 3 is an assembled view of the antenna assembly in accordance with another exemplary embodiment.

FIG. 1 is an exploded view of the antenna assembly 100 in accordance with an exemplary embodiment. FIG. 2 is an assembled view of the antenna assembly 100 in accordance with an exemplary embodiment. FIG. 3 is an assembled view of the antenna assembly 100 in accordance with another exemplary embodiment. The embodiments of the antenna assemblies 100 shown in FIGS. 2 and 3 may be operable in different target frequencies, such as frequencies from about 698 megahertz (MHz) to about 7125 MHz or frequencies from about 617 megahertz (MHz) to about 7125 MHz, respectively.

In an exemplary embodiment, the antenna assembly 100 includes a connector body 1, an electrical insulator 2, a center pin 3, a contact pin 4, a radome 5, a pad 6 (e.g., Ethylene Propylene Diene Monomer (EPDM), etc.). O-ring 7 (e.g. EPDM, etc.), radiating element 9, radiating element 10, radiating element 11, a threaded connector nut 12 (e.g., wash, Tloc-I, ⅝-18 NF, etc.), cap 13, a connector or fastener 14 (e.g., wash, Tloc-I, ⅝-18 SS, NF, etc.), O-ring 15 (e.g., EPDM, etc.), and a unit label 16. The radiating element 9, 10, 11 define the radiating elements 104 of the antenna element 102.

In an exemplary embodiment, the center pin 3 and contact pin 4 form the feed 110 of the antenna element 102. The center pin 3 may be terminated to a wire or cable in various embodiments. The center pin 3 may be terminated to a circuit board in other various embodiments. The center pin 3 is received in the electrical insulator 2. The contact pin 4 is configured to be coupled to the radiating elements 104. The feed 110 may include other contacts in alternative embodiments. The feed 110 may have a single contact or pin in other embodiments.

In an exemplary embodiment, the antenna base 106 includes the connector body 1, the electrical insulator 2, the threaded connector nut 12, the cap 13, the fastener 14 and the O-ring 7. The antenna base 106 may include other components in alternative embodiments. In an exemplary embodiment, the connector body 1 is conductive. For example, the connector body 1 may be metal. In various embodiments, the connector body 1 may be die cast or machined. In other embodiments, the connector body 1 may be molded, such as from a conductive plastic material. In an exemplary embodiment, the connector body 1 is configured to be electrically grounded, such as being connected to a ground plane or other grounded component, such as a panel, a chassis, a circuit board, or other supporting structure. The O-rings 7 is used to seal the connector body 1 to the mounting structure, such as the panel. In an exemplary embodiment, the fastener 14 and the connector nut 12 are used to secure the connector body 1 to the mounting structure, such as the panel. For example, the connector nut 12 may be threadably coupled to the end of the connector body 1. The cap 13 may cover the end of the connector body 1. The electrical insulator 2 electrically isolates the feed 110 from the connector body 1.

FIGS. 2 and 3 show the antenna element 102 in an assembled state. The radiating elements 9, 10, 11 are assembled together to form the antenna element 102. In an exemplary embodiment, the radiating element 9 is a central radiating element 200, the radiating element 10 is a first side radiating element 300 coupled to a first side of the central radiating element 200, and the radiating element 11 is a second side radiating element 400 coupled to a second side of the central radiating element 200. The radiating elements 200, 300, 400 are assembled together (for example, spot welded, soldered, and the like) into the antenna element 102, which is coupled to the connector body 1. In an exemplary embodiment, the antenna element 102 is a broadband, rugged monopole antenna. The monopole antenna element 102 may emulate the wideband impedance characteristics of a conventional conical structure. As disclosed herein, the antenna assembly 100 including the monopole antenna element 102 may be configured to operate with high omnidirectional pattern conformity. In various embodiments, the monopole antenna element 102 is operable at frequencies from about 617 megahertz (MHz) to about 7125 MHz or from frequencies from about 698 megahertz (MHz) to about 7125 MHz.

The lower portion of the antenna element 102 is configured for engagement within slots in the upper portion of the contact pin 4. In turn, the lower portion of the contact pin 4 is configured to be slid into and engagingly received within the slotted end portion or socket of the center pin 3. Advantageously, this connection scheme of the antenna element 102, contact pin 4, and center pin 3 may improve manufacturability.

In an exemplary embodiment, the antenna element 102 includes the central radiating element 200, the first side radiating element 300 coupled to a central axis of the central radiating element 200, and the second side radiating element 400 coupled to the central axis of the central radiating element 200. The central radiating element 200, the first side radiating element 300, and the second side radiating element 400 form the cross shaped antenna structure extending along a central antenna axis 202. In an exemplary embodiment, the central radiating element 200, the first side radiating element 300, and the second side radiating element 400 have radial symmetry about the central antenna axis 202 for high omni-directional conformance. The central radiating element 200 defines a front radiator forward of the central axis 202 and a rear radiator rearward of the central axis 202. The first side radiating element defines a first side radiator at a first side of the central axis. The second side radiating element defines a second side radiator at a second side of the central axis. The front radiator, the rear radiator, the first side radiator, and the second side radiator are radially symmetrical, such as about the central antenna axis 202. In an exemplary embodiment, the central radiating element 200, the first side radiating element 300, and the second side radiating element 400 have an omni-directional conformance of less than 5 dB and in some embodiments less than 3 dB. The antenna element 102 has good gain above the horizon, such as in the azimuth direction.

In an exemplary embodiment, the antenna element 102 is a broadband antenna element. The central radiating element 200, the first side radiating element 300, and the second side radiating element 400 are operable in at least one low frequency band, such as a frequency band of between 600 megahertz (MHz) and 700 megahertz (MHz) and in at least one high frequency band, such as a frequency band of between 7000 megahertz (MHz) and 8000 megahertz (MHz). The central radiating element 200, the first side radiating element 300, and the second side radiating element 400 may operable in other frequency bands, such as one or more frequency bands between the low and high frequency bands. The central radiating element 200, the first side radiating element 300, and the second side radiating element 400 may have tapered shapes at bottoms thereof for broadband performance. The tapered shape has increased inductance and/or decreased capacitance at the bottom, such as at the antenna base 106. The tapered shape may have improved electrical field distribution at many frequencies.

In an exemplary embodiment, the antenna element 102 has a condensed overall shape, such as being folded inward to reduce the overall size of the antenna element 102. The condensed shape allows fitting of the antenna element 102 in a smaller overall radome. The antenna element 102 includes cuts, openings, apertures, branches, stubs, radiating structures and the like to control gain above the horizon, such as at one or more target frequencies.

FIGS. 4A, 4B, and 4C respectively illustrate flat patterns and folded configurations of the first side radiating element 200, the central radiating element 300, and the second side radiating element 400, respectively, corresponding to the antenna element 102 shown in FIG. 2. FIG. 4D illustrates the antenna element 102 with the radiating elements 200, 300, 400 after being assembled (for example, soldered, spot welded, and the like) into a broadband rugged monopole antenna element, corresponding to the antenna element 102 shown in FIG. 2. The radiating elements of the antenna element 102 shown in FIG. 3 may have different features (for example, different shaped features, different locations of slots, apertures, resonating components, and the like); however, the overall shape and components may be similar).

The central radiating element 200 (FIG. 4B) is a conductive structure configured to form part of the antenna element 102. In an exemplary embodiment, the central radiating element 200 is stamped and formed from a metal blank or plate. The central radiating element 200 is initially stamped in a flat pattern 200' and then formed into a formed shape that defines the central radiating element 200.

In an exemplary embodiment, the central radiating element 200 is symmetric about a central axis 202. For example, the central radiating element 200 includes a first or front portion 204 at a front side of the central axis 202 and a second or rear portion 206 at a rear side of the central axis 202, where the front and rear portions 204, 206 are identical (for example, mirrored halves). However, the front and rear portions 204, 206 may have different features in alternative embodiments, such as to have different antenna characteristics (for example, to target different frequencies or directional radiating patterns).

In an exemplary embodiment, the central radiating element 200 includes tab slots 208 along the central axis 202 that receive portions of the first and second side radiating elements 300, 400 to position the first and second side radiating elements 300, 400 relative to the central radiating element 200.

The central radiating element 200 includes a main panel 210 extending between a top 212 and a bottom 214 of the central radiating element 200. The main panel 210 extends between a front 216 and a rear 218. The main panel 210 has a front portion 210*a* between the central axis 202 and a front edge 226 at the front 216. The main panel 210 has a rear portion 210*b* between the central axis 202 and a rear edge 228 at the rear 218. In various embodiments, the front and rear edges 226, 228 are parallel to each other and parallel to the central axis 202. In alternative embodiments, the front and rear edges 226, 228 may be angled or tapered such that the front and rear edges 226, 228 are transverse to the central axis 202. The main panel 210 has a first side 220 and a second side 222 opposite the first side 220. The sides 220, 222 extend between the top 212 and the bottom 214. The sides 220, 222 extend between the front 216 and the rear 218. The first side radiating element 300 is configured to be coupled to the first side 220. The second side radiating element 400 is configured to be coupled to the second side 222.

In an exemplary embodiment, the main panel 210 includes a feed portion 230 at the bottom 214 and a resonator portion 250 at the top 212. The feed portion 230 is configured to be coupled to the feed 110 (shown in FIG. 1). The main panel 210 includes an aperture 240 between the feed portion 230 and the resonator portion 250. The resonator portion 250 includes resonating features that define antenna characteristics of the antenna element 102, such as the target frequencies, the return loss, the antenna gain, and the like. The radiation pattern of the antenna element 102 may be controllable with great freedom by changing physical characteristics of the radiating structure and/or the feeding structure and/or the ground structure. For example, resonating features and slots/apertures/cuts may be adjusted to achieve desired beamwidth, front-to-back ratio, directivity, gain, and the like to improve the operation of the antenna element 102 at target frequency(ies).

The aperture 240 may be formed during the stamping process. The aperture 240 separates the feed portion 230 from the resonator portion 250. The size and shape of the aperture 240 affects the antenna characteristics of the central radiating element 200. The orientation of the aperture 240 (for example, vertical, horizontal, or other orientation direction) affects the antenna characteristics of the central radiating element 200. The aperture 240 may have a regular shape, such as a rectangular shape. However, the aperture 240 may have other shapes in alternative embodiments, such as an L-shape. The position of the aperture 240 along the main panel 210 (for example, distance from the top 212, from the bottom 214, from the front 216, from the rear 218, from the first side 220, from the second side 222, and the like) affects the antenna characteristics of the central radiating element 200. In various embodiments, the aperture 240 may be approximately centered between the top 212 and the bottom 214. As such, the feed portion 230 and the resonator portion 250 have approximately equal areas of the main panel 210. However, in alternative embodiments, the aperture 240 may be offset, such as closer to the bottom 214 such that the resonator portion 250 has a larger area of the main panel 210 than the feed portion 230, or vice versa. In an exemplary embodiment, the aperture 240 extends across the central axis 202 such that the aperture 240 is located in both the front portion 210*a* and the rear portion 210*b*. The aperture 240 may be symmetric about the central axis 202 such that the front portion and the rear portion of the aperture 240 are identical on both sides of the central axis 202.

The main panel 210 includes one or more flanking portions 242 flanking the aperture 240. The flanking portions 242 electrically connect the feed portion 230 and the resonator portion 250. In the illustrated embodiment, the main panel 210 includes flanking portions 242 both forward of and rearward of the aperture 240 (for example, between the aperture 240 and the front and rear edges 226, 228). As such, each of the front portion 210*a* and the rear portion 210*b* have a corresponding flanking portion 242. The flanking portions 242 are defined between the aperture 240 and the front 212 or the rear 218.

The aperture 240 is defined by edges 244, 246. The edges 244, 246 face each other across the gap defined by the aperture 240. The edge 244 extends along the top of the feed portion 230. The edge 246 extends along the bottom of the resonator portion 250. The edges 244, 246 may be capacitively coupled to each other across the aperture 240. The width of the aperture 240 (for example spacing between the edges 244, 246) affects the antenna characteristics of the central radiating element 200.

The feed portion 230 is located at the bottom 214 of the main panel 210. In an exemplary embodiment, the feed portion 230 includes a feed tab 232 at the bottom 214. The feed tab 232 is configured to be electrically connected to the feed 110 (shown in FIG. 1). For example, the feed tab 232 may be plugged into a slot at a top of the contact pin 4 (shown in FIG. 1). The feed tab 232 is provided at the central axis 202 such that the feed tab 232 is provided on both the front portion 210*a* and the rear portion 210*b*.

In an exemplary embodiment, the feed portion 230 is tapered at the bottom 214. For example, the feed portion 230 includes tapered edges 234, 236 that extend from the bottom 214 to the front and rear edges 226, 228, respectively. The feed portion 230 is tapered such that the feed portion 230 is narrower at the bottom 214. In the illustrated embodiment, the tapered edges 234, 236 are linear. However, the tapered edges 234, 236 may have other shapes in alternative embodiments, such as being curved or stepped.

The resonator portion 250 is located at the top 212 of the main panel 210. In an exemplary embodiment, the resonator portion 250 includes one or more slots 252 cut into the resonator portion 250. The slot(s) 252 separate portions of the main panel 210 from other portions to form a resonating structure. The main panel 210 includes one or more branches 254 that surround the slot(s) 252. Each branch 254 defines a stub. The size and shape of the stub affects antenna characteristics, such as to control gain above the horizon at one or more target frequencies. Each branch 254 includes multiple legs 256 extending along the various sides of the corresponding slot 252. For example, in the illustrated embodiment, the branch 254 includes an inner leg 260, an outer leg 262, and a connecting leg 264 between the inner and outer legs 260, 262. The inner leg 260 extends along an inner portion of the slot 252. The outer leg 262 extends along an outer portion of the slot 252, and the connecting leg 264 extends along the upper portion of the slot 252. The branch 254 may include greater or fewer legs depending on the shape of the slot 252. Providing multiple legs 260, 262, 264 widen the frequency bands in which the antenna element 102 operates efficiently. For example, the multiple legs 260, 262, 264 defining different radiating structures having different path lengths. The shorter paths operate at higher frequencies and the longer path operate at lower frequencies.

In the illustrated embodiment, the slot 252 is oriented generally vertically. However, the slot 252 may have other orientations in alternative embodiments. The width, length, and orientation of the slot 252 affects the antenna characteristics of the resonator portion 250. Similarly, the widths, lengths, and orientations of the legs 260, 262, 264 affect the antenna characteristics of the resonator portion 250. In the illustrated embodiment, the legs 260, 262, 264 have different lengths and different widths from each other. For example, the outer leg 262 is narrower than the inner leg 260 and/or the connecting leg 264. The legs 260, 262 may be capacitively coupled to each other across the slot 252. The width of the slot 252 (for example, spacing between the edges of the legs 260, 262) affects the antenna characteristics of the central radiating element 200. The distal end of the outer leg 262 may be capacitively coupled to the resonator portion 250 of the main panel 210 across the slot 252. The width of the slot 252 (for example, spacing between the distal end of the outer leg 262 and the main panel 210) affects the antenna characteristics of the central radiating element 200.

In an exemplary embodiment, the central radiating element 200 includes a front wing 270 extending from the front edge 226 of the main panel 210 and a rear wing 280 extending from the rear edge 228 of the main panel 210. The wings 270, 280 are integral with the main panel 210. For example, the wings 270, 280 are stamped from the same metal sheet with the main panel 210. The wings 270, 280 are bent out of plane relative to the main panel 210 during the forming process. The wings 270, 280 are oriented transverse to the main panel 210. In an exemplary embodiment, both wings 270, 280 are bent in a counterclockwise direction such that the front wing 270 is bent toward the second side 222 and the rear wing 280 is bent toward the first side 220. In an exemplary embodiment, the wings 270, 280 are oriented non-perpendicular to the main panel 210. For example, the wings 270, 280 are oriented at acute angles relative to the main panel 210.

The front wing 270 extends between a proximal end 272 and a distal end 274. The proximal end 272 extends from the front edge 226. In an exemplary embodiment, the proximal end 272 extends from the feed portion 230 and the resonator portion 250. For example, the proximal end 272 is located both above and below the aperture 240. However, in alternative embodiments, the proximal end 272 extends from only the feed portion 230 or only the resonator portion 250. A bend 276 is defined at the intersection of the proximal end 272 and the front edge 226. The front wing 270 is bent at an angle relative to the main panel 210 at the bend 276. The proximal end 272 may be oriented parallel to the central axis 202 in various embodiments. In an exemplary embodiment, the distal end 274 is oriented parallel to the proximal end 272. For example, the front wing 270 may have a uniform width between the proximal end 272 and the distal end 274. However, in alternative embodiments, the front wing 270 may have other shapes. For example, the width of the front wing 270 may vary, such as being wider at the top and/or at the bottom of the front wing 270. In other various embodiments, the front wing 270 may include multiple bends; and/or may be curved.

In an exemplary embodiment, the front wing 270 includes wing tips 278 at the top and/or the bottom of the front wing 270. The proximal end 272 of the front wing 270 is not connected to the main panel 210 at the wing tips 278. The wing tips 278 are free from the main panel 210. Optionally, the wing tips 278 may be bent relative to other portions of the front wing 270 such that the wing tips 278 are non-coplanar. The wing 270 and the wing tips 278 form resonating structures that affect the operating frequencies and widen the frequency bands in which the antenna element 102 operates efficiently. For example, the wing 270 and the wing tips 278 have different path lengths that operate at different frequencies.

In the illustrated embodiment, the front wing 270 is illustrated as being generally rectangular and planar. However, in various alternative embodiments, the front wing 270 may have other shapes. The front wing 270 may include cuts, slots, apertures, branches, legs, or other features that define radiating structures that affect the antenna characteristics of the central radiating element 200.

The rear wing 280 extends between a proximal end 282 and a distal end 284. The proximal end 282 extends from the rear edge 228. In an exemplary embodiment, the proximal end 282 extends from the feed portion 230 and the resonator portion 250. For example, the proximal end 282 is located both above and below the aperture 240. However, in alternative embodiments, the proximal end 282 extends from only the feed portion 230 or only the resonator portion 250. A bend 286 is defined at the intersection of the proximal end 282 and the rear edge 228. The rear wing 280 is bent at an angle relative to the main panel 210 at the bend 286. The proximal end 282 may be oriented parallel to the central axis 202 in various embodiments. In an exemplary embodiment, the distal end 284 is oriented parallel to the proximal end 282. For example, the rear wing 280 may have a uniform width between the proximal end 282 and the distal end 284. However, in alternative embodiments, the rear wing 280 may have other shapes. For example, the width of the rear wing 280 may vary, such as being wider at the top and/or at the bottom of the rear wing 280. In other various embodiments, the rear wing 280 may include multiple bends; and/or may be curved.

In an exemplary embodiment, the rear wing 280 includes wing tips 288 at the top and/or the bottom of the rear wing 280. The proximal end 282 of the rear wing 280 is not connected to the main panel 210 at the wing tips 288. The wing tips 288 are free from the main panel 210. Optionally, the wing tips 288 may be bent relative to other portions of the rear wing 280 such that the wing tips 288 are non-coplanar.

In the illustrated embodiment, the rear wing 280 is illustrated as being generally rectangular and planar. However, in various alternative embodiments, the rear wing 280 may have other shapes. The rear wing 280 may include cuts, slots, apertures, branches, legs, or other features that define radiating structures that affect the antenna characteristics of the central radiating element 200.

The first side radiating element 300 (FIG. 4A) is a conductive structure configured to form part of the antenna element 102. In an exemplary embodiment, the first side radiating element 300 is stamped and formed from a metal blank or plate. The first side radiating element 300 is initially stamped in a flat pattern 300' and then formed into a formed shape that defines the first side radiating element 300.

The first side radiating element 300 is configured to be coupled to the first side 220 of the central radiating element 200 to form the antenna element 102. In an exemplary embodiment, the first side radiating element 300 includes locating tabs 308 along an inner edge of the first side radiating element 300. The locating tabs 308 are used to position the first side radiating element 300 relative to the central radiating element 200. The locating tabs 308 are configured to be received in corresponding tab openings 208 in the central radiating element 200. In an exemplary embodiment, the first side radiating element 300 includes mounting tabs 302 along an inner edge of the first side radiating element 300. The mounting tabs 302 are used to mount the first side radiating element 300 to the central radiating element 200. The mounting tabs 302 may be soldered or welded to the central radiating element 200, such as along the central axis 202.

The first side radiating element 300 includes a main panel 310 extending between a top 312 and a bottom 314 of the first side radiating element 300. The main panel 310 extends between an interior 316 and an exterior 318. The interior 316 of the first side radiating element 300 has an inner edge 326 configured to be coupled to the first side 220 of the central radiating element 300. The locating tabs 308 and the mounting tabs 302 extend from the inner edge 326 for connection to the central radiating element 300. The exterior 318 of the first side radiating element 300 has an outer edge 328. The main panel 310 has a first side 320 and a second side 322 opposite the first side 320.

In an exemplary embodiment, the main panel 310 includes a feed portion 330 at the bottom 314 and a resonator portion 350 at the top 312. The feed portion 330 is configured to be coupled to the feed 110 (shown in FIG. 1). The resonator portion 350 includes resonating features that define antenna characteristics of the antenna element 102, such as the target frequencies, the return loss, the antenna gain, and the like. The main panel 310 includes an aperture 340 between the feed portion 330 and the resonator portion 350.

The aperture 340 may be formed during the stamping process. The aperture 340 separates the feed portion 330 from the resonator portion 350. The size and shape of the aperture 340 affects the antenna characteristics of the first side radiating element 300. The orientation of the aperture 340 (for example, vertical, horizontal, or other orientation direction) affects the antenna characteristics of the first side radiating element 300. The aperture 340 may have a regular shape, such as a rectangular shape. However, the aperture 340 may have other shapes in alternative embodiments, such as an L-shape. The position of the aperture 340 along the main panel 310 (for example, distance from the top 312, from the bottom 314, from the interior 316, from the exterior 318, and the like) affects the antenna characteristics of the first side radiating element 300. In various embodiments, the aperture 340 may be approximately centered between the top 312 and the bottom 314. As such, the feed portion 330 and the resonator portion 350 have approximately equal areas of the main panel 310. However, in alternative embodiments, the aperture 340 may be offset, such as closer to the bottom 314 such that the resonator portion 350 has a larger area of the main panel 310 than the feed portion 330, or vice versa. In an exemplary embodiment, the aperture 340 is open at the interior 316. The aperture 340 is at a similar position as the aperture 240 of the central radiating element 200 such that the aperture 340 may be open to the aperture 240.

The main panel 310 includes a flanking portion 342 flanking the aperture 340. The flanking portion 342 electrically connects the feed portion 330 and the resonator portion 350. In the illustrated embodiment, flanking portion 342 is provided at the exterior 318. However, the flanking portion 342 may additionally or alternatively be provided at the interior 316.

The aperture 340 is defined by edges 344, 346. The edges 344, 346 face each other across the gap defined by the aperture 340. The edge 344 extends along the top of the feed portion 330. The edge 346 extends along the bottom of the resonator portion 350. The edges 344, 346 may be capacitively coupled to each other across the aperture 340. The width of the aperture 340 (for example spacing between the edges 344, 346) affects the antenna characteristics of the first side radiating element 300.

The feed portion 330 is located at the bottom 314 of the main panel 310. In an exemplary embodiment, the feed portion 330 includes a feed tab 332 at the bottom 314. The feed tab 332 is configured to be electrically connected to the feed 110 (shown in FIG. 1). For example, the feed tab 332 may be plugged into a slot at a top of the contact pin 4 (shown in FIG. 1). In an exemplary embodiment, the feed tab 332 is provided at the interior 316.

In an exemplary embodiment, the feed portion 330 is tapered between the interior 316 and the exterior 318 at the bottom 314. For example, the feed portion 330 includes a tapered edge 334 that extends from the interior 316 at the bottom 314 to the exterior 318. In the illustrated embodiment, the tapered edge 334 is linear. However, the tapered edge 334 may have other shapes in alternative embodiments, such as being curved or stepped.

The resonator portion 350 is located at the top 312 of the main panel 310. In an exemplary embodiment, the resonator portion 350 includes one or more slots 352 cut into the resonator portion 350. The slot 352 separates portions of the main panel 310 from other portions to form a resonating structure. The main panel 310 includes one or more branches 354 that surround the slot(s) 352. Each branch 354 defines a stub. The size and shape of the stub affects antenna characteristics, such as to control gain above the horizon at one or more target frequencies. The branch 354 includes multiple legs 356 extending along the various sides of the slot 352. For example, in the illustrated embodiment, the branch 354 includes an inner leg 360, an outer leg 362, and a connecting leg 364 between the inner and outer legs 360, 362. The inner leg 360 extends along an inner portion of the slot 352. The outer leg 362 extends along an outer portion of the slot 352, and the connecting leg 364 extends along the upper portion of the slot 352. The branch 354 may include greater or fewer legs depending on the shape of the slot 352. In the illustrated embodiment, the slot 352 is oriented generally vertically. However, the slot 352 may have other orientations in alternative embodiments. The width, length, and orientation of the slot 352 affects the antenna characteristics of the resonator portion 350. Similarly, the widths, lengths, and orientations of the legs 360, 362, 364 affect the antenna characteristics of the resonator portion 350. In the illustrated embodiment, the legs 360, 362, 364 have different lengths and different widths from each other. For example, the outer leg 362 is narrower than the inner leg 360 and/or the connecting leg 364. The legs 360, 362 may be capacitively coupled to each other across the slot 352. The width of the slot 352 (for example, spacing between the edges of the legs 360, 362) affects the antenna characteristics of the first side radiating element 300. The distal end of the outer leg 362 may be capacitively coupled to the resonator portion 350 of the main panel 310 across the slot 352. The width of the slot 352 (for example, spacing between the distal end of the outer leg 362 and the main panel 310) affects the antenna characteristics of the first side radiating element 300.

In an exemplary embodiment, the first side radiating element 300 includes a first side wing 370 extending from the exterior 318 of the main panel 310. The wing 370 is integral with the main panel 310. For example, the wing 370 is stamped from the same metal sheet with the main panel 310. The wing 370 is bent out of plane relative to the main panel 310 during the forming process. The wing 370 is oriented transverse to the main panel 310, such as being bent in a counterclockwise direction toward the first side 320. In an exemplary embodiment, the wing 370 is oriented non-perpendicular to the main panel 310. For example, the wing 370 is oriented at an acute angle relative to the main panel 310.

The first side wing 370 extends between a proximal end 372 and a distal end 374. The proximal end 372 extends from the outer edge 328 at the exterior 318 of the main panel 310. In an exemplary embodiment, the proximal end 372 extends from the feed portion 330 and the resonator portion 350. For example, the proximal end 372 is located both above and below the aperture 340. However, in alternative embodiments, the proximal end 372 extends from only the feed portion 330 or only the resonator portion 350. A bend 376 is defined at the intersection of the proximal end 372 and the outer edge 328. The first side wing 370 is bent at an angle relative to the main panel 310 at the bend 376. The proximal end 372 may be oriented parallel to the inner edge 326 in various embodiments. In an exemplary embodiment, the distal end 374 is oriented parallel to the proximal end 372. For example, the first side wing 370 may have a uniform width between the proximal end 372 and the distal end 374. However, in alternative embodiments, the first side wing 370 may have other shapes. For example, the width of the first side wing 370 may vary, such as being wider at the top and/or at the bottom of the first side wing 370. In other various embodiments, the first side wing 370 may include multiple bends; and/or may be curved.

In an exemplary embodiment, the first side wing 370 includes wing tips 378 at the top and/or the bottom of the first side wing 370. The proximal end 372 of the first side wing 370 is not connected to the main panel 310 at the wing tips 378. The wing tips 378 are free from the main panel 310. Optionally, the wing tips 378 may be bent relative to other portions of the first side wing 370 such that the wing tips 378 are non-coplanar.

In the illustrated embodiment, the first side wing 370 is illustrated as being generally rectangular and planar. However, in various alternative embodiments, the first side wing 370 may have other shapes. The first side wing 370 may include cuts, slots, apertures, branches, legs, or other features that define radiating structures that affect the antenna characteristics of the first side radiating element 300.

The second side radiating element 400 (FIG. 4C) is a conductive structure configured to form part of the antenna element 102. In an exemplary embodiment, the second side radiating element 400 is stamped and formed from a metal blank or plate. The second side radiating element 400 is initially stamped in a flat pattern 400' and then formed into a formed shape that defines the second side radiating element 400.

The second side radiating element 400 is configured to be coupled to the second side 222 of the central radiating element 200 to form the antenna element 102. In an exemplary embodiment, the second side radiating element 400 includes locating tabs 408 along an inner edge of the second side radiating element 400. The locating tabs 408 are used to position the second side radiating element 400 relative to the central radiating element 200. The locating tabs 408 are configured to be received in corresponding tab openings 208 in the central radiating element 200. In an exemplary embodiment, the second side radiating element 400 includes mounting tabs 402 along an inner edge of the second side radiating element 400. The mounting tabs 402 are used to mount the second side radiating element 400 to the central radiating element 200. The mounting tabs 402 may be soldered or welded to the central radiating element 200, such as along the central axis 202.

The second side radiating element 400 includes a main panel 410 extending between a top 412 and a bottom 414 of the second side radiating element 400. The main panel 410 extends between an interior 416 and an exterior 418. The interior 416 of the second side radiating element 400 has an inner edge 426 configured to be coupled to the second side 222 of the central radiating element 400. The locating tabs 408 and the mounting tabs 402 extend from the inner edge 426 for connection to the central radiating element 400. The exterior 418 of the second side radiating element 400 has an outer edge 428. The main panel 410 has a second side 420 and a second side 422 opposite the second side 420.

In an exemplary embodiment, the main panel 410 includes a feed portion 430 at the bottom 414 and a resonator portion 450 at the top 412. The feed portion 430 is configured to be coupled to the feed 110 (shown in FIG. 1). The resonator portion 450 includes resonating features that define antenna characteristics of the antenna element 102, such as the target frequencies, the return loss, the antenna gain, and the like. The main panel 410 includes an aperture 440 between the feed portion 430 and the resonator portion 450.

The aperture 440 may be formed during the stamping process. The aperture 440 separates the feed portion 430 from the resonator portion 450. The size and shape of the aperture 440 affects the antenna characteristics of the second side radiating element 400. The orientation of the aperture 440 (for example, vertical, horizontal, or other orientation direction) affects the antenna characteristics of the second side radiating element 400. The aperture 440 may have a regular shape, such as a rectangular shape. However, the aperture 440 may have other shapes in alternative embodiments, such as an L-shape. The position of the aperture 440 along the main panel 410 (for example, distance from the top 412, from the bottom 414, from the interior 416, from the exterior 418, and the like) affects the antenna characteristics of the second side radiating element 400. In various embodiments, the aperture 440 may be approximately centered between the top 412 and the bottom 414. As such, the feed portion 430 and the resonator portion 450 have approximately equal areas of the main panel 410. However, in alternative embodiments, the aperture 440 may be offset, such as closer to the bottom 414 such that the resonator portion 450 has a larger area of the main panel 410 than the feed portion 430, or vice versa. In an exemplary embodiment, the aperture 440 is open at the interior 416. The aperture 440 is at a similar position as the aperture 240 of the central radiating element 200 such that the aperture 440 may be open to the aperture 240.

The main panel 410 includes a flanking portion 442 flanking the aperture 440. The flanking portion 442 electrically connects the feed portion 430 and the resonator portion 450. In the illustrated embodiment, flanking portion 442 is provided at the exterior 418. However, the flanking portion 442 may additionally or alternatively be provided at the interior 416.

The aperture 440 is defined by edges 444, 446. The edges 444, 446 face each other across the gap defined by the aperture 440. The edge 444 extends along the top of the feed portion 430. The edge 446 extends along the bottom of the resonator portion 450. The edges 444, 446 may be capacitively coupled to each other across the aperture 440. The width of the aperture 440 (for example spacing between the edges 444, 446) affects the antenna characteristics of the second side radiating element 400.

The feed portion 430 is located at the bottom 414 of the main panel 410. In an exemplary embodiment, the feed portion 430 includes a feed tab 432 at the bottom 414. The feed tab 432 is configured to be electrically connected to the feed 110 (shown in FIG. 1). For example, the feed tab 432 may be plugged into a slot at a top of the contact pin 4 (shown in FIG. 1). In an exemplary embodiment, the feed tab 432 is provided at the interior 416.

In an exemplary embodiment, the feed portion 430 is tapered between the interior 416 and the exterior 418 at the bottom 412. For example, the feed portion 430 includes a tapered edge 434 that extends from the interior 416 at the bottom 412 to the exterior 418. In the illustrated embodiment, the tapered edge 434 is linear. However, the tapered edge 434 may have other shapes in alternative embodiments, such as being curved or stepped.

The resonator portion 450 is located at the top 412 of the main panel 410. In an exemplary embodiment, the resonator portion 450 includes one or more slots 452 cut into the resonator portion 450. The slot 452 separates portions of the main panel 410 from other portions to form a resonating structure. The main panel 410 includes one or more branches 454 that surround the slot(s) 452. Each branch 454 defines a stub. The size and shape of the stub affects antenna characteristics, such as to control gain above the horizon at one or more target frequencies. The branch 454 includes multiple legs 456 extending along the various sides of the slot 452. For example, in the illustrated embodiment, the branch 454 includes an inner leg 460, an outer leg 462, and a connecting leg 464 between the inner and outer legs 460, 462. The inner leg 460 extends along an inner portion of the slot 452. The outer leg 462 extends along an outer portion of the slot 452, and the connecting leg 464 extends along the upper portion of the slot 452. The branch 454 may include greater or fewer legs depending on the shape of the slot 452. In the illustrated embodiment, the slot 452 is oriented generally vertically. However, the slot 452 may have other orientations in alternative embodiments. The width, length, and orientation of the slot 452 affects the antenna characteristics of the resonator portion 450. Similarly, the widths, lengths, and orientations of the legs 460, 462, 464 affect the antenna characteristics of the resonator portion 450. In the illustrated embodiment, the legs 460, 462, 464 have different lengths and different widths from each other. For example, the outer leg 462 is narrower than the inner leg 460 and/or the connecting leg 464. The legs 460, 462 may be capacitively coupled to each other across the slot 452. The width of the slot 452 (for example, spacing between the edges of the legs 460, 462) affects the antenna characteristics of the second side radiating element 400. The distal end of the outer leg 462 may be capacitively coupled to the resonator portion 450 of the main panel 410 across the slot 452. The width of the slot 452 (for example, spacing between the distal end of the outer leg 462 and the main panel 410) affects the antenna characteristics of the second side radiating element 400.

In an exemplary embodiment, the second side radiating element 400 includes a second side wing 470 extending from the exterior 418 of the main panel 410. The wing 470 is integral with the main panel 410. For example, the wing 470 is stamped from the same metal sheet with the main panel 410. The wing 470 is bent out of plane relative to the main panel 410 during the forming process. The wing 470 is oriented transverse to the main panel 410, such as being bent in a counterclockwise direction toward the second side 420. In an exemplary embodiment, the wing 470 is oriented non-perpendicular to the main panel 410. For example, the wing 470 is oriented at an acute angle relative to the main panel 410.

The second side wing 470 extends between a proximal end 472 and a distal end 474. The proximal end 472 extends from the outer edge 428 at the exterior 418 of the main panel 410. In an exemplary embodiment, the proximal end 472 extends from the feed portion 430 and the resonator portion 450. For example, the proximal end 472 is located both above and below the aperture 440. However, in alternative embodiments, the proximal end 472 extends from only the feed portion 430 or only the resonator portion 450. A bend 476 is defined at the intersection of the proximal end 472 and the outer edge 428. The second side wing 470 is bent at an angle relative to the main panel 410 at the bend 476. The proximal end 472 may be oriented parallel to the inner edge 426 in various embodiments. In an exemplary embodiment, the distal end 474 is oriented parallel to the proximal end 472. For example, the second side wing 470 may have a uniform width between the proximal end 472 and the distal end 474. However, in alternative embodiments, the second side wing 470 may have other shapes. For example, the width of the second side wing 470 may vary, such as being wider at the top and/or at the bottom of the second side wing 470. In other various embodiments, the second side wing 470 may include multiple bends; and/or may be curved.

In an exemplary embodiment, the second side wing 470 includes wing tips 478 at the top and/or the bottom of the second side wing 470. The proximal end 472 of the second side wing 470 is not connected to the main panel 410 at the wing tips 478. The wing tips 478 are free from the main panel 410. Optionally, the wing tips 478 may be bent relative to other portions of the second side wing 470 such that the wing tips 478 are non-coplanar.

In the illustrated embodiment, the second side wing 470 is illustrated as being generally rectangular and planar. However, in various alternative embodiments, the second side wing 470 may have other shapes. The second side wing 470 may include cuts, slots, apertures, branches, legs, or other features that define radiating structures that affect the antenna characteristics of the second side radiating element 400.

When assembled (FIG. 4D), the first and second side radiating elements 300, 400 are coupled to the central radiating element 200 to form the antenna element 102. The antenna element 102 is a cross shaped antenna structure. In an exemplary embodiment, the first side radiating element 300 and the second side radiating element 400 are coupled to the main panel 210 of the central radiating element 200 at the central axis 202. The cross shaped antenna structure is symmetrical about the central axis 202. For example, the first and second side radiating elements 300, 400 are symmetric about the central axis 202 and the front and rear portions of the central radiating element 200 is symmetric about the central axis 202. In an exemplary embodiment, the first and second side radiating elements 300, 400, and the front and rear portions of the central radiating element 200 are identical radiating structures emanating from the central axis 202. In an exemplary embodiment, the stamped and formed radiating elements 200, 300, 400 arranged in the crossed structure emulate wideband impedance characteristics of a conventional conical structure but at lower cost with less manufacturing complexity than conventional conical antenna structures.

The wings 270, 280, 370, 470 of the radiating elements 200, 300, 400 provide additional surface area for radiation to improve the antenna characteristics of the antenna element 102. In the illustrated embodiment, the wings 270, 280, 370, 470 each extend in conterclockwise directions around the central axis 202. The wings 270, 280, 370, 470 are bent inward at acute angles to reduce the overall size (for example, outer perimeter) of the antenna element 102 and provide a condensed overall shape to fit within a condensed space, such as the radome 5 (FIG. 1). Folding the wings 270, 280, 370, 470 decreases the volume for more compact packaging as compared to conventional conical antenna structures.

With reference back to FIG. 3, the radiating elements 200, 300, 400 have different shapes and features compared to the embodiment shown in FIG. 2. For example, the resonator portions 250, 350, 450 may be shaped differently. The apertures 240, 340, 440 may be shaped differently. For example, the apertures 240, 340, 440 may be L-shaped. In the illustrated embodiment, the apertures 240, 340, 440 are oriented generally vertically rather than being oriented generally horizontally. The apertures 240, 340, 440 may be open at the exterior edges of the main panels. The feed portions of the main panels are shorter than the resonator portions in the illustrated embodiment. The exterior edges of the main panels are angled inward (non-parallel to the central axis) in the illustrated embodiment. The wings 270, 280, 370, 470 may be shaped differently, such as having tapered edges.

FIGS. 5A, 5B, and 5C illustrate the radome 5 of the antenna assembly shown in FIG. 1. FIG. 5A is a perspective view of the radome 5. FIG. 5B is a side view of the radome 5. FIG. 5C is a cross-sectional view of the radome 5. The radome 5 is a structural, weatherproof enclosure that protects the antenna element 102 (FIG. 1). The radome 5 is constructed of material transparent to radio waves. The radome 5 protects the antenna element 102 from weather and conceals the antenna element 102 from view.

In an exemplary embodiment, the radome 5 includes an interior cavity 120 that receives the antenna element 102. The cavity 120 may be generally cylindrical. Optionally, the cavity 120 may be conical, such as being tapered inward at the top of the radome 5. Optionally, a base 122 of the radome 5 may be flared outward, such as for stability. In an exemplary embodiment, the radome 5 includes internal threads 124 at the base 122. The threads 124 are configured to be threadably coupled to the connector body 1 (FIG. 1).

In an exemplary embodiment, as shown in the FIG. 5C, the radome 5 includes slots 126 defined along interior surfaces of the radome 5. The slots 126 are configured for engagingly receiving the side edge portions of the antenna element 102, such as the resonator portions 250, 350, 450 (FIGS. 4A, 4B, 4C) when the antenna element 102 is slidably positioned in the cavity 120 of the radome 5. Slidably positioning the antenna element 102 within the interior slots 126 may help support and/or stabilize (e.g., prevent vibration, etc.) the antenna element 102, may provide reinforcement for the antenna element 102, and/or may help with proper alignment of the antenna element 102 in the radome 5.

FIGS. 6, 7A, and 7B illustrate the center pin 3 of the antenna assembly 100 shown in FIG. 1. FIG. 6 is a perspective view of the center pin 3. FIG. 7A is a side view of the center pin 3. FIG. 7B is a cross-sectional view of the center pin 3. The center pin 3 forms part of the feed 110 of the antenna assembly 100.

The center pin 3 extends between a first end 130 and a second end 132. In an exemplary embodiment, the center pin 3 includes a locating shoulder 131 between the first and second ends 130, 132 for locating the center pin 3 in the electrical insulator 2 (FIG. 1). The first end 130 is configured to be coupled to the contact pin 4 (FIG. 8). The second end is configured to be coupled to a cable or feed pin (not shown). The center pin 3 is manufactured from a conductive material, such as metal. The center pin 3 may be a machined part. Alternatively, the center pin 3 may be manufactured by other processes such as being stamped and formed. The center pin 3 includes sockets 134, 136 at the first and second ends 130, 132, respectively. The contact pin 4 may be plugged into the socket 134. The conductor of the cable or a feed pin may be plugged into the socket 136. Other types of contacts may be provided at the first end 130 and/or the second end 132 in alternative embodiments. The center pin 3 includes deflectable spring fingers 138 along the sockets 134, 136 that engage the contact pin 4 or the cable.

FIGS. 8, 9, and 10 illustrate the electrical insulator 2 of the antenna assembly 100 shown in FIG. 1. FIG. 8 is a perspective view of the electrical insulator 2. FIG. 9 is a side view of the electrical insulator 2. FIG. 10 is a cross-sectional view of the electrical insulator 2. The electrical insulator 2 forms part of the antenna base 106 of the antenna assembly 100.

The electrical insulator 2 is manufactured from a dielectric material, such as a plastic material. The electrical insulator 2 includes a flange 140 at an upper portion of the electrical insulator 2. The flange 140 is used for positioning the electrical insulator 2 in the connector body 1 (FIG. 1). The electrical insulator 2 includes an insulator bore 142 extending through the electrical insulator 2 between the top and the bottom of the electrical insulator 2. The insulator bore 142 is configured to receive the contact pin 4. The electrical insulator 2 electrically isolates the center pin 3 from the connector body 1. The insulator bore 142 may be cylindrical. In some embodiments, the insulator bore 142 may be stepped, such as to receive the locating shoulder 131 of the center pin 3.

FIG. 11 is a perspective view of the contact pin 4 of the antenna assembly 100 shown in FIG. 1. The contact pin 4 includes a pin 150 at a bottom and a head 152 at a top of the contact pin 4. The pin 150 is configured to be plugged into the center pin 3 to electrically connect the contact pin 4 to the center pin 3. The contact pin 4 and the center pin 3 form the feed 110 of the antenna assembly 100. The head 152 includes a cross-shaped feed slot 154 that receives the feed tabs 232, 332, 432 of the radiating elements 200, 300, 400 (FIGS. 4A, 4B, 4C). Tab supports 156 surround the feed slot 154 to form the cross-shaped feed slot 154. The tab supports 156 engage the feed tabs 232, 332, 432 to connect the feed 110 to the antenna element 102. The feed slot 154 is open from above the receive the feed tabs 232, 332, 432. The feed slot 154 may be open at the sides of the head 152 to allow the feed tabs 232, 332, 432 to extend through the sides of the head 152. The head 152 may include bumps or protrusions extending into the feed slot 154 to interface with the feed tabs 232, 332, 432.

FIGS. 12, 13, and 14 illustrate the connector body 1 of the antenna assembly 100 shown in FIG. 1. FIG. 12 is a perspective view of the connector body 1. FIG. 13 is a side view of the connector body 1. FIG. 14 is a cross-sectional view of the connector body 1. The connector body 1 forms part of the antenna base 106 of the antenna assembly 100. In an exemplary embodiment, the connector body 1 is configured to be electrically grounded. The connector body 1 may form a ground reference or ground plane for the antenna assembly 100.

The connector body 1 includes mounting base 160 at a bottom of the connector body 1 and an upper flange 170 at a top of the connector body 1. The connector body 1 includes a bore 162 extending through the mounting base 160 and the upper flange 170. The bore 162 receives the insulator 2 and the feed 110 (FIG. 1). The bore 162 may receive the cap 13 (FIG. 1). The bore 162 may receive a cable or other feeding element. The mounting base 160 is used to mount the antenna base 106 to another structure, such as a chassis, a panel, a wall, or other support structure. In an exemplary embodiment, the mounting base 160 is cylindrical and threaded with threads 164. The threads 164 are configured to be threadably coupled to the support structure. Other types of mounting bases may be used in alternative embodiments.

The upper flange 170 includes an upper surface 172 and a lower surface 174. The lower surface 174 may be supported on the support structure. The lower surface 174 may include a seal groove 175 that receives the O-ring 7. The O-ring 7 may be sealed between the lower surface 174 and the support structure. In an exemplary embodiment, an outer perimeter of the upper flange 170 is threaded with external threads 173. The external threads 173 are configured to be coupled to the radome 5, such as being threadably coupled to the internal threads 124 (FIG. 5C) of the radome 5.

In an exemplary embodiment, a lip 176 extends from the upper surface 172. The lip protrudes upward a distance. The lip 176 surrounds a pocket 178. The insulator 2 and the feed 110, such as the center pin 3 and/or the contact pin 4, are received in the pocket 178 and surrounded by the lip 176. The pocket 178 may receive a portion of the antenna element 102, such as the feed tabs 232, 332, 432 and the bottom tapered portions of the feed portions of the radiating elements 200, 300, 400. The lip 176 has a height and a diameter that positions the lip 176 a predetermined distance from the feed 110 and the feed portions of the radiating elements 200, 300, 400 to control antenna characteristics of the antenna assembly 100. For example, the spacing between the grounded connector body 1 (for example, the lip 176) and the feed portions of the antenna assembly 100 (for example, the pins 3, 4 and the feed tabs 232, 332, 432) may be controlled to tune the antenna assembly 100. The amount of taper on the feed portions of the radiating elements 200, 300, 400 control the spacing between the grounded connector body 1 and the antenna element 102. The height of the lip 176 and the diameter of the lip 176 controls the spacing between the grounded connector body 1 and the antenna element 102.

FIG. 15 illustrates the first side radiating element 200, the central radiating element 300, and the second side radiating element 400 corresponding to the antenna element 102 shown in FIG. 2.

FIG. 16 illustrates perspective views of the antenna elements 102 with the radiating elements 200, 300, 400 after being assembled (for example, soldered, spot welded, and the like) into a broadband rugged monopole antenna element, corresponding to the antenna element 102 shown in FIG. 2.

FIG. 17 illustrates perspective views of the antenna elements 102 connected to the corresponding contact pins 4.

FIG. 18A is an exploded view of the antenna base 106 showing the connector body 1, the insulator 2 and the center pin 3.

FIG. 18B is a partially assembled view of a portion of the antenna base 106 showing the center pins 3 received in corresponding insulators 2.

FIG. 19 is an assembled view of the antenna bases 106 showing the center pins 3 and the insulators 2 received in corresponding connector bodies 1.

FIG. 20 illustrates bottom perspective views of the antenna assemblies 100 with the antenna elements 102 and the antenna bases 106 in the corresponding radomes 5. Each connector body 1 is threadably coupled to the base of the radome 5. The O-ring 15 is coupled to the bottom of the radome 5 to seal the radome 5 to the supporting structure.

FIGS. 21 through 36 provide testing results measured for the prototype antenna assemblies 100 shown in FIG. 20. The prototype antenna assemblies were tested on a two feet by two feet square ground plane made of 1.7 mm thick aluminum. The results shown in FIGS. 21 through 36 are provided only for purposes of illustration and not for purposes of limitation.

More specifically, FIGS. 21 and 22 includes RF specifications tables and compliance data for a prototype antenna assembly 100 according to an exemplary embodiment. FIGS. 23A and 23B includes tables with antenna characteristics and performance specifications for a prototype antenna assembly 100 according to an exemplary embodiment.

FIGS. 24 and 25 include line graphs of voltage standing wave ratio (VSWR) versus frequency in megahertz (MHZ) measured for the three prototype antenna assemblies 100 shown in FIG. 20 including installed O-rings. Generally, FIGS. 24 and 25 show that the prototype antenna assemblies 100 have relatively good VSWR in compliance with VSWR values shown in FIGS. 21, 23A, and 23B. FIGS. 24 and 25 also generally show that the VSWR for all prototype samples was consistent and repeatable.

FIG. 26 includes a bar graph of efficiency (%) and a line graph of maximum gain in decibels relative to isotropic radiator (dBi) versus frequency (MHz) for the three prototype antenna assemblies 100 shown in FIG. 20. FIG. 27 includes a line graph of average gain (dBi) versus frequency (MHz) azimuth theta 80° for the three prototype antenna assemblies 100 shown in FIG. 20. FIG. 28 includes a line graph of azimuth plane ripple (dB) versus frequency (MHz) for the three prototype antenna assemblies 100 shown in FIG. 20.

FIGS. 29 through 36 illustrate radiation patterns (azimuth plane, phi zero degree plane, and phi ninety degree plane) measured for the three prototype antenna assemblies shown in FIG. 20 at frequencies of 617 MHz, 698 MHz, 806 MHz, 824 MHz, 880 MHz, 960 MHz, 1427 MHz, 1690 MHz, 1850 MHz, 1950 MHz, 2305 MHz, 3300 MHz, 3800 MHz, 4200 MHz, 4900 MHz, and 5950 MHz respectively. Azimuth radiation patterns were taken at theta 80 degree node. Generally, FIGS. 29 through 36 show that the prototype antenna assemblies 100 have good omnidirectional radiation patterns at these frequencies ranging from 617 megahertz (MHz) to 5950 MHz.

FIGS. 39 through 53 provide testing results measured for the prototype antenna assembly 100 shown in FIG. 38. The prototype antenna assembly was tested on a two feet by two feet square ground plane made of 1.7 mm thick aluminum. The results shown in FIGS. 39 through 53 are provided only for purposes of illustration and not for purposes of limitation.

More specifically, FIGS. 39, 40, and 41 include line graphs of voltage standing wave ratio (VSWR) versus frequency in megahertz (MHZ) measured for prototype antenna assemblies 100 as shown in FIG. 38. Generally, FIGS. 39, 40, and 41 show that the prototype antenna assemblies 100 have relatively good VSWR and that the VSWR for all prototype samples was consistent and repeatable.

FIG. 42 is a line graph of peak gain (dBi) versus frequency (MHZ) measured for a prototype antenna assembly 100 as shown in FIG. 38. FIG. 43 is a line graph of gain (dBi) on horizon versus frequency (MHZ) measured for a prototype antenna assembly 100 as shown in FIG. 38. FIG. 44 is a line graph of efficiency (%) versus frequency (MHZ) measured for a prototype antenna assembly 100 as shown in FIG. 38. FIG. 45 is a line graph of beam width (degrees), Phi=90° versus frequency (MHZ) measured for a prototype antenna assembly 100 as shown in FIG. 38.

FIGS. 46 through 53 illustrate radiation patterns (azimuth plane, phi zero degree plane, and phi ninety degree plane) measured for a prototype antenna assembly as shown in FIG. 38 at frequencies of 698 MHz, 960 MHz, 1427 MHz, 1695 MHz, 2700 MHz, 3800 MHz, 5470 MHz, and 5925 MHz, respectively. Generally, FIGS. 46 through 53 show that the prototype antenna assemblies 100 have good omnidirectional radiation patterns at these frequencies ranging from 698 megahertz (MHz) to 5925 MHz.

As recognized herein, good ground contact was important for both the omnidirectional patterns and VSWR performance. The prototype samples were sensitive to poor ground contact. Accordingly, the connector nut was tightened with a large amount of force to ensure good grounding. VSWR measurements were completed with 2 lock washers to help establish and maintain good grounding with the ground plane.

A wide range of electrically-conductive materials may be used for the antenna elements A, B, and C of the monopole antenna element 102, such as sheet metal, beryllium copper alloy (e.g., beryllium copper alloy 25, etc.), stainless steel, phosphor bronze, copper-clad steel, brass, monel, aluminum, steel, nickel silver, other beryllium copper alloys, among others.

Accordingly, disclosed herein are exemplary embodiments of omnidirectional antenna assemblies including broadband monopole antennas. In exemplary embodiments, the antenna assembly includes a broadband monopole antenna comprising stamped and folded elements. The antenna assembly is configured to be operable with high omnidirectional pattern conformity at frequencies from about 617 megahertz (MHz) to about 7125 MHz or frequencies from about 698 megahertz (MHz) to about 7125 MHz. Accordingly, the omnidirectional antenna may thus be configured to deliver global cellular coverage even for regions where the lower 600 MHz band is required. In exemplary embodiments, the omnidirectional antenna may be configured to be operable with relatively high levels of average efficiency over 80% up to 4200 MHz, with gain up to 5.5 dBi in an IP67 and UL 94 flammability rated compact form factor.

In exemplary embodiments, the omnidirectional antenna assembly may include a direct-mount, threaded stud and integrated N-female connector that provide a tamper-resistant installation. A direct coaxial connection may be provided that ensures performance remains consistent even at the higher frequencies thereby avoiding the performance losses of other mounting methods.

In exemplary embodiments, the omnidirectional antenna assembly may be configured (e.g., optimized, etc.) to be operable with optimal gain directed at just above the horizon for superior connectivity with exceptional efficiency levels.

In exemplary embodiments, the omnidirectional antenna assembly may be configured to be operable with uniform azimuth patterns that reduce the chance of signal drop outs.

In exemplary embodiments, the omnidirectional antenna assembly may be configured with a rugged, robust construction, which is tamper-resistant and highly durable with IP67-rated compact enclosure and UL 94 flammability rating.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail. In addition, advantages, and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values (e.g., frequency ranges, etc.) for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An antenna assembly comprising:

an antenna base having a feed; and an antenna element coupled to the antenna base, the antenna element including a central radiating element, a first side radiating element coupled to the central radiating element, and a second side radiating element coupled to the central radiating element, the first side radiating element separate and discrete from the second side radiating element and separately coupled to the central radiating element, the central radiating element, the first side radiating element, and the second side radiating element form a cross shaped antenna structure extending along a central antenna axis, the central radiating element, the first side radiating element, and the second side radiating element having metal panels stamped from metal sheets that are joined along the central antenna axis, the central radiating element, the first side radiating element, and the second side radiating element having radial symmetry about the central antenna axis radiating from the central radiating element, the first side radiating element, and the second side radiating element for omni-directional conformance along an entire height of the antenna element.

2. The antenna assembly of claim 1, wherein the central radiating element defines a front radiator forward of the central axis and a rear radiator rearward of the central axis, the first side radiating element defines a first side radiator at a first side of the central axis, and the second side radiating element defines a second side radiator at a second side of the central axis, the front radiator, the rear radiator, the first side radiator, and the second side radiator being symmetrical about the central antenna axis.

3. The antenna assembly of claim 1, wherein the central radiating element, the first side radiating element, and the second side radiating element have an omni-directional conformance of less than 5 dB.

4. The antenna assembly of claim 1, wherein the central radiating element, the first side radiating element, and the second side radiating element have an omni-directional conformance of less than 3 dB.

5. The antenna assembly of claim 1, wherein the antenna element is a broadband antenna element, the central radiating element, the first side radiating element, and the second side radiating element being operable in a low frequency band of between 600 megahertz (MHz) and 700 megahertz (MHz) and a high frequency band of between 7000 megahertz (MHz) and 8000 megahertz (MHz).

6. The antenna assembly of claim 1, wherein the central radiating element, the first side radiating element, and the second side radiating element have tapered shapes at bottoms thereof.

7. The antenna assembly of claim 1, wherein the antenna base having a connector body including a bore, the antenna base having an insulator received in the bore, the insulator including an insulator bore, the antenna base including a feed received in the insulator bore, the connector body being electrically grounded, the insulator isolating the feed from the connector body.

8. The antenna assembly of claim 7, wherein the connector body includes an upper flange having an upper surface and a lip extending from the upper flange, the lip forming a pocket, the feed extending into the pocket, feed portions of the central radiating element, the first side radiating element, and the second side radiating element extending into the pocket to couple to the feed, the lip being spaced apart from the feed portions by a predetermined distance.

9. The antenna assembly of claim 8, wherein the feed portions are tapered to extend into the pocket.

10. The antenna assembly of claim 1, wherein the antenna base includes a feed having a cross shaped feed slot, feed portions of the central radiating element, the first side radiating element, and the second side radiating element including feed tabs received in the cross shaped feed slot.

11. The antenna assembly of claim 1, wherein the first side radiating element is identical to the second side radiating element.

12. The antenna assembly of claim 1, wherein the central radiating element is symmetrical about a central axis of the main panel of the central radiating element.

13. The antenna assembly of claim 1, wherein:

the central radiating element includes a main panel extending between a top and a bottom of the central radiating element, the main panel of the central radiating element having a first side and a second side, the main panel of the central radiating element having a feed portion at the bottom and a resonator portion at the top, the main panel of the central radiating element having an aperture between the feed portion and the resonator portion of the central radiating element, the central radiating element including a front wing extending from a front edge of the main panel, the front wing being oriented transverse to the main panel of the central radiating element, the central radiating element including a rear wing extending from a rear edge of the main panel, the rear wing being oriented transverse to the main panel of the central radiating element;

the first side radiating element being coupled to the first side of the central radiating element, the first side radiating element having a main panel extending between a top and a bottom of the first side radiating element, the main panel of the first side radiating element having a feed portion at the bottom and a resonator portion at the top, the main panel of the first side radiating element having an aperture between the feed portion and the resonator portion of the of the first side radiating element, the first side radiating element including a first side wing extending from a first side edge of the main panel, the first side wing being oriented transverse to the main panel of the first side radiating element;

the second side radiating element being coupled to the second side of the central radiating element, the second side radiating element separate and discrete from the first side radiating element and separately coupled to the central radiating element, the second side radiating element having a main panel extending between a top and a bottom of the second side radiating element, the main panel of the second side radiating element having a feed portion at the bottom and a resonator portion at the top, the main panel of the second side radiating element having an aperture between the feed portion and the resonator portion of the of the second side radiating element, the second side radiating element including a second side wing extending from a second side edge of the main panel, the second side wing being oriented transverse to the main panel of the second side radiating element.

14. The antenna assembly of claim 13, wherein the first side radiating element and the second side radiating element are coupled to the main panel of the central radiating element at a central axis of the main panel of the central radiating element.

15. The antenna assembly of claim 13, wherein the apertures are aligned with each other and open to each other.

16. The antenna assembly of claim 13, wherein the feed portions are tapered such that the feed portions are narrower at the bottoms of the main panels.

17. The antenna assembly of claim 13, wherein each resonator portion includes a branch including an inner leg and an outer leg separated from the inner leg by a slot.

18. The antenna assembly of claim 13, wherein the front wing extends along the feed portion and the resonator portion of the main panel of the central radiating element, the rear wing extending along the feed portion and the resonator portion of the main panel of the central radiating element, the first side wing extending along the feed portion and the resonator portion of the main panel of the first side radiating element, the second side wing extending along the feed portion and the resonator portion of the main panel of the second side radiating element.

19. The antenna assembly of claim 13, wherein the front wing is angled at an acute angle relative to the main panel of the central radiating element, the rear wing being angled at an acute angle relative to the main panel of the central radiating element, the first side wing being angled at an acute angle relative to the main panel of the first side radiating element, and the second side wing being angled at an acute angle relative to the main panel of the second side radiating element.

20. An antenna element comprising:

a central radiating element having a main panel extending between a top and a bottom of the central radiating element, the main panel of the central radiating element having a first side and a second side, the main panel of the central radiating element having a feed portion at the bottom and a resonator portion at the top, the main panel of the central radiating element having an aperture between the feed portion and the resonator portion of the central radiating element, the central radiating element including a front wing extending from a front edge of the main panel, the front wing being oriented transverse to the main panel of the central radiating element, the central radiating element including a rear wing extending from a rear edge of the main panel, the rear wing being oriented transverse to the main panel of the central radiating element;

a first side radiating element coupled to the first side of the central radiating element, the first side radiating element having a main panel extending between a top and a bottom of the first side radiating element, the main panel of the first side radiating element having a feed portion at the bottom and a resonator portion at the top, the main panel of the first side radiating element having an aperture between the feed portion and the resonator portion of the of the first side radiating element, the first side radiating element including a first side wing extending from a first side edge of the main panel, the first side wing being oriented transverse to the main panel of the first side radiating element;

a second side radiating element coupled to the second side of the central radiating element, the second side radiating element separate and discrete from the first side radiating element and separately coupled to the central radiating element, the second side radiating element having a main panel extending between a top and a bottom of the second side radiating element, the main panel of the second side radiating element having a feed portion at the bottom and a resonator portion at the top, the main panel of the second side radiating element having an aperture between the feed portion and the resonator portion of the of the second side radiating element, the second side radiating element including a second side wing extending from a second side edge of the main panel, the second side wing being oriented transverse to the main panel of the second side radiating element;

wherein the central radiating element, the first side radiating element, and the second side radiating element form a cross shaped antenna structure being symmetrical about a central axis of the antenna assembly along an entire height of the antenna element.

21. An antenna assembly comprising:

a radome having a cavity;

an antenna base having a connector body including a bore, the antenna base having an insulator received in the bore, the insulator including an insulator bore, the antenna base including a feed received in the insulator bore, the connector body being electrically grounded, the insulator isolating the feed from the connector body; and an antenna element received in the cavity of the radome, the antenna element including a central radiating element, a first side radiating element coupled to the central radiating element, and a second side radiating element coupled to the central radiating element, the central radiating element, the first side radiating element, and the second side radiating element form a cross shaped antenna structure form a cross shaped antenna structure coupled to the feed of the antenna base, the central radiating element, the first side radiating element, and the second side radiating element being symmetrical about a central axis of the antenna assembly along an entire height of the antenna element;

the central radiating element having a main panel extending between a top and a bottom of the central radiating element, the main panel of the central radiating element having a first side and a second side, the main panel of the central radiating element having a feed portion at the bottom coupled to the antenna base and a resonator portion at the top, the main panel of the central radiating element having an aperture between the feed portion and the resonator portion of the central radiating element, the central radiating element including a front wing extending from a front edge of the main panel, the front wing being oriented transverse to the main panel of the central radiating element, the central radiating element including a rear wing extending from a rear edge of the main panel, the rear wing being oriented transverse to the main panel of the central radiating element;

the first side radiating element coupled to the first side of the central radiating element, the first side radiating element having a main panel extending between a top and a bottom of the first side radiating element, the main panel of the first side radiating element having a feed portion at the bottom coupled to the antenna base and a resonator portion at the top, the main panel of the first side radiating element having an aperture between the feed portion and the resonator portion of the of the first side radiating element, the first side radiating element including a first side wing extending from a first side edge of the main panel, the first side wing being oriented transverse to the main panel of the first side radiating element;

the second side radiating element coupled to the second side of the central radiating element, the second side radiating element separate and discrete from the first side radiating element and separately coupled to the central radiating element, the second side radiating element having a main panel extending between a top and a bottom of the second side radiating element, the main panel of the second side radiating element having a feed portion at the bottom coupled to the antenna base and a resonator portion at the top, the main panel of the second side radiating element having an aperture between the feed portion and the resonator portion of the of the second side radiating element, the second side radiating element including a second side wing extending from a second side edge of the main panel, the second side wing being oriented transverse to the main panel of the second side radiating element.

* * * * *